US012541758B2

(12) United States Patent
Reed et al.

(10) Patent No.: US 12,541,758 B2
(45) Date of Patent: Feb. 3, 2026

(54) SYSTEMS AND METHODS FOR TRANSACTING OVER A NETWORK

(71) Applicant: Avast Software s.r.o., Prague (CZ)

(72) Inventors: Drummond Reed, Seattle, WA (US); Brent Zundel, American Fork, UT (US); Martin Mesršmíd, Prague (CZ); Allan Thomson, Pleasanton, CA (US)

(73) Assignee: Avast Software s.r.o., Prague (CZ)

(*) Notice: Subject to any disclaimer, the term of this patent is extended or adjusted under 35 U.S.C. 154(b) by 29 days.

(21) Appl. No.: 18/063,284

(22) Filed: Dec. 8, 2022

(65) Prior Publication Data

US 2024/0193592 A1 Jun. 13, 2024

(51) Int. Cl.
*G06Q 20/38* (2012.01)
*G06Q 20/40* (2012.01)

(52) U.S. Cl.
CPC ..... *G06Q 20/3825* (2013.01); *G06Q 20/3821* (2013.01); *G06Q 20/401* (2013.01); *G06Q 2220/00* (2013.01)

(58) Field of Classification Search
CPC ........... G06Q 20/3825; G06Q 20/3821; G06Q 20/401; G06Q 2220/00; G06Q 20/389; G06Q 20/4014; G06Q 20/405; H04L 2209/56; H04L 9/3247; H04L 9/50
See application file for complete search history.

(56) References Cited

U.S. PATENT DOCUMENTS

| | | | |
|---|---|---|---|
| 4,910,693 A | 3/1990 | Sperling et al. | |
| 5,825,880 A | 10/1998 | Sudia et al. | |
| 5,862,325 A | 1/1999 | Reed et al. | |
| 6,044,205 A | 3/2000 | Reed et al. | |
| 6,088,717 A | 7/2000 | Reed et al. | |
| 6,327,578 B1 * | 12/2001 | Linehan | G06Q 20/02 713/172 |
| 6,345,288 B1 | 2/2002 | Reed et al. | |
| 6,757,710 B2 | 6/2004 | Reed | |

(Continued)

FOREIGN PATENT DOCUMENTS

EP 4254234 A1 10/2023
WO 2018031856 2/2018

(Continued)

OTHER PUBLICATIONS

International Search Report dated Oct. 24, 2023 for International Patent Application No. PCTUS2370319.

(Continued)

*Primary Examiner* — Patrick McAtee
(74) *Attorney, Agent, or Firm* — Dovas Law, P.C.

(57) ABSTRACT

Systems and methods for transacting over a network. A first agent and a second agent are provided. The second agent is operable to transact with a third agent for use of a network-enabled service based on a first transaction policy from a fourth agent, the third agent enabled to communicate with a fifth agent. The first agent is operable to communicate with the second agent to facilitate the transacting by the second agent with the third agent for the use of the network-enabled service based on the first transaction policy and communicate with the fifth agent to facilitate the transacting by the second agent with the third agent for the use of the network-enabled service.

19 Claims, 14 Drawing Sheets

(56) References Cited

U.S. PATENT DOCUMENTS

| | | | |
|---|---|---|---|
| 7,341,177 | B2 | 3/2008 | Shepley et al. |
| 7,425,795 | B2 | 9/2008 | Anderson et al. |
| 7,490,762 | B2 | 2/2009 | Shepley et al. |
| 7,934,644 | B2 | 5/2011 | Shepley et al. |
| 8,316,237 | B1* | 11/2012 | Felsher ............... H04L 63/061 380/282 |
| 10,373,158 | B1* | 8/2019 | James ................... G06Q 40/04 |
| 11,139,955 | B1* | 10/2021 | So ..................... G06Q 20/3674 |
| 11,184,395 | B1 | 11/2021 | Novotny et al. |
| 2002/0188490 | A1 | 12/2002 | Kruse |
| 2003/0158820 | A1 | 8/2003 | Mathur et al. |
| 2009/0300747 | A1* | 12/2009 | Ahn ..................... H04L 63/0807 726/9 |
| 2014/0281491 | A1 | 9/2014 | Zaverucha et al. |
| 2015/0095999 | A1* | 4/2015 | Toth ..................... H04L 9/3263 726/6 |
| 2019/0097812 | A1 | 3/2019 | Toth |
| 2020/0127845 | A1 | 4/2020 | Yang et al. |
| 2020/0136921 | A1 | 4/2020 | Doshi et al. |
| 2020/0302441 | A1 | 9/2020 | Collinge et al. |
| 2021/0014060 | A1 | 1/2021 | Giorgiadis et al. |
| 2021/0287770 | A1* | 9/2021 | Anderson ............. G16H 40/20 |
| 2022/0272085 | A1 | 8/2022 | Novotny et al. |
| 2022/0329653 | A1 | 10/2022 | Govindarajan et al. |
| 2023/0259922 | A1* | 8/2023 | Rao ...................... H04L 9/3213 |
| 2024/0187238 | A1 | 6/2024 | Pourtabatabaie et al. |

FOREIGN PATENT DOCUMENTS

| | | |
|---|---|---|
| WO | WO2019191213 | 10/2019 |
| WO | WO2020233236 | 11/2020 |
| WO | WO2022096126 | 5/2022 |

OTHER PUBLICATIONS

U.S. Appl. No. 17/872,250, filed Jul. 25, 2022.
International Patent Application No. PCTUS2370319 filed Jul. 17, 2023.
U.S. Appl. No. 18/052,752, filed Nov. 4, 2022.
Aries RFC 0046: Mediators and Relays, Daniel Hardman, Dec. 1, 2018 through Feb. 1, 2019, GitHub, https://github.com/hyperledger/aries-rfcs/blob/main/concepts/0046-mediators-and-relays/README.md, accessed Sep. 14, 2023.
Aries RFC 0478: Coprotocols, Daniel Hardman, Feb. 3, 2020 through May 19, 2020, GitHub, https://github.com/hyperledger/aries-rfcs/blob/main/concepts/0478-coprotocols/README.md, accessed Sep. 14, 2023.
Aries RFC 0075: Payment Decorators, Sam Curren et al., Apr. 22, 2019 through Jun. 11, 2019,GitHub, https://github.com/hyperledger/aries-rfcs/tree/main/features/0075-payment-decorators, accessed Sep. 14, 2023.
Aries RFC 0453: Issue Credential Protocol 2.0, Nikita Khateev et al., Mar. 23, 2020 through Apr. 15, 2021, GitHub, https://github.com/hyperledger/aries-rfcs/tree/main/features/0453-issue-credential-v2, accessed Sep. 28, 2023.
Aries RFC 0454: Present Proof Protocol 2.0, Nikita Khateev et al., May 27, 2020 through Apr. 15, 2021, GitHub, https://github.com/hyperledger/aries-rfcs/tree/main/features/0454-present-proof-v2, accessed Sep. 14, 2023.
Aries RFC 0004: Agents, Daniel Hardman, Nov. 1, 2017 "(approx, backdated)" through Jan. 15, 2019, GitHub, https://github.com/hyperledger/aries-rfcs/tree/main/concepts/0004-agents, accessed Sep. 14, 2023.
DIDComm Messaging v2.x Editor's Draft, Sam Curren et al., The Decentralized Identity Foundation, https://identity.foundation/didcomm-messaging/spec/, accessed Sep. 14, 2023.
Credential.md, Dmitry Khovratoavich et al., GitHub, https://github.com/sovrin-foundation/protocol/blob/master/themis/credential.md, accessed Sep. 14, 2023.
Alex Preukschat; Drummond Reed, Self-Sovereign Identity: Decentralized digital identity and verifiable credentials, Manning, 2021.
Machine Translation of EP 4254234 A1 (Year: 2023).
Machine Translation of WO 2020233236 A1 (Year 2020).
Dmitry Khovratovich; Jason Law, Sovrin: Digital Identities in the Blockchain Era, Dec. 2016, Sovrin. org.
"Decentralized Identity and Verifiable Credentials", Microsoft Security, Sep. 28, 2022 pp. 1-11.
Daniel Hardman, How DIDs, Keys, Credentials, and Agents Work in Sovrin, Apr. 2018, Sovrin. org.
Phillip J. Windley, How Sovrin Works, Oct. 3, 2016, Sovrin.org.
Office Action dated Nov. 14, 2024 for U.S. Appl. No. 18/052,752.
Updated Office Action dated Dec. 3, 2024 for U.S. Appl. No. 18/052,752.
Reply dated Jan. 22, 2025 for U.S. Appl. No. 18/052,752.
Notice of Allowance dated May 14, 2025 for U.S. Appl. No. 18/052,752.
Office Action dated Feb. 13, 2025 for U.S. Appl. No. 18/066,213.
Reply dated Apr. 9, 2025 for U.S. Appl. No. 18/066,213.
Notice of Allowance dated May 30, 2025 for U.S. Appl. No. 18/066,213.
Office Action dated Nov. 27, 2024 for U.S. Appl. No. 17/872,250.
Reply dated Jan. 22, 2025 for U.S. Appl. No. 17/872,250.
Office Action dated May 16, 2025 for U.S. Appl. No. 17/872,250.
Reply dated Aug. 4, 2025 for U.S. Appl. No. 17/872,250.
Notice of Allowance dated Mar. 6, 2025 for U.S. Appl. No. 18/446,068.
Notice of Allowance dated Jun. 25, 2025 for U.S. Appl. No. 18/446,068.
Japanese Office Action dated Jul. 8, 2025 for Japanese Patent Application No. 2025-504595 including English translation of Office Action.
Machine translation of JP2019525645.
Machine translation of WO2022102930.
Machine translation of JP2021111412.
Machine translation of CN109716373A.

* cited by examiner

SYSTEMS AND METHODS FOR TRANSACTING OVER A NETWORK

FIELD OF INVENTION

The disclosure relates generally to digital communications, and more particularly to transacting over a network.

BACKGROUND

Self-sovereign identity ("SSI") is a concept or model for allowing individuals to maintain control of their digital identities. An SSI system is typically decentralized and allows a holder (e.g., an individual or an organization) to generate and maintain unique identifiers known as decentralized identifiers ("DIDs"). A credential issued by an entity, typically an organization, acting in the role of an issuer is provided by a particular party (a "holder") to another party (a "verifier") for verifying identity information included within the credential of the particular party. SSI infrastructure used by issuers, verifiers, and holders is typically open source, while leveraging many individual standards for elements of the technology stack, where providers of the SSI infrastructure provide proprietary software including applications for performing transaction processing.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for transacting over a network is provided. The method includes receiving by a first agent a digitally signed transaction from a second agent, the digitally signed transaction received by the second agent from a third agent and including a digital signature. A first verifiable proof is received by the first agent from a fourth agent. The first verifiable proof is transmitted by the first agent to a fifth agent. The first agent receives from the fifth agent an unlock signature for a locked credential provided by a sixth agent to the second agent. The first agent transmits the unlock signature to the fourth agent.

A further method for transacting over a network is provided. The further method includes receiving by a first agent a first transaction from a second agent, the first transaction initiated by a third agent. The first agent transmits to a fourth agent a first verifiable proof. The first agent receives from the fourth agent a credential signature for a verifiable credential including one or more data points, the verifiable credential including the one or more data points provided by a fifth agent to the second agent for the first transaction. The credential signature is transmitted by the first agent to the second agent.

Another method for transacting over a network is provided in which a first agent transmits to a second agent a request to initiate a use of a service. The first agent receives from the second agent a request for one or more data points to initiate the use of the service. The first agent transmits to the second agent one or more requirements for fulfilling the one or more data points. The first agent receives from the second agent a digitally signed transaction including a digital signature. The first agent transmits to a third agent the digitally signed transaction. The first agent receives from the third agent an indication that a first verifiable proof for the digitally signed transaction was received, and the first agent transmits to the second agent a second verifiable proof, the second verifiable proof based on a verifiable credential including the one or more data points.

A system is provided for transacting over a network. The system includes a first agent and a second agent. The second agent is operable to transact with a third agent for use of a service. The third agent is enabled to communicate with a fourth agent. The first agent is operable to communicate with the second agent to facilitate the transacting by the second agent with the third agent for the use of the service. The first agent is further operable to communicate with the fourth agent to facilitate the transacting by the second agent with the third agent for the use of the service.

A further system is provided for transacting over a network. The further system includes a first agent and a second agent. The first agent is operable to receive a digitally signed transaction from the second agent, the digitally signed transaction received by the second agent from a third agent and including a digital signature. The first agent is also operable to receive from a fourth agent a first verifiable proof and transmit to a fifth agent the first verifiable proof. The first agent is further operable to receive from the fifth agent an unlock signature for a locked credential provided by a sixth agent to the second agent and transmit to the fourth agent the unlock signature. The second agent is operable to transmit to the third agent a request to initiate a use of a service and receive from the third agent a request for one or more data points to initiate the use of the service. The second agent is also operable to transmit to the third agent one or more requirements that fulfill the one or more data points and receive from the third agent the digitally signed transaction. The second agent is further operable to transmit to the third agent a second verifiable proof, the second verifiable proof based on the locked credential and including the one or more data points.

Another system is provided for transacting over a network, which system includes a first agent and a second agent. The first agent is operable to receive a first transaction and a second transaction from the second agent, the first transaction initiated by a third agent, the second transaction including identifying data of a fifth agent. The first agent is also operable to receive from the second agent an indication that a verifiable credential was received by the second agent, the verifiable credential including one or more data points provided by the fifth agent to the second agent for the first transaction. The first agent is further operable to transmit to a fourth agent a first verifiable proof based on the second transaction responsive to the receiving by the first agent from the second agent the indication that the verifiable credential was received by the second agent. The first agent is further operable to receive from the fourth agent a credential signature for the verifiable credential and transmit to the second agent the credential signature. The second agent is operable to transmit to the fifth agent a request for the verifiable credential, the request for the verifiable credential including the second transaction. The second agent is further operable to provide to the fifth agent entity-identifying information and receive from the fifth agent the verifiable credential.

Yet another system is provided for transacting over a network, which system includes a first agent and a third agent. The first agent is operable to transmit to a second agent a request to initiate a use of a service, receive from the second agent a request for one or more data points to initiate the use of the service, and transmit to the second agent one or more requirements for fulfilling the one or more data points. The first agent is further operable to receive from the second agent a digitally signed transaction including a digital signature and transmit to the third agent the digitally signed transaction. The first agent is further operable to receive from the third agent an indication that a first verifiable proof for the digitally signed transaction was received and transmit to the second agent a second verifiable proof, the second verifiable proof based on a verifiable credential including the one or more data points. The third agent is operable to receive from a fourth agent the first verifiable proof and transmit to the first agent the indication that the first verifiable proof for the digitally signed transaction was received.

Yet another method for transacting over a network is provided which includes transmitting by a second agent to a third agent a request to initiate a use of a service. The second agent receives from the third agent a request for one or more data points to initiate the use of the service and transmits a request to a sixth agent for a locked credential responsive to the request for the one or more data points from the third agent. The second agent receives the locked credential from the sixth agent and transmits to the third agent one or more requirements for fulfilling the one or more data points. The second agent receives from the third agent a digitally signed transaction including a digital signature. A first agent receives the digitally signed transaction from the second agent. The second agent transmits to the third agent a second verifiable proof, the second verifiable proof based on the locked credential and including the one or more data points. A fourth agent receives from the third agent the digitally signed transaction and the second verifiable proof. The first agent receives from the fourth agent a first verifiable proof and transmits to a fifth agent the first verifiable proof. The first agent receives from the fifth agent an unlock signature for the locked credential and transmits to the fourth agent the unlock signature. The fourth agent transmits to the third agent the unlock signature.

Still another method for transacting over a network is provided which includes transmitting by a second agent to a third agent a request to initiate a use of a service. The second agent receives from the third agent a request for one or more data points to initiate the use of the service. The second agent transmits to a fifth agent a request for a verifiable credential including the one or more data points, the request for the verifiable credential including a second transaction. A fourth agent receives from the fifth agent the second transaction. A first agent receives a first transaction from the second agent, the first transaction initiated by the third agent. The first agent receives from the second agent the second transaction, the second transaction including identifying data of the fifth agent. The second agent provides to the fifth agent entity-identifying information. The second agent receives from the fifth agent the verifiable credential including the one or more data points. The first agent receives from the second agent an indication that the verifiable credential was received by the second agent. The first agent transmits to the fourth agent a first verifiable proof based on the second transaction responsive to the receiving by the first agent from the second agent the indication that the verifiable credential was received by the second agent. A credential signature for the verifiable credential is transmitted by the fourth agent to the first agent based on the second transaction and the first verifiable proof. The first agent transmits to the second agent the credential signature. The second agent transmits to the third agent a second verifiable proof including the one or more data points based on the credential signature and the verifiable credential. A sixth agent receives from the third agent an indication that the second verifiable proof has been received by the third agent. The first agent receives from the sixth agent the indication that the second verifiable proof has been received by the third agent, and the first agent transmits to the second agent the indication that the second verifiable proof has been received by the third agent.

Still another system is provided for transacting over a network, the system including a first agent and a second agent. The second agent is operable to transact with a third agent for use of a network-enabled service based on a first transaction policy from a fourth agent, the third agent enabled to communicate with a fifth agent. The first agent is operable to communicate with the second agent to facilitate the transacting by the second agent with the third agent for the use of the network-enabled service based on the first transaction policy and communicate with the fifth agent to facilitate the transacting by the second agent with the third agent for the use of the network-enabled service.

Still another method is provided for transacting over a network. The method includes receiving by a first agent a digitally signed transaction from a second agent, the digitally signed transaction received by the second agent from a third agent and including a digital signature, and cryptographically verifying by the first agent the digitally signed transaction. The method also includes receiving by the first agent a first transaction policy from the second agent, the first transaction policy received by the second agent from a fourth agent. The method further includes receiving by the first agent from a fifth agent based on the first transaction policy a first transaction proof and transmitting by the first agent to a sixth agent the first transaction proof.

Still another method is provided for transacting over a network. The method includes receiving by a first agent a digitally signed transaction from a plurality of second agents, the digitally signed transaction received by the plurality of second agents from a third agent and including a digital signature. The method also includes cryptographically verifying by the first agent the digitally signed transaction and receiving by the first agent a first transaction policy from the plurality of second agents, the first transaction policy received by the plurality of second agents from a fourth agent. The method further includes receiving by a ninth agent from a fifth agent a plurality of transaction proofs based on the first transaction policy for the plurality of second agents, deidentifying by the ninth agent a source of the plurality of transaction proofs, and transmitting by the ninth agent the deidentified plurality of transaction proofs to a sixth agent.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

FIGS. 5A, 5B, 6A, 6B, and 7-11 show process flows and systems enabling transacting over a network via agents in a self-sovereign identity ("SSI") system environment.

Figure 12:
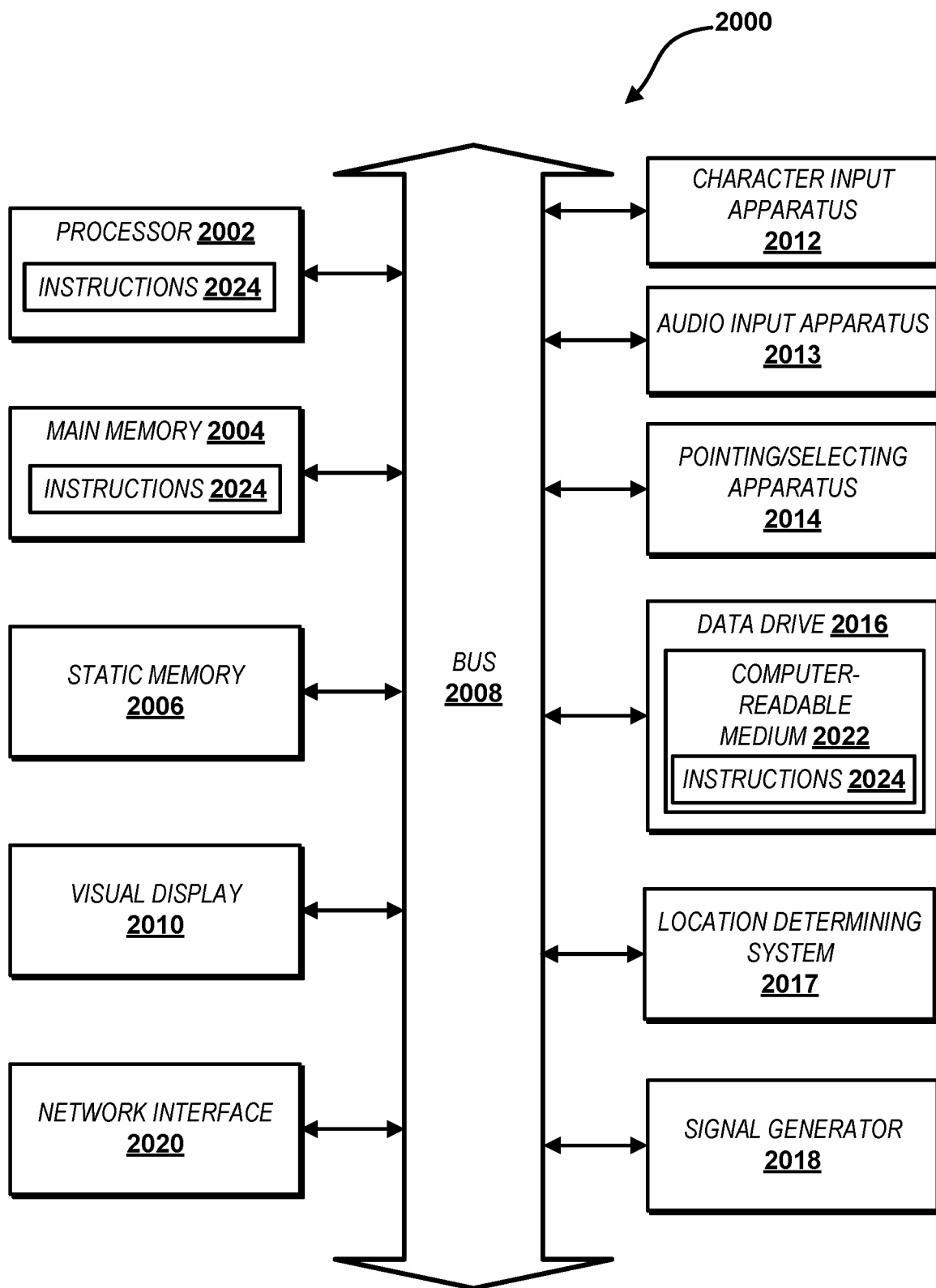

FIG. 12 shows a computer system for performing described methods according to illustrative embodiments.

DETAILED DESCRIPTION OF ILLUSTRATIVE EMBODIMENT(S)

There are limitations in current self-sovereign identity ("SSI") infrastructure models with respect to secure processing of transactions. It is desirable to track, log, and audit SSI transactions for security and monetization purposes. Described herein are systems and methods which introduce mechanisms to track and monetize the use of SSI infrastructure and services built on top of SSI infrastructure. Further described herein are systems that facilitate policy-enabled transactions on top of an SSI infrastructure incorporating machine-readable policy definitions, policy enforcement, and policy tracking. The herein described systems and methods do not require changes to core SSI infrastructure requirements including verifiable credentials and the structure and use of verifiable credentials within an SSI exchange.

In self-sovereign identity ("SSI") systems, establishing trust between entities is a multi-layered problem. Cryptographically verifiable credentials and the content of the cryptographically verifiable credentials are important in the establishment of trust. The content of a cryptographically verifiable credential codifies a "credential claim" including attributes of the credential, for example the credential holder's first name, last name, date of birth, credit card number, social security number, passport number, university transcript information, and professional credential information.

Terms set forth herein are described as follows:

An "issuer" is an entity issuing a verifiable credential or data artifact.

A "holder" is an entity that holds a verifiable credential or data artifact provided to them by issuer entities.

A "verifier" is an entity verifying a data artifact furnished by a holder as part of a transaction and a provider of a service a holder wishes to engage with.

A "contract" defines what data artifacts are required from a requesting entity of a service before a provider is willing to fulfill the service to the requesting entity.

An "agent" is an application component, executed on a computing system, operating on behalf of an entity (e.g., a user or organization) to transact for the entity.

A "transaction agent" is an application component, executed on a computing system, that provides capabilities to track, communicate, aggregate, and interface on transactions leveraging credentials.

A "transaction agent service provider system" is a system (e.g., software or hardware system) that hosts one or more transaction agents and one or more transaction ledgers on behalf of holders, issuers, or verifiers that choose to implement the system. A transaction agent service provider system can take on a different role for each of an issuer, a holder, and a verifier. A transaction agent service provider system can also be described as a "transaction agent provider," "payment infrastructure," or "platform provider."

A "payment agent" is a transaction agent that provides payment functions.

A "sponsor" is an entity that sponsors (e.g., pays for) the issuing of a verifiable credential, thus crediting a user. A sponsor can be entitled to receive the major portion of the verifier's payment for verification of the credential. A sponsor can be an independent entity, or the sponsor can be a role of an issuer, a role of a holder's transaction agent service provider system, or role of a verifier.

A "locked credential" is a verifiable credential ("VC") that may be shared by a holder, but it cannot be verified by a verifier without unlocking. The unlocking may be cryptographic (e.g., a verifier needs to receive a cryptographic key to unlock the content or part of the content of the credential) or may be policy based (e.g., a verifier's agent must adhere to the policy and only unlock the credential for verification after the procedural conditions are met—e.g., payment is confirmed).

An "unlocked credential" is a verifiable credential that can be shared by a holder, which has previously been acquired from an issuer, and can be used multiple times by the holder for use in transactions where the credential is required without having to pay the issuer or notify the issuer of such use.

A "co-protocol" is an interaction between two entities (e.g., holder, verifier, or issuer) within a payment scheme for an action that requires payment.

A "use case" is an example in the real-world of how users, consumers, and computers engage with services and service providers.

A "transaction scheme" or "payment scheme" is a sequence of exchanges between entities in a transaction agent system to accomplish a use case.

A "transaction" or "txn" represents an exchange between two parties, whether free or paid for, for example to engage in a service delivered by one party to another requesting party, for example a purchase order.

A "cryptographic system flow" is a system flow describing transaction data exchanges wherein protection provided by a system is cryptographically enforced. That is, a verifiable credential is not made available for use in a transaction without the cryptographic proofs necessary to validate the signature on the credential.

A "policy system flow" is a system flow describing transaction data exchanges wherein the protection provided by a system is enforced by policies that are defined and deployed across the system. That is, a verifiable credential is not made available for use in a transaction without verification that the credential complies with the policies agreed within the entities of the system.

A "network-enabled service" is one or more of the hosting or support of an application via a computer network (e.g., wide area network, local area network, or internet), the delivery of an application or components thereof via a computer network, or the updating of an application via a computer network.

"A "transaction policy" is one or more terms, one or more conditions, or one or more terms and one or more conditions for the exchange of data between computing systems over a computer network."

As described herein, reference to "first," "second," and "third," components (e.g., a "first agent," a "second agent")

or "particular" or "certain" components or implementations (e.g., a "particular user," a "certain user," a "particular computing device", a "particular implementation") is not used to show a serial or numerical limitation or a limitation of quality but instead is used to distinguish or identify the various components and implementations.

Some steps and elements in the Figures are shown in dashed line to indicate that they are optional or that they may be removed without precluding the functioning of the corresponding process or system. Notwithstanding, there exist steps or elements in the Figures that are shown in solid line that may also be optional or removed without precluding the functioning of the corresponding process or system.

Figure 1:
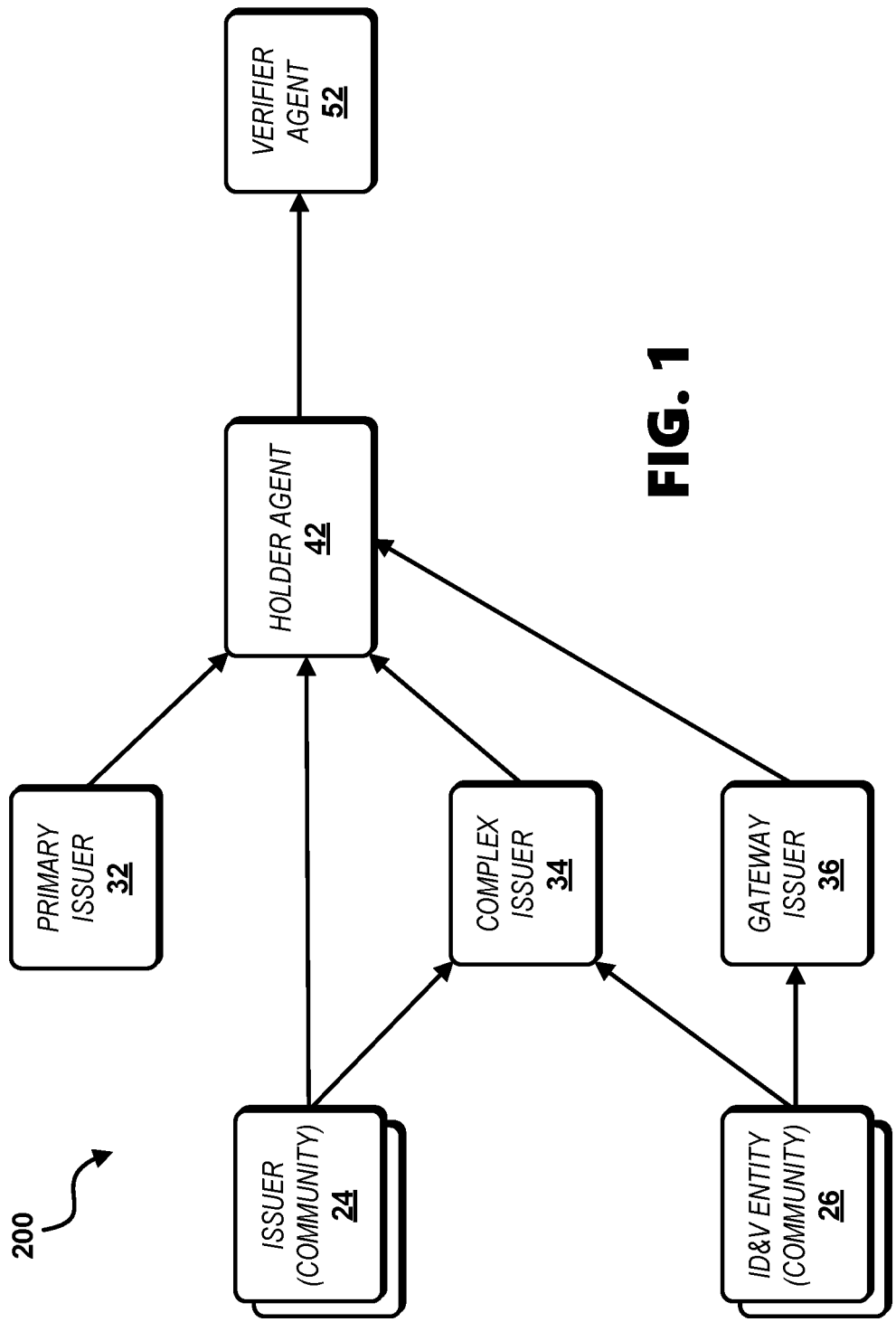
FIG. 1 shows a process flow and system in which data artifacts are provided by issuers to a holder agent and verified by a verifier agent.

Referring to FIG. 1, a process flow and system 200 enabled in a network environment is shown. Third-party data artifact issuers 24, for example a community of data artifact issuers 24, provide data artifacts (e.g., verifiable credentials) to a holder agent 42. The holder agent 42 can be provided in the form of a software agent including software encompassing a digital wallet holding issued data artifacts belonging to a user (i.e., "holder") of the holder agent 42, as well as software applications and network stack necessary to support the use of the digital wallet.

A primary issuer 32 is also enabled to provide data artifacts to the holder agent 42. A complex issuer 34 acts in partnership with other issuers including third-party data artifact issuers 24 and identification and verification ("ID&V") entities 26 in an ("ID&V community") to produce data artifacts for the holder agent 42. A gateway issuer 36 acts on behalf of the ID&V entities 26 to issue data artifacts to the holder agent 42. The primary issuer 32, complex issuer 34, and gateway issuer 36 are for example enabled by the same entity that enables a software agent forming the holder agent 42. A verifier agent 52 interfaces with the holder agent 42 to verify data artifacts.

Figure 2:
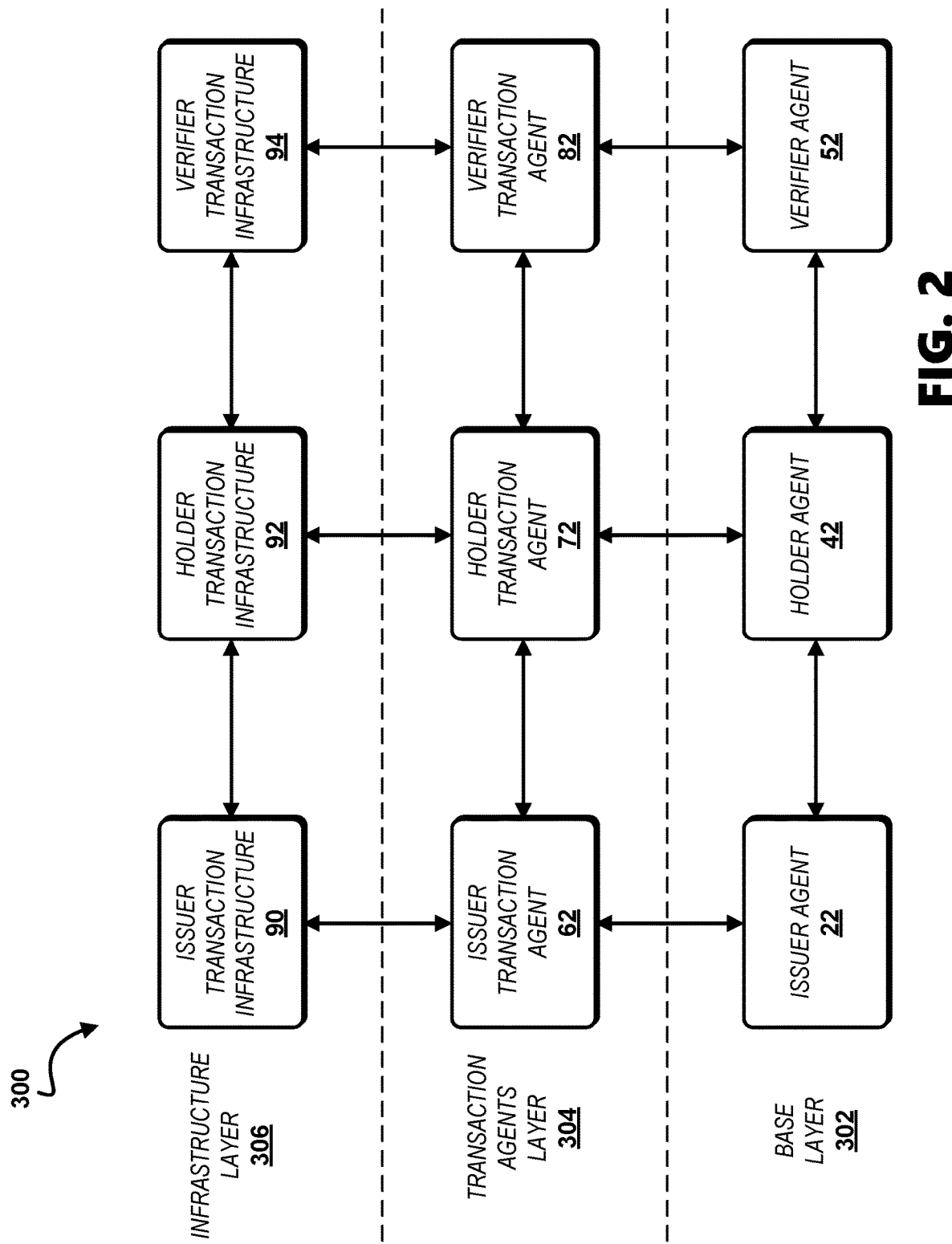
FIG. 2 shows a self-sovereign identity ("SSI") system and corresponding infrastructure layer, transaction agents layer, and base layer.

Referring to FIG. 2, a self-sovereign identity ("SSI") system 300 is provided. For privacy reasons, it is not desirable for a holder and issuer (e.g., via holder agent 42 and issuer agent 22) to communicate directly when implementing verifiable credentials. For purposes of illustration, if a driver license issued by a state's department of motor vehicles ("DMV") were a verifiable credential and was used by a holder to obtain access to various nightclubs, the holder may not want the DMV to be informed of their visits to the nightclubs in order to verify their driver license. The SSI system 300 supports a holder's privacy via a transaction layer 304 by allowing a holder via a holder agent 42 to use verifiable credentials (even locked credentials) without issuers of the credentials becoming aware of where the credentials are being used. The SSI system 300 further supports via the transaction layer 304 cryptographically tracking a proof of a transaction for example for the purpose of auditing and tracking payments associated with the transaction.

A base layer 302 defines base components of the SSI system 300. The transaction layer 304 defines components handling the processing of payments associated with transactions and includes an issuer transaction agent 62, a holder transaction agent 72, and a verifier transaction agent 82. An infrastructure layer 306 defines services necessary to support the base layer 302 and the transaction layer 304. The infrastructure layer includes issuer transaction infrastructure 90, holder transaction infrastructure 92, and verifier transaction infrastructure 94.

The base layer includes an issuer agent 22, which includes one or more of a third-party data artifact issuer 24, ID&V entity 26, primary issuer 32, complex issuer 34, or gateway issuer 36. The starting point of a transaction occurs when a holder corresponding to a holder agent 42 with an existing issued verifiable credential wants and attempts to use a verified service. A data flow between the holder agent 42, the verifier agent 52, and one or more of the transaction agents 62, 72, 82 follows on the basis of a per transaction payment.

Figure 3:
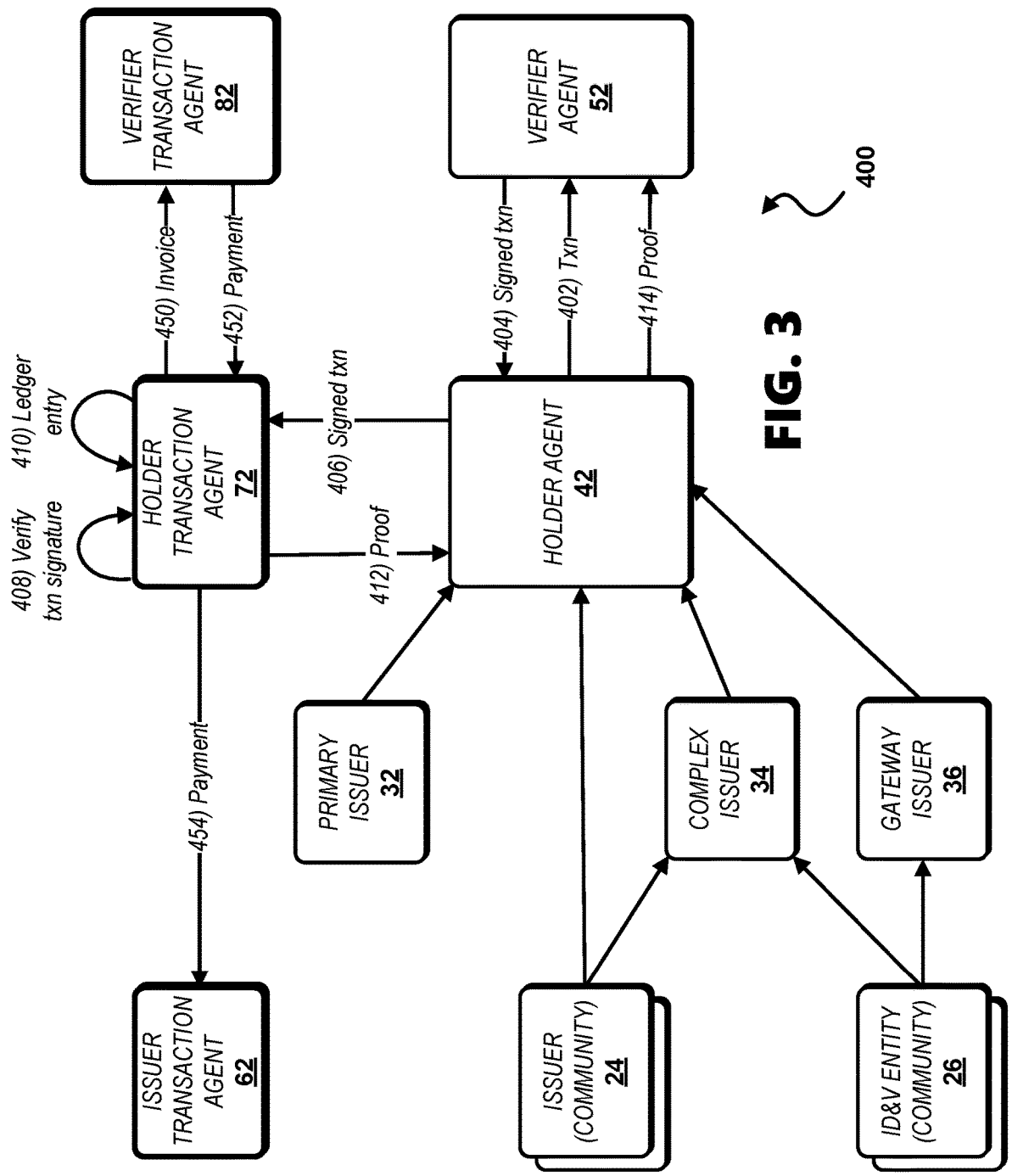
FIG. 3 shows a process flow and system in which data artifacts are provided by issuers to a holder agent and verified by a verifier agent with transactions facilitated by transaction agents.

A challenge to the SSI system 300 arises where providers of software and services enabling transactions or services via the SSI system 300 want to track, audit, and monetize the transactions or services, for example to enhance system security and usability and to protect privacy of a holder's use of credentials. Referring to FIGS. 2 and 3, as a solution to the challenge, the transaction agent architecture introduces three functional roles to the process flow and system 200 as set forth in the SSI system 300 to enable a process flow and system 400. The three functional roles include transaction agent roles enabled by the issuer transaction agent 62, holder transaction agent 72, and verifier transaction agent 82.

The issuer transaction agent 62 provides tracking of transactions that the issuer transaction agent 62 is engaged in, including monetization, back to the issuer agent 22 based on transactions of holders and verifiers (via holder agent 42 and verifier agent 52 respectively) without requiring the issuer (via issuer agent 22) to be involved in the transactions, wherein the issuer agent 22 can include one or more of the third-party data artifact issuer 24, ID&V entity 26, primary issuer 32, complex issuer 34, or gateway issuer 36. The holder transaction agent 72 provides tracking of transactions that the holder transaction agent 72 is engaged in, including monetization, occurring by the holder agent 42 (e.g., a software agent) back to the provider of services enabling the holder agent 42 (e.g., software agent services), for example a security services provider. The verifier transaction agent 82 provides monetization of the transactions to the verifier agent 52 including transaction invoicing and tracking services for transactions that the verifier transaction agent 82 is engaged in. The issuer transaction agent 62, holder transaction agent 72, and verifier transaction agent 82 maintain separate lines of communication and tracking to enable system security and usability and to protect privacy of a holder's use of credentials.

The process flow and system 400 includes a per transaction flow represented by steps 402 through 414. In the step 402, the holder agent 42 sends a transaction to the verifier agent 52 for example a transaction including a verifiable credential of the holder of the holder agent 42. The verifier agent 52 signs and returns the transaction to the holder agent 42 (step 404). The holder agent 42 sends the signed transaction to the holder transaction agent 72 (step 406). The holder transaction agent 72 verifies the signature, for example by application of a public key of the verifier agent 52 (step 408). The holder transaction agent 72 creates a transaction ledger entry (step 410). The holder transaction agent 72 sends back a proof for the transaction ("transaction proof") to the holder agent 42 (step 412). The holder agent 42 sends the transaction proof to the verifier agent 52 (step 414).

The process flow and system 400 further includes an asynchronous, in batch process flow and system represented by steps 450 through 454. In the step 450, the holder transaction agent 72 sends an invoice to the verifier transaction agent 82. The verifier transaction agent 82 send payment to the holder transaction agent 72 (step 452), and the holder transaction agent 72 pays the issuer transaction agent 62 (step 454).

Figure 4:
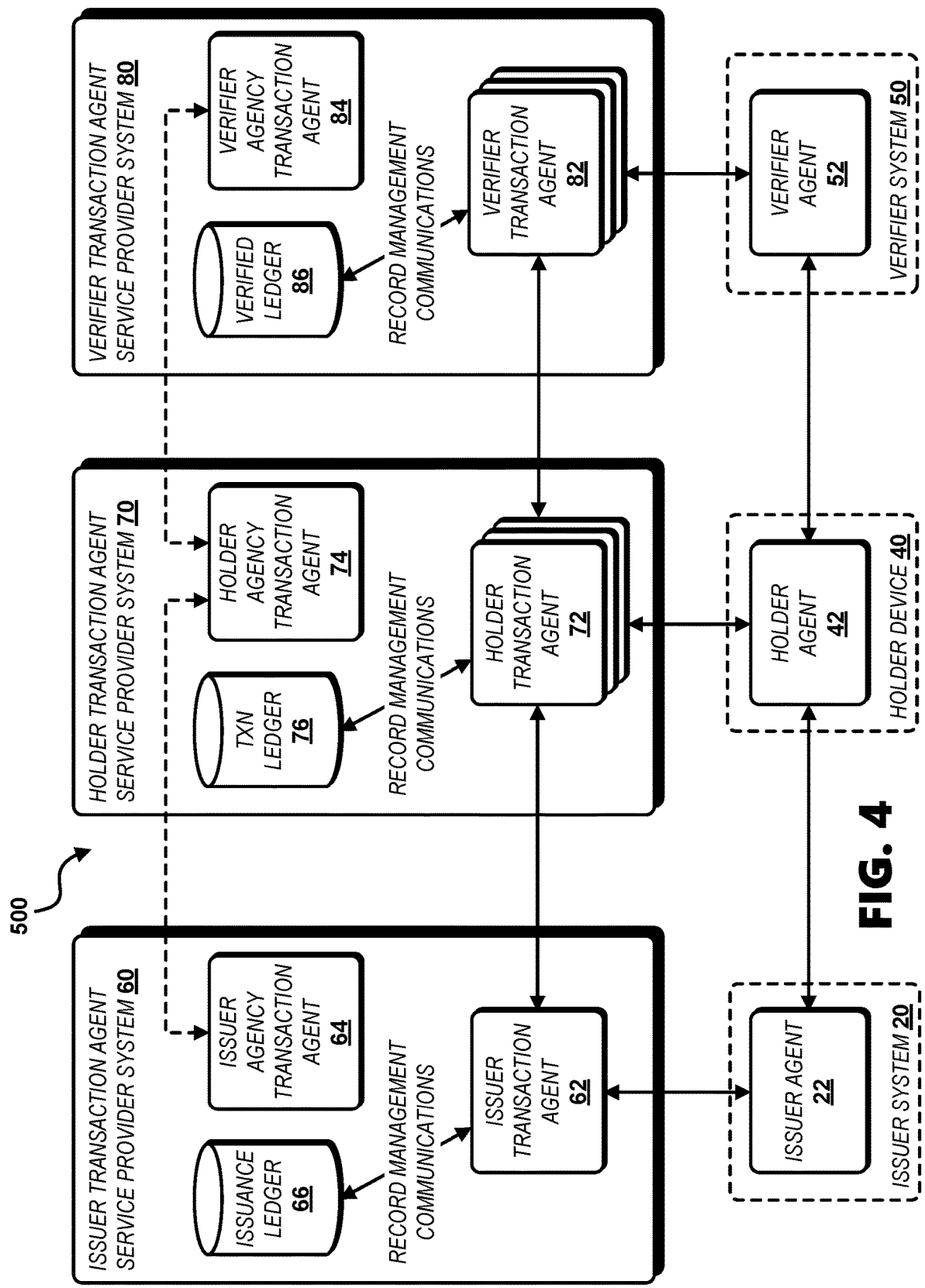
FIG. 4 is a diagram showing a transaction scheme system including systems that respectively enable issuer, holder, and verifier agents and respectively enable issuer, holder, and verifier transaction agents.

Referring to FIG. 4, an exemplary transaction scheme system 500 (e.g., a payment scheme system) in accordance with the SSI system 300 is provided. The transaction scheme system 500 enables cryptographically tracking a proof of a transaction for example for the purpose of auditing and tracking payments associated with the transaction. The transaction scheme system 500 enables a set of data flows between the issuer agent 22, holder agent 42, verifier agent 52, issuer transaction agent 62, holder transaction agent 72, and verifier transaction agent 82. The transaction scheme system 500 is operable in a computer network including one or more wired or wireless networks or a combination thereof, for example including a local area network (LAN), a wide area network (WAN), the internet, mobile telephone networks, and wireless data networks such as Wi-Fi™ and 3G/4G/5G cellular networks.

An issuer transaction agent service provider system 60 includes the issuer transaction agent 62 and an issuance ledger 66 for recording record management communications from the issuer transaction agent 62 and rendering record management communications accessible to the issuer transaction agent 62. The issuer transaction agent service provider system 60 further includes an issuer agency transaction agent 64 for transmitting and receiving agency-related communications.

A holder transaction agent service provider system 70 includes the holder transaction agent 72 and a transaction ledger 76 for recording record management communications from the holder transaction agent 72 and rendering record management communications accessible to the holder transaction agent 72. The holder transaction agent service provider system 70 further includes a holder agency transaction agent 74 for transmitting and receiving agency-related communications to and from the issuer agency transaction agent 64 and a verifier agency transaction agent 84.

A verifier transaction agent service provider system 80 includes the verifier transaction agent 82 and a verified ledger 86 for recording record management communications from the verifier transaction agent 82 and rendering record management communications accessible to the verifier transaction agent 82. The verifier transaction agent service provider system 80 further includes the verifier agency transaction agent 84 for transmitting and receiving agency-related communications to and from the holder agency transaction agent 74.

A network-connectable processor-enabled issuer system 20 enables the issuer agent 22. A network-connectable processor-enabled holder device 40 enables the holder agent 42. The holder agent 42 can be provided on the holder device 40 for example as a standalone application or a plugin, add-on, or extension to an existing application, for example a web browser plugin. A network-connectable processor-enabled verifier system 50 enables the verifier agent 52. The verifier agent 52 can be provided on the verifier system 50 for example as a standalone application or a plugin, add-on, or extension to an existing application, for example a web browser plugin.

The data flows enabled by the transaction scheme system 500 include those set forth below in Table 1.

TABLE 1

| Data Flow, Purpose | From | To |
|---|---|---|
| Bi-directional, issuance of verifiable credentials | Issuer agent 22 | Holder agent 42 |
| Bi-directional, issuance records management | Issuer agent 22 | Issuer transaction agent 62 |
| Bi-directional, use of verifiable credentials | Holder agent 42 | Verifier agent 52 |

TABLE 1-continued

| Data Flow, Purpose | From | To |
|---|---|---|
| Bi-directional, transaction records management | Holder agent 42 | Holder transaction agent 72 |
| Bi-directional, verification of verifiable credentials transactions | Verifier agent 52 | Verifier transaction agent 82 |
| Bi-directional, payment of issuer, payment of holder transactions | Verifier transaction agent 82 | Holder transaction agent 72 |
| Bi-directional, payment of verifier, payment of holder transactions | Issuer transaction agent 62 | Holder transaction agent 72 |

Herein a set of co-protocols are defined that will take place, as part of payment schemes within a transaction agent system including the SSI system 300. The described co-protocols track and monetize use of verifiable credentials while using the SSI system 300 in multiple scenarios. The described co-protocols support real-time tracking of transactions where verifiable credentials are used regardless of the cost or payment necessary to support those transactions. Co-protocols can be categorized as either a credential payment category or service payment category.

A credential payment category is where payment occurs during or post-use of a transaction credential. A service payment category is where payment occurs during, or post-use of a service engaged in by a holder from a service provider. It is assumed that the verifier does not get paid to participate in using the SSI infrastructure, except for specific service delivery use cases as described below. For credential payment category use cases, the benefits to the verifier include better quality data, reduced costs of data acquisition, and lower friction to transactions.

In an exemplary first co-protocol corresponding to a credential payment category, a holder agent 42 requests a verifiable credential from an issuer agent 22 and the issuer agent 22 requires payment prior to issuance. In the first co-protocol, the holder of the holder agent 42 is the payer and the issuer agent 22 is the payee. For example, a holder (e.g., consumer) implementing the holder agent 42 wants to use a service on the internet that requires a particular verifiable credential from an issuer implementing the issuer agent 22, and the holder must pay to get the verifiable credential prior to initiating the transaction with the service, wherein the service implements a verifier agent 52.

In an exemplary second co-protocol corresponding to a credential payment category, a holder agent 42 requests a service as part of a transaction that requires a verifiable credential, and an issuer agent 22 requires payment prior to the issuer agent 22 providing an unlock signature allowing a verifier agent 52 implemented by the service to make use of the verifiable credential. In the second co-protocol, the verifier of the verifier agent 52 is the payer, and the issuer agent 22 is the payee. For example, a subscription media streaming service (e.g., Netflix™) implementing the verifier agent 52 pays the issuer agent 22 which provides credential information of a consumer (the holder of the holder agent 42) used as part of a subscription sign up process.

In an exemplary third co-protocol corresponding to a credential payment category, a service is used by a holder of a holder agent 42 in a transaction with a verifier of a verifier agent 52 that requires a verifiable credential, and a system provider of the holder agent 42 requires payment for using the SSI system 300 as part of the transaction. In the third co-protocol, the verifier of the verifier agent 52 is the payer and the system provider of the holder agent 42 is the payee. For example, a credit card company system provides a service to a holder (e.g., a consumer) of the holder agent 42 and the credit card company system receives payment from a verifier (e.g., a product or service vendor) of the verifier agent 52.

In an exemplary fourth co-protocol corresponding to a credential payment category, a service is used by a holder of a holder agent 42 in a transaction with a verifier of a verifier agent 52 that requires a verifiable credential that the holder agent 42 already possesses, and the holder receives payment from the verifier for providing the verifiable credential. In the fourth co-protocol, the verifier of the verifier agent 52 is the payer and the holder of the holder agent 42 is the payee. For example, the holder can be a loyalty program purchaser where the verifier (e.g., loyalty program administrator) pays the holder for providing a verifiable credential as part of a verified purchased transaction under the loyalty program.

In an exemplary fifth co-protocol corresponding to a service payment category, a service provided by a verifier of the verifier agent 52 is used by the holder of the holder agent 42, and the holder wants to pay for the service using the same transaction tracking mechanism that is used for credential tracking but instead is used for service tracking. In the fifth co-protocol, the holder of the holder agent 42 (e.g., buyer) is the payer and the verifier of the verifier agent 52 (e.g., seller) is the payee. For example, a holder of a holder agent 42 (e.g., consumer) has subscribed to a subscription media streaming service (e.g., Netflix™) and wants to pay for the subscription media streaming service using a transaction agent system including the SSI system 300.

In an exemplary sixth co-protocol corresponding to a service payment category, a service provided by a verifier of the verifier agent 52 is used by the holder of the holder agent 42. The service allows different payment mechanisms supported by the verifier, while the holder wants to be to choose which payment method is their preferred method during a specific transaction between the holder and verifier. In the sixth co-protocol, the holder of the holder agent 42 (e.g., buyer) is the payer and the verifier of the verifier agent 52 (e.g., seller) is the payee. For example, a holder of a holder agent 42 (e.g., consumer) has subscribed to a subscription media streaming service (e.g., Netflix™) and wants to pay for the subscription media streaming service using a third-party payment service (e.g., PayPal™) instead of a credit card while using the same transaction agent system (e.g., the SSI system 300) as was used for establishing the subscription.

In an exemplary seventh co-protocol corresponding to a credential payment category, the holder agent 42 requests a verifiable credential from an issuer agent 22 and the issuer agent 22 requires payment prior to issuance. In the seventh co-protocol, a sponsor of the holder of the holder agent 42 is the payer and the issuer agent 22 is the payee.

Various payment schemes are supported by the transaction agents system including the SSI system 300. Described payment schemes rely on the same architectural components included in the SSI system 300 and highlight how the architectural components interact with each other as part of a transaction to support various co-protocols that may be combined to support a payment scheme.

Three exemplary payment schemes are summarized in Table 2.

TABLE 2

| Payment Scheme | Description | Payer | Payee | Frequency |
| --- | --- | --- | --- | --- |
| 1st | Verifier pays issuer per verification for a locked credential | Verifier | Issuer | Per verification |
| 2nd | Holder pays issuer per issuance for a verifiable credential | Holder | Issuer | Per issuance |
| 3rd | Verifier pays holder per transaction for a verifiable credential | Verifier | Holder | Per verification |

In the exemplary payment schemes of Table 2 there are two scenarios described. The first scenario describes how the payment scheme supports a new verifiable credential being established, and the second scenario describes how subsequent transactions leverage an existing verifiable credential, locked or unlocked. In the case of the third payment scheme, a new verifiable credential payment would occur using the second payment scheme before proceeding with the third payment scheme. Beneficial pre-conditions for the first, second, and third payment schemes include: that the issuer agent 22, holder agent 42, and verifier agent 52 exist and support SSI infrastructure of an SSI system 300, and that transaction infrastructure including transaction agents 62, 72, 82 exists.

Following are four exemplary use cases defined to help highlight the relative pros and cons of each payment scheme of Table 2. A first use case includes providing identity proof for online service sign up. A second use case includes providing a proof of education certificate for an employment application. A third use case includes providing a proof of age to gain access to a social club. A fourth use case includes providing a proof of certified buyer of a particular product when a user (i.e., buyer) writes a product/service review.

Figure 5A:
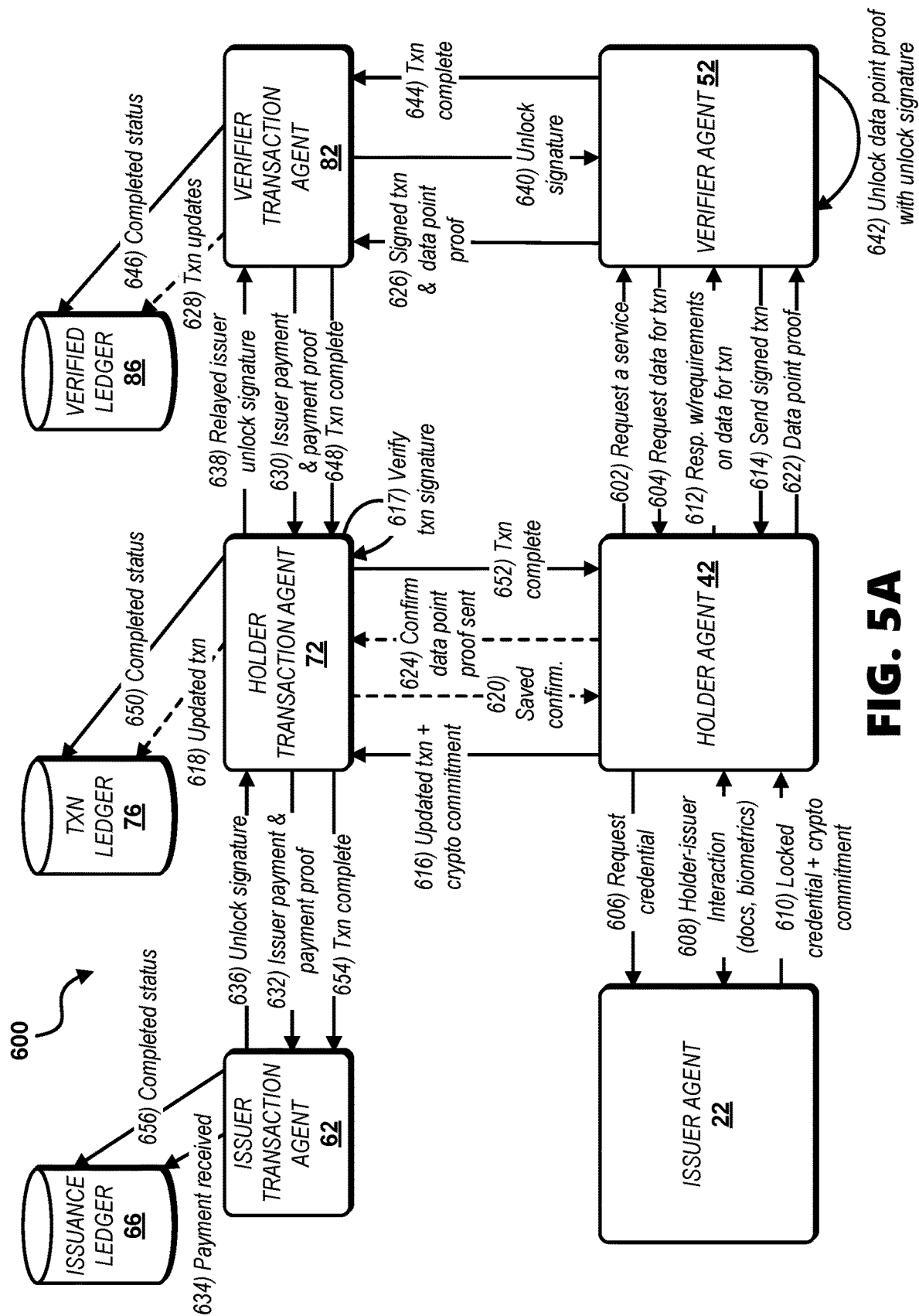
Figure 5B:
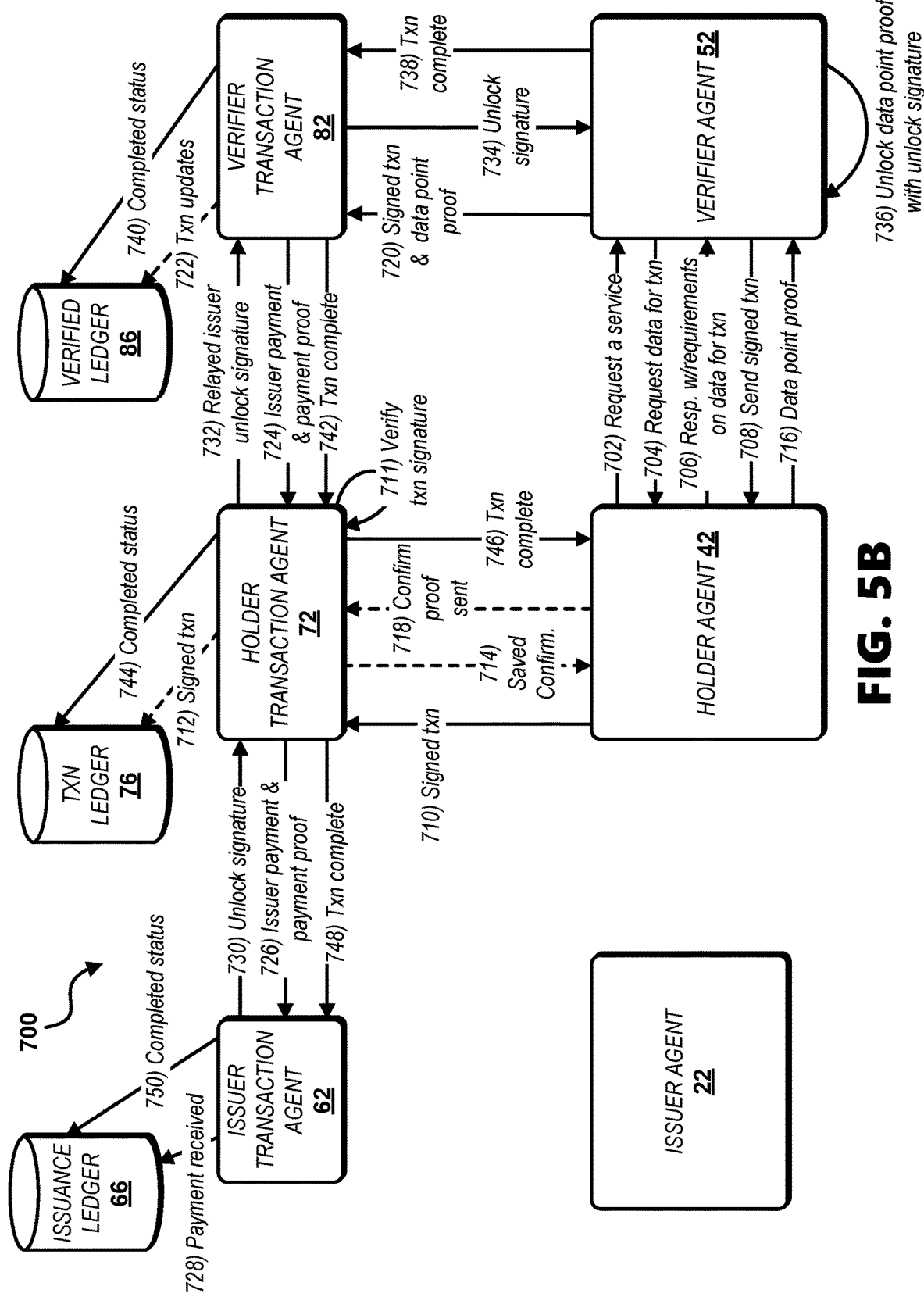

In the first payment scheme in Table 2, the verifier pays the issuer per verification for a locked credential. The first payment scheme implements transaction agents in the verification of credential processes. Payment terms of the first payment scheme include a requirement to pay per verification of a transaction. Referring to FIGS. 5A and 5B, two exemplary scenarios where the first payment scheme applies are respectively represented by the process flow and system 600 and the process flow and system 700. In the process flow and system 600 of FIG. 5A, a new verifiable credential is required from an issuer agent 22. Pre-conditions of the process flow and system 600 include a requirement that no prior verifiable credential be held by the holder agent 42. In the process flow and system 700 of FIG. 5B, the holder agent 42 already possesses a verifiable credential previously received from an issuer agent 22.

The process flows and systems 600, 700 enable methods for transacting over a network by a plurality of agents including a first agent, second agent, third agent, fourth agent, fifth agent, and sixth agent. As described with respect to the process flow and system 600 and process flow and system 700, the first agent is depicted as a holder transaction agent 72, the second agent is depicted as a holder agent 42, the third agent is depicted as a verifier agent 52, the fourth agent is depicted as a verifier transaction agent 82, the fifth agent is depicted as an issuer transaction agent 62, and the sixth agent is depicted as an issuer agent 22. The depictions of the plurality of agents with respect to the process flows and systems 600, 700 are exemplary in nature, and the process flows and systems 600, 700 are not limited by the particular naming of each agent.

Referring to FIG. 5A, the process flow and system 600 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 602). The verifier agent 52 specifies to the holder agent 42 which one or more data points such as attributes (e.g., attributes of a verifiable credential) for the transaction are required in a request for data for the transaction (e.g., a presentation request) (step 604), the one or more data points for example defining terms for the transaction (e.g., a contract) analogous to contract terms. Data points can include for example one or more of a holder's first name, last name, date of birth, credit card number, social security number, or passport number. The holder agent 42 requests a verifiable credential from the issuer agent 22 (i.e., the sixth agent) responsive to the request for data from the verifier agent 52 (step 606). The holder agent 42 does not need to disclose the identity of the verifier agent 52 in its request to the issuer agent 22, but the holder agent 42 can present the data points required by the verifier agent 52.

The holder agent 42 and issuer agent 22 interact (step 608) in order to satisfy conditions that need to be met for the issuer agent 22 to be able to issue the requested verifiable credential based on the use case, type of credential, and assurance level. For example, for a know-your-client ("KYC") type verifiable credential, the holder of the holder agent 42 may be required to present their driver license or other identification on camera alongside their face. The issuer agent 22 sends to the holder agent 42 a locked credential (i.e., a verifiable credential that is locked) of the holder and a crypto commitment (step 610), information that will allow a transaction agent to pay a fee for verification. The crypto commitment is related to the locked credential and includes information for the verifier agent 52 to use to contact the issuer agent 22. The crypto commitment can be provided as a partial signature for the locked credential guaranteeing the locked credential is usable by the holder agent 42 and enabling the verifier agent 52 to verify the locked credential after a payment or other requirement is completed via the verifier transaction agent 82. The crypto commitment can include cost and payment information regarding the cost of the locked credential.

The holder agent 42 transmits a response to the verifier agent 52 (e.g., a response to a presentation request) including one or more requirements on the data requested by the verifier agent 52 for fulfilling one or more data points for the transaction (e.g., a contract) to be initiated (step 612). The one or more requirements provided by the holder agent 42 include for example one or more of price, a service level agreement ("SLA"), or policies for the data requested. If the one or more requirements are acceptable to the verifier agent 52, the verifier agent 52 responds by updating the transaction to generate a signed transaction that confirms that the one or more requirements are acceptable, and the verifier agent 52 transmits a response to the holder agent 42 including the signed transaction (step 614). The signed transaction includes data of the issuer agent 22 (e.g., digital identity of the issuer agent 22).

The signed (i.e., "updated") transaction obtained by the holder agent 42 from the verifier agent 52 in step 614, including data of the issuer agent 22 (e.g., digital identity of the issuer agent 22), and the crypto commitment obtained by the holder agent 42 from the issuer agent 22 in step 610 are sent by the holder agent 42 to the holder transaction agent 72 (i.e., the first agent) (step 616). The holder transaction agent 72 beneficially verifies the signature of the signed transaction, for example by applying a public key associated with the verifier agent 52 (step 617). The signed (i.e., "updated") transaction received by the holder transaction agent 72 from the holder agent 42 in the step 616 is written to the transaction ledger 76 by the holder transaction agent 72 (step 618). Confirmation of storing of the signed transaction on the transaction ledger 76 is transmitted by the holder transaction agent 72 to the holder agent 42 (step 620). The holder agent 42 sends the verifier agent 52 a locked verifiable proof, based on the locked credential (e.g., including the locked credential), including the one or more data points requested by the verifier agent 52 ("data point proof") (step 622). The data point proof includes a presentation of the requested one or more data points and one or more locked proofs associated with the requested one or more data points.

The holder agent 42 confirms to the holder transaction agent 72 the fact that the verifier agent 52 was sent the data point proof (step 624), thus unblocking the payment part of the transaction by action of the holder transaction agent 72. The verifier agent 52 sends to the verifier transaction agent 82 (i.e., the fourth agent) the signed transaction and the data point proof received from the holder agent 42 (step 626).

The verifier transaction agent 82 saves the signed transaction and the data point proof to a verified ledger 86 (step 628) to trigger payment initiation. The verifier transaction agent 82 sends payment and proof of the payment for the issuer agent 22 to the holder transaction agent 72 (step 630). The holder transaction agent 72 deidentifies the payment and proof of the payment, and the payment and proof of the payment for the issuer agent 22 ("payment proof"), which does not disclose the payer's identity, is relayed to the issuer transaction agent 62 (i.e., the fifth agent) by the holder transaction agent 72 (step 632). The issuer transaction agent 62 saves the payment proof to the issuance ledger 66 (step 634) so that an unlock signature for the locked credential as associated with the data point proof can be sent back to the verifier agent 52 via the holder transaction agent 72 and verifier transaction agent 82.

The issuer transaction agent 62 sends to the holder transaction agent 72 the unlock signature for the locked credential associated with the data point proof associated with the signed transaction (step 636) for relay to the verifier agent 52. The holder transaction agent 72 relays the unlock signature received from the issuer transaction agent 62 for the locked credential to the verifier transaction agent 82 (step 638). The verifier transaction agent 82 sends to the verifier agent 52 the unlock signature received from the holder transaction agent 72 for the locked credential to unlock the data point proof associated with the signed transaction (step 640). The verifier agent 52 subsequently unlocks the data point proof received from the holder agent 42 for the signed transaction using the unlock signature for the locked credential (step 642).

The verifier agent 52 sends notification to the verifier transaction agent 82 that the transaction has completed successfully (step 644) so that the verifier transaction agent 82 can relay the completed status, and so that the verifier transaction agent 82 can update the verified ledger 86 with the completed status. The verifier transaction agent 82 updates the verified ledger 86 with the completed status (step 646). The verifier transaction agent 82 notifies the holder transaction agent 72 that the transaction has been completed (step 648). The holder transaction agent 72 then updates the transaction ledger 76 with the completed status (step 650).

The holder transaction agent 72 notifies the holder agent 42 that the transaction has been completed (step 652), and the holder agent 42 may choose to show any updates to a user or system. The holder transaction agent 72 notifies the issuer transaction agent 62 that the transaction has been completed (step 654), and the issuer transaction agent 62 updates the issuance ledger 66 with the completed status (step 656).

Steps 618, 620, 624, and 628 provide additional levels of completeness that ensure that the SSI system 300 can detect issues and/or show progress throughout the flow sequence of the process flow and system 600. A system implementation may choose to skip one or more of steps 618, 620, 624, and 628 for optimization purposes without losing the overall resultant exchange of a transaction.

Referring to FIG. 5B, the process flow and system 700 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 702). The verifier agent 52 specifies to the holder agent 42 which one or more data points such as attributes (e.g., attributes of a verifiable credential) for the transaction are required in a request for data for the transaction (e.g., a presentation request) (step 704), the one or more data points for example defining terms for the transaction (e.g., a contract) analogous to contract terms. Data points can include for example one or more of a holder's first name, last name, date of birth, credit card number, social security number, or passport number.

The holder agent 42 transmits a response to the verifier agent 52 (e.g., a response to a presentation request) including one or more requirements on the data requested by the verifier agent 52 for fulfilling the one or more data points for the transaction (e.g., contract) to be initiated (step 706). The one or more requirements provided by the holder agent 42 include for example one or more of price, a service level agreement ("SLA"), or policies for the data requested. If the one or more requirements are acceptable to the verifier agent 52, the verifier agent 52 responds by updating the transaction to generate a signed transaction that confirms that the one or more requirements are acceptable, and the verifier agent 52 transmits a response to the holder agent 42 including the signed transaction (step 708). The signed transaction includes data of the issuer agent 22 (e.g., digital identity of the issuer agent 22).

The signed (i.e., "updated") transaction obtained by the holder agent 42 from the verifier agent 52 in step 708, including data of the issuer agent 22 (e.g., digital identity of the issuer agent 22), and a crypto commitment obtained from the issuer agent 22 at an earlier time is sent by the holder agent 42 to the holder transaction agent 72 (step 710). The holder transaction agent 72 beneficially verifies the signature of the signed transaction, for example by applying a public key associated with the verifier agent 52 (step 711). The signed (i.e., "updated") transaction received by the holder transaction agent 72 from the holder agent 42 in the step 710 is written to the transaction ledger 76 by the holder transaction agent 72 (step 712). Confirmation of storing of the signed transaction on the transaction ledger 76 is transmitted by the holder transaction agent 72 to the holder agent 42 (step 714). The holder agent 42 sends the verifier agent 52 a locked verifiable proof, based on the locked credential (e.g., including the locked credential), including the one or more data points requested by the verifier agent 52 ("data point proof") (step 716). The data point proof includes presentation of the requested one or more data points and locked proofs associated with the requested datapoints.

The holder agent 42 confirms to the holder transaction agent 72 the fact that the verifier agent 52 was sent the data point proof (step 718), thus unblocking the payment part of the transaction by action of the holder transaction agent 72. The verifier agent 52 sends to the verifier transaction agent 82 (i.e., the fourth agent) the signed transaction and the data point proof received from the holder agent 42 (step 720).

The verifier transaction agent 82 saves the signed transaction and the data point proof to a verified ledger 86 (step 722) to trigger payment initiation. The verifier transaction agent 82 sends payment and proof of the payment for the issuer agent 22 to the holder transaction agent 72 (step 724). The holder transaction agent 72 deidentifies the payment and proof of the payment, and the payment and proof of the payment for the issuer agent 22 ("payment proof"), which does not disclose the payer's identity, is relayed to the issuer transaction agent 62 by the holder transaction agent 72 (step 726). The issuer transaction agent 62 saves the payment proof to the issuance ledger 66 (step 728) so that an unlock signature for the locked credential as associated with the data point proof can be sent back to the verifier agent 52 via the holder transaction agent 72 and verifier transaction agent 82.

The issuer transaction agent 62 sends to the holder transaction agent 72 the unlock signature for the locked credential associated with the data point proof associated with the signed transaction (step 730) for relay to the verifier agent 52. The holder transaction agent 72 relays the unlock signature received from the issuer transaction agent 62 for the locked credential to the verifier transaction agent 82 (step 732). The verifier transaction agent 82 sends to the verifier agent 52 the unlock signature received from the holder transaction agent 72 for the locked credential to unlock the data point proof associated with the signed transaction (step 734). The verifier agent 52 subsequently unlocks the data point proof received from the holder agent 42 for the signed transaction using the unlock signature for the locked credential (step 736).

The verifier agent 52 sends notification to the verifier transaction agent 82 that the transaction has completed successfully (step 738) so that the verifier transaction agent 82 can relay the completed status, and so that the verifier transaction agent 82 can update the verified ledger 86 with the completed status. The verifier transaction agent 82 updates the verified ledger 86 with the completed status (step 740). The verifier transaction agent 82 notifies the holder transaction agent 72 that the transaction has been completed (step 742). The holder transaction agent 72 then updates the transaction ledger 76 with the completed status (step 744).

The holder transaction agent 72 notifies the holder agent 42 that the transaction has been completed (step 746), and the holder agent 42 may choose to show any updates to a user or system. The holder transaction agent 72 notifies the issuer transaction agent 62 that the transaction has been completed (step 748), and the issuer transaction agent 62 updates the issuance ledger 66 with the completed status (step 750).

Steps 712, 714, 718, and 722 provide additional levels of completeness that ensure that the SSI system 300 can detect issues and/or show progress throughout the flow sequence of the process flow and system 700. A system implementation may choose to skip one or more of steps 712, 714, 718, and 722 for optimization purposes without losing the overall resultant exchange of a transaction.

The scenarios represented by the process flows and systems 600, 700 enable the second co-protocol and the third co-protocol as described above. In the second co-protocol, the holder agent 42 requests a service as part of a transaction that requires a verifiable credential, and the issuer agent 22 requires payment prior to the issuer agent 22 providing an unlock signature allowing the verifier agent 52 to make use of the verifiable credential. In the second co-protocol, the verifier of the verifier agent 52 is the payer and the issuer agent 22 is the payee. In the third co-protocol, a service is used by a holder of a holder agent 42 in a transaction with a verifier of a verifier agent 52 that requires a verifiable credential, and a system provider of the holder agent 42 requires payment for using the SSI system 300 as part of the transaction. In the third co-protocol, the verifier of the verifier agent 52 is the payer and the system provider of the holder agent 42 is the payee.

The scenarios represented by the process flows and systems 600, 700 are particularly suited for application in support of the herein described first use case which includes providing identity proof for online service sign up. The scenarios represented by the process flows and systems 600, 700 are further suited for application in support of the herein described fourth use case including providing a proof of certified buyer of a particular product when a user (i.e., buyer) writes a product/service review. With regard to the fourth use case, the issuer agent 22 may be motivated not to allow certain incident response platforms ("IRPs") to be able to verify the verifiable credential (e.g., if the IRPs publish bad reviews). Alternatively, other use cases can be supported by the scenarios represented by the process flows and systems 600, 700.

Figure 6A:
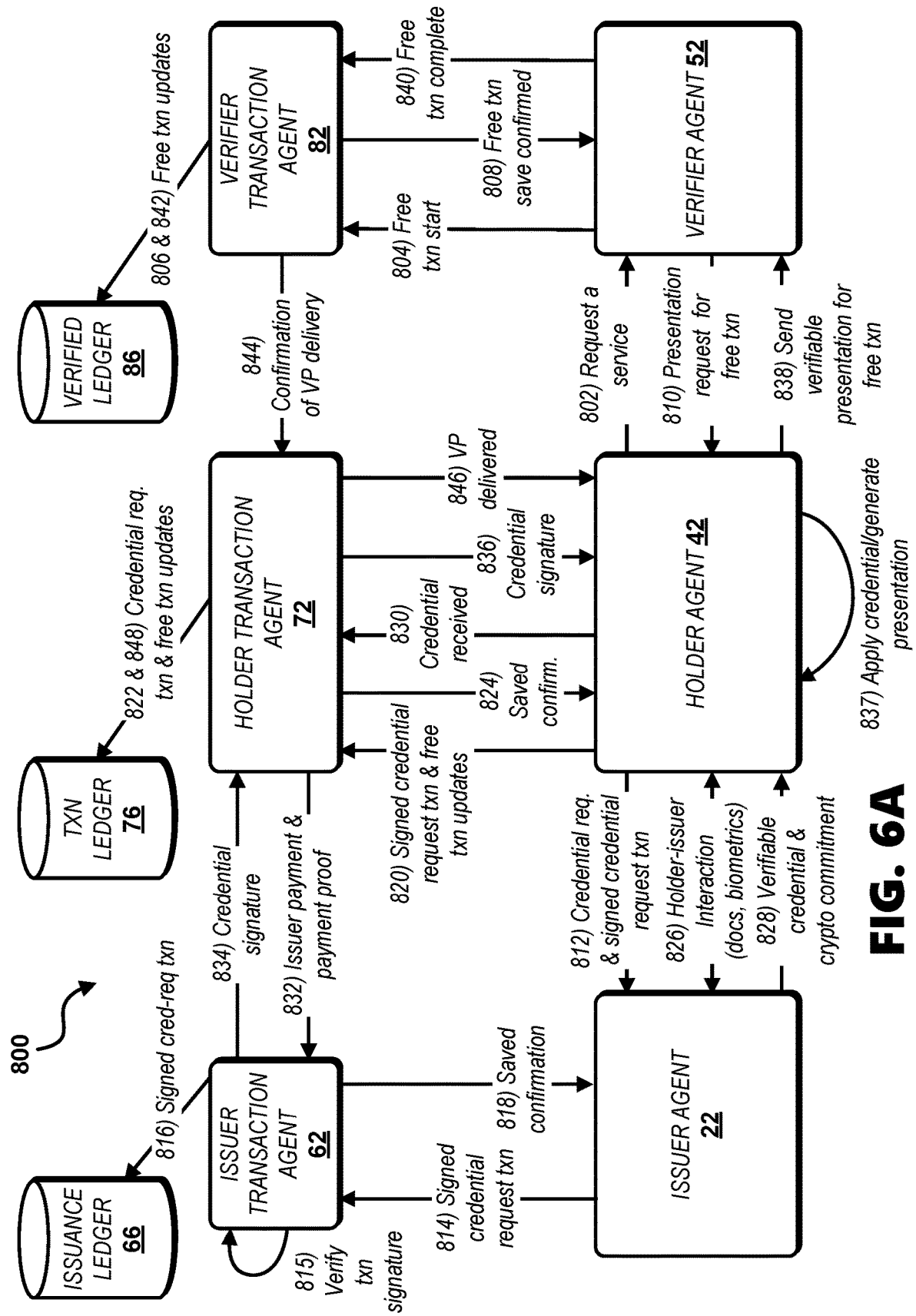
Figure 6B:
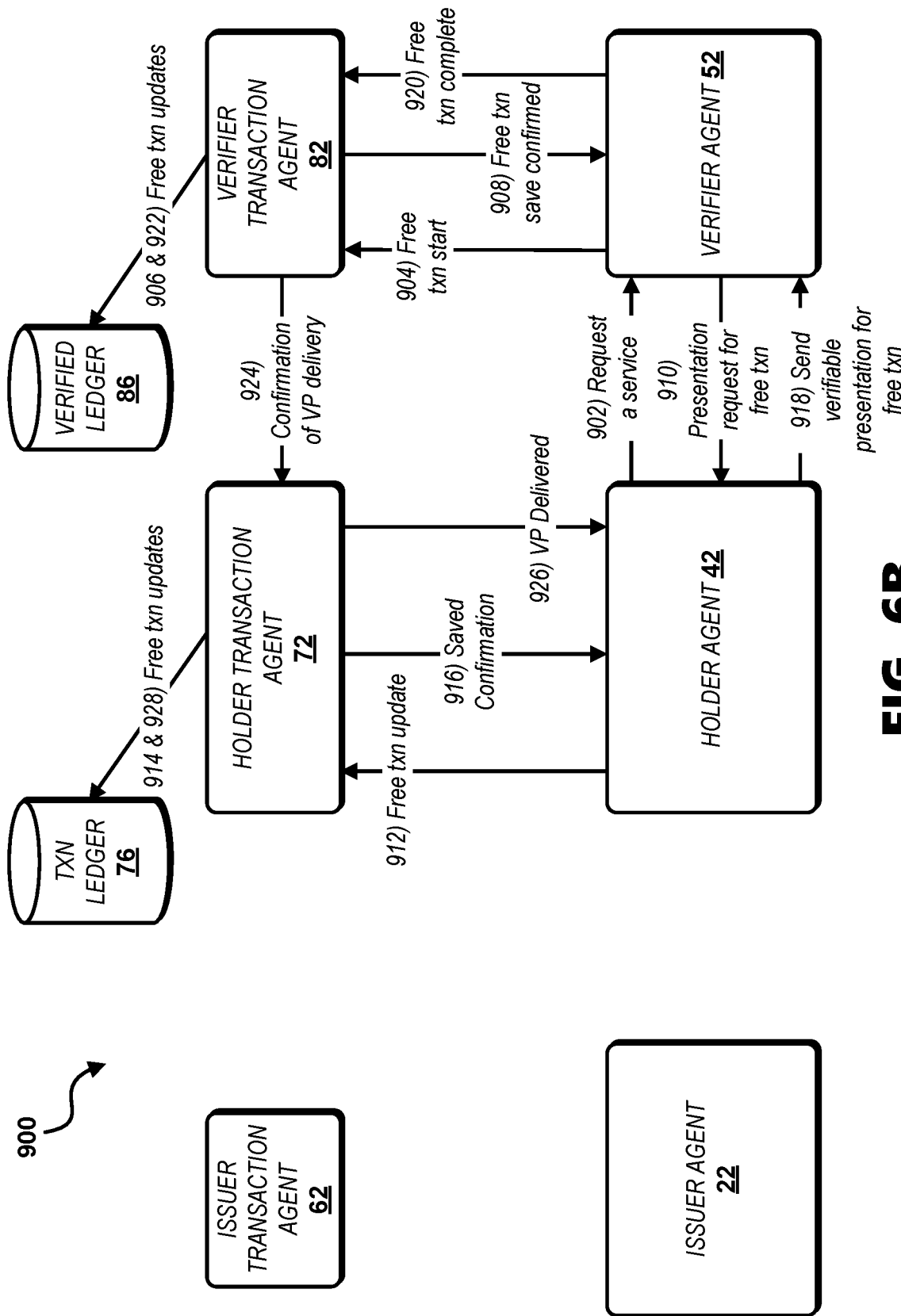

In the second payment scheme in Table 2, a holder pays an issuer per issuance for a verifiable credential. The second payment scheme implements transaction agents in the performance of credential processes. Payment terms of the second payment scheme include a requirement to pay per issuance of verifiable credentials used within a transaction. Referring to FIGS. 6A and 6B, two exemplary scenarios where the second payment scheme applies are respectively represented by the process flow and system 800 and the process flow and system 900. In the process flow and system 800 of FIG. 6A, a new verifiable credential is required from an issuer agent 22. Pre-conditions of the first process flow and system 800 include a requirement that no prior verifiable credential be held by the holder. In the process flow and system 900 of FIG. 6B, the holder agent 42 already possesses a verifiable credential previously received from the issuer agent 22.

The process flows and systems 800, 900 enable methods for transacting over a network by a plurality of agents including a first agent, second agent, third agent, fourth agent, fifth agent, and sixth agent. As described with respect to the process flow and system 800 and process flow and system 900, the first agent is depicted as a holder transaction agent 72, the second agent is depicted as a holder agent 42, the third agent is depicted as a verifier agent 52, the fourth agent is depicted as an issuer transaction agent 62, the fifth agent is depicted as an issuer agent 22, and the sixth agent is depicted as a verifier transaction agent 82. The depictions of the plurality of agents with respect to the process flows and systems 800, 900 are exemplary in nature, and the process flows and systems 800, 900 are not limited by the particular naming of each agent.

Referring to FIG. 6A, the process flow and system 800 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 802). The verifier agent 52 initiates a new transaction not subject to issuer-imposed or holder-imposed cost (hereinafter "free transaction") by sending a start notification to the verifier transaction agent 82 (i.e., the sixth agent) (step 804). The verifier transaction agent 82 saves the notification of the free transaction in the verified ledger 86 in the form of a transaction update (step 806).

The verifier transaction agent 82 notifies the verifier agent 52 that the free transaction has successfully been saved to the verified ledger 86 to allow the verifier agent 52 to begin processing a presentation request (step 808). The verifier agent 52 specifies to the holder agent 42, in a presentation request for the free transaction, one or more data points (e.g., attributes of a verifiable credential) which are required, the presentation request defining terms for the free transaction, the free transaction for example being analogous to a contract (step 810). The holder agent 42 requests a verifiable credential from the issuer agent 22 (i.e., the fifth agent), and the holder agent 42 initiates a signed credential request transaction for including payment for issuance of the verifiable credential (step 812). The issuer agent 22 sends to the issuer transaction agent 62 (i.e., the fourth agent) the signed credential request transaction from the holder agent 42 (step 814). The issuer transaction agent 62 verifies a digital signature of the digitally signed transaction (step 815), for example by application of a public key of the holder agent 42.

The issuer transaction agent 62 saves the signed credential request transaction to the issuance ledger 66 (step 816). The issuer transaction agent 62 sends confirmation of the saving of the signed credential request transaction (step 818) so that the issuer agent 22 can continue with the exchange with the holder agent 42 and to allow the issuance of a verifiable credential to the holder agent 42.

The free transaction obtained from the verifier agent 52 by the holder agent 42 in step 810 and the signed credential request transaction between the holder agent 42 and the issuer agent 22, including data of the issuer agent 22 (e.g., digital identity of the issuer agent 22) are sent by the holder agent 42 to the holder transaction agent 72 (i.e., the first agent) in the form of transaction updates (step 820). The free transaction and the credential request transaction received in step 820 by the holder transaction agent 72 are written to the transaction ledger 76 by the holder transaction agent 72 in the form of transaction updates (step 822). Confirmation of the storing of the free transaction and the credential request transaction on the transaction ledger 76 is sent by the holder transaction agent 72 to the holder agent 42 (step 824).

The holder agent 42 and issuer agent 22 interact (step 826) in order to satisfy conditions that need to be met for the issuer agent 22 to be able to issue the requested verifiable credential based on the use case, type of credential, and assurance level. For example, for a know-your-client ("KYC") type verifiable credential, the holder of the holder agent 42 may be required to present their driver license or other identification on camera alongside their face. The issuer agent 22 sends to the holder agent 42 a verifiable credential of the holder and a crypto commitment (step 828), information that will allow a transaction agent to pay a fee for verification. The crypto commitment is related to the verifiable credential and includes information for the verifier agent 52 to use to contact the issuer agent 22. The crypto commitment can be provided as a partial signature for the verifiable credential guaranteeing the verifiable credential is usable by the holder agent 42 and enabling the verifier agent 52 to verify the verifiable credential after the holder completes payment or other requirement via the holder transaction agent 72. The crypto commitment can include cost and payment information regarding the cost of the verifiable credential.

The holder agent 42 confirms to the holder transaction agent 72 the fact that the issuer agent 22 sent the verifiable credential to the holder agent 42 and the holder agent 42 received the verifiable credential (step 830) thus unblocking the payment part of the credential request transaction by action of the holder transaction agent 72. The holder transaction agent 72 sends to the issuer transaction agent 62 payment for the issuer agent 22 and proof of the payment (step 832). The issuer transaction agent 62 sends to the holder transaction agent 72 a credential signature (originating from the issuer agent 22) for the verifiable credential associated with the credential request transaction (step 834) for the holder transaction agent 72 to relay to the holder agent 42. The holder transaction agent 72 sends to the holder agent 42 the credential signature from the issuer transaction agent 62 to allow the verifiable credential associated with the credential request transaction be used (step 836).

The holder agent 42 sends a verifiable presentation for the free transaction to the verifier agent 52 (step 838), the verifiable presentation including the verifiable credential which includes the one or more data points requested by the verifier agent 52 and one or more proofs corresponding to the requested one or more data points. Responsive to receiving the verifiable presentation including the verifiable credential, the verifier agent 52 sends a verifiable presentation completion status to the verifier transaction agent 82 and notifies the verifier transaction agent 82 that the verifiable presentation has been received from the holder agent 42 and the free transaction has been completed with the holder agent 42 (step 840). The verifier transaction agent 82 saves the verifiable presentation completion status including the free transaction completion information to the verified ledger 86 in the form of a transaction update (step 842). The verifier transaction agent 82 sends notification to the holder transaction agent 72 that the verifiable presentation was delivered to the verifier agent 52 and that the free transaction was completed (step 844).

The holder transaction agent 72 notifies the holder agent 42 that the verifiable presentation was delivered and that the free transaction was completed (step 846). The holder transaction agent 72 updates the transaction ledger 76 with the completion status of the free transaction indicating that the free transaction is complete (step 848).

The scenario represented by the process flow and system 800 enables the first co-protocol and the fourth co-protocol as described above. In the first co-protocol, the holder agent 42 requests a verifiable credential from an issuer agent 22 and the issuer agent 22 requires payment prior to issuance. The process flow and system 800 enables a holder to pay an issuer. Further steps can be configured so the verifier prepays or reimburses the holder for money paid or to be paid to the issuer by the holder. In the fourth co-protocol, a service is used by a holder of a holder agent 42 in a transaction with a verifier of a verifier agent 52 that requires a verifiable credential that the holder agent 42 already possesses, and the holder receives payment from the verifier for providing the verifiable credential as part of a transaction.

Referring to FIG. 6B, the process flow and system 900 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 902). The verifier agent 52 initiates a new transaction not subject to issuer-imposed or holder-imposed cost (hereinafter "free transaction") by sending a start notification to the verifier transaction agent 82 (i.e., the sixth agent) (step 904). The verifier transaction agent 82 saves the notification of the free transaction in the verified ledger 86 in the form of a transaction update (step 906).

The verifier transaction agent 82 notifies the verifier agent 52 that the free transaction has successfully been saved to the verified ledger 86 to allow the verifier agent 52 to begin processing a presentation request (step 908). The verifier agent 52 specifies to the holder agent 42, in a presentation request for the free transaction, one or more data points (e.g., attributes of a verifiable credential) which are required, the presentation request defining terms for the free transaction, the free transaction for example being analogous to a contract (step 910).

The free transaction obtained from the verifier agent 52 by the holder agent 42 in step 910 is sent by the holder agent 42 to the holder transaction agent 72 (i.e., the first agent) in the form of a transaction update (step 912). The free transaction received in step 912 by the holder transaction agent 72 is written to the transaction ledger 76 by the holder transaction agent 72 in the form of a transaction update (step 914). Confirmation of the storing of the free transaction on the transaction ledger 76 is sent by the holder transaction agent 72 to the holder agent 42 (step 916).

The holder agent 42 sends a verifiable presentation for the free transaction to the verifier agent 52 (step 918), the verifiable presentation including the verifiable credential which includes the one or more data points requested by the verifier agent 52 and one or more proofs corresponding the requested one or more data points. Responsive to receiving the verifiable presentation including the verifiable credential, the verifier agent 52 sends a verifiable presentation completion status to the verifier transaction agent 82 and notifies the verifier transaction agent 82 that the verifiable presentation has been received from the holder agent 42 and the free transaction has been completed with the holder agent 42 (step 920). The verifier transaction agent 82 saves the verifiable presentation completion status including the free transaction completion information to the verified ledger 86 in the form of a transaction update (step 922). The verifier transaction agent 82 sends notification to the holder transaction agent 72 that the verifiable presentation was delivered to the verifier agent 52 and that the free transaction was completed (step 924).

The holder transaction agent 72 notifies the holder agent 42 that the verifiable presentation was delivered and that the free transaction was completed (step 926). The holder transaction agent 72 updates the transaction ledger 76 with the completion status of the free transaction indicating that the free transaction is complete (step 928).

The scenario represented by the process flow and system 900 is particularly suited for application in support of the herein described first use case which includes providing identity proof for online service sign up. A new credential holder may find it unusual and unacceptable to have to pay for an identity credential during a service signup (if they do not already have one) under the process flow and system 800. However, a holder of an existing verifiable credential that matches the requirements of a verifier can provide that unlocked credential under the process flow and system 900 to enable an online service signup. Further, the scenarios represented by the process flows and systems 800, 900 are particularly suited for application in support of the herein described exemplary second use case (i.e., providing proof of education certificate), third use case (i.e., providing a proof of age to gain access to a social club), and fourth use case (i.e., providing a proof of certified buyer of a particular product when a user writes a product/service review). Alternatively, other use cases can be supported by the scenarios represented by the process flows and systems 800, 900.

Figure 7:
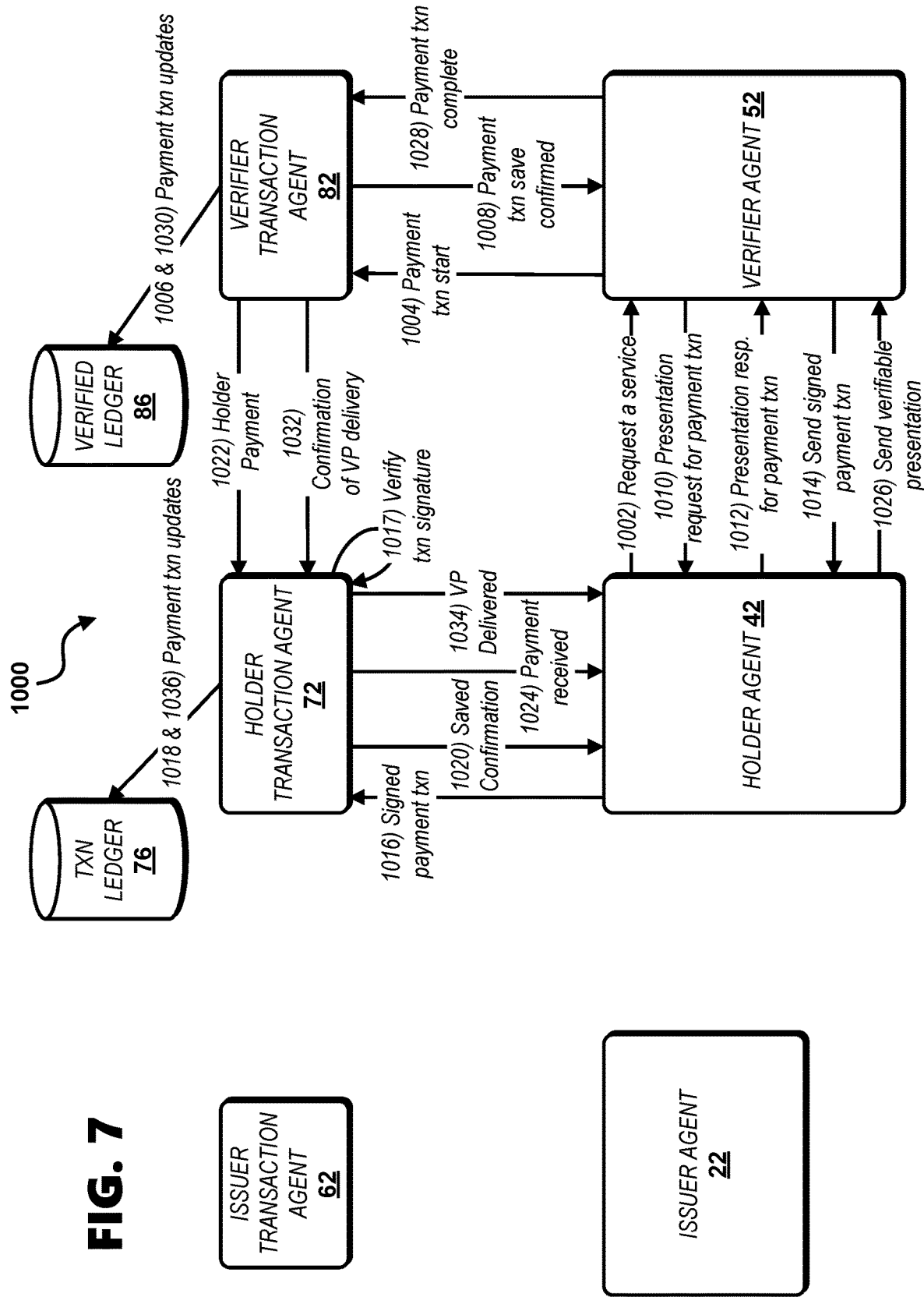

In the third payment scheme in Table 2, transaction agents are involved in a transaction where a verifier pays a holder. Payment terms of the third payment scheme include a requirement to pay a holder per transaction for a verifiable credential used within a transaction. Referring to FIG. 7, an exemplary scenario where the third payment scheme applies is represented by the process flow and system 1000 enabled in a network environment. In a case where the third payment scheme applies and where a holder does not yet have the necessary verifiable credential, the process steps applied to acquire a verifiable credential as set forth in the process flow and system 800 are performed followed by the process steps of the process flow and system 1000.

The process flow and system 1000 enables a method for transacting over a network by a plurality of agents including a first agent, second agent, third agent, fourth agent, fifth agent, and sixth agent. As described with respect to the process flow and system 1000, the first agent is depicted as a holder agent 42, the second agent is depicted as a verifier agent 52, the third agent is depicted as a holder transaction agent 72, the fourth agent is depicted as a verifier transaction agent 82, the fifth agent is depicted as an issuer agent 22, and the sixth agent is depicted as an issuer transaction agent 62. The depictions of the plurality of agents with respect to the process flow and system 1000 are exemplary in nature, and the process flow and system 1000 is not limited by the particular naming of each agent.

In the process flow and system 1000, a holder via a holder agent 42 (i.e., the first agent) wants to initiate a transaction for use of a service from a provider, and the provider acting as a verifier via a verifier agent 52 (i.e., the second agent) wants to verify the holder. The holder agent 42 requests the service from the verifier agent 52 (step 1002). The verifier agent 52 initiates a new transaction enabling payment by the verifier to the holder (hereinafter "payment transaction") by sending a start notification to the verifier transaction agent 82 (i.e., the fourth agent) (step 1004). The verifier transaction agent 82 saves the notification of the payment transaction in the verified ledger 86 in the form of a transaction update (step 1006).

The verifier transaction agent 82 notifies the verifier agent 52 that the payment transaction has successfully been saved to the verified ledger 86 to allow the verifier agent 52 to begin processing a presentation request (step 1008). The verifier agent 52 specifies to the holder agent 42, in a presentation request for the payment transaction, one or more data points (e.g., attributes of a verifiable credential) which are required, the presentation request defining terms for the payment transaction, the payment transaction for example being analogous to a contract (step 1010). The holder agent 42 transmits a response to the presentation request for the payment transaction of the verifier agent 52 including one or more requirements on the data requested by the verifier agent 52 for fulfilling one or more data points for the payment transaction (e.g., a contract) to be initiated (step 1012). The one or more requirements provided by the holder agent 42 includes for example one or more of price, a service level agreement ("SLA"), or policies for the data requested. If the one or more requirements are acceptable to the verifier agent 52, the verifier agent 52 responds by updating the payment transaction to generate a signed payment transaction that confirms that the one or more requirements are acceptable, and the verifier agent 52 transmits a response to the holder agent 42 including the signed payment transaction (step 1014).

The signed (i.e., updated) payment transaction obtained by the holder agent 42 from the verifier agent 52 in step 1014 is sent by the holder agent 42 to the holder transaction agent 72 (i.e., the third agent) (step 1016). The holder transaction agent 72 beneficially verifies the signature of the signed payment transaction, for example by applying a public key associated with the verifier agent 52 (step 1017). The signed (i.e., updated) payment transaction received by the holder transaction agent 72 from the holder agent 42 in the step 1016 is written to the transaction ledger 76 by the holder transaction agent 72 (step 1018). Confirmation of the storing of the signed payment transaction on the transaction ledger 76 is transmitted by the holder transaction agent 72 to the holder agent 42 (step 1020).

The verifier transaction agent 82 sends payment confirmation to the holder transaction agent 72 for the signed payment transaction (step 1022). The holder transaction agent 72 sends confirmation to the holder agent 42 that the payment has been received from the verifier via the verifier transaction agent 82 for the payment transaction (step 1024).

The holder agent 42 sends a verifiable presentation for the payment transaction to the verifier agent 52 (step 1026), the verifiable presentation including the verifiable credential which includes the one or more data points requested by the verifier agent 52 and one or more proofs corresponding the requested one or more data points. Responsive to receiving the verifiable presentation including the verifiable credential, the verifier agent 52 sends a verifiable presentation completion status to the verifier transaction agent 82 and notifies the verifier transaction agent 82 that the verifiable presentation has been received from the holder agent 42 and the payment transaction has been completed with the holder agent 42 (step 1028). The verifier transaction agent 82 saves the verifiable presentation completion status including the payment transaction completion information to the verified ledger 86 in the form of a transaction update (step 1030). The verifier transaction agent 82 sends notification to the holder transaction agent 72 that the verifiable presentation ("VP") was delivered to the verifier agent 52 and that the payment transaction was completed (step 1032).

The holder transaction agent 72 notifies the holder agent 42 that the verifiable presentation was delivered, and that the payment transaction was completed (step 1034). The holder transaction agent 72 updates the transaction ledger 76 with the completion status of the payment transaction indicating that the payment transaction is complete (step 1036).

The scenario represented by the process flow and system 1000 enables the fourth co-protocol as described above. In the fourth co-protocol, a service is used by a holder of a holder agent 42 in a transaction with a verifier of a verifier agent 52 that requires a verifiable credential that the holder agent 42 already possesses, and the holder receives payment from the verifier for providing the verifiable credential as part of a transaction. The scenario represented by the process flow and system 1000 is particularly suited for application in support of the herein described fourth use case (i.e., providing a proof of certified buyer of a particular product when a user writes a product/service review). Alternatively, other use cases can be supported by the scenario represented by the process flow and system 1000.

Further to the description above and referring to FIG. 5A, the process flow and system 600 enables a first method for transacting over a network by a plurality of agents including a first agent, second agent, third agent, fourth agent, fifth agent, and sixth agent. The first method is described with reference to the steps and elements of the process flow and system 600 wherein the first agent is depicted as a holder transaction agent 72, the second agent is depicted as a holder agent 42, the third agent is depicted as a verifier agent 52, the fourth agent is depicted as a verifier transaction agent 82, the fifth agent is depicted as an issuer transaction agent 62, and the sixth agent is depicted as an issuer agent 22. The depictions of the plurality of agents with respect to the process flow and system 600 are exemplary in nature, and the process flow and system 600 is not limited by the particular naming of each agent.

The first method for transacting over a network includes receiving by a holder transaction agent 72 (i.e., the first agent) a digitally signed transaction from a holder agent 42 (i.e., the second agent), the digitally signed transaction received by the holder agent 42 from a verifier agent 52 (i.e., the third agent) and including a digital signature (step 616). The holder transaction agent 72 beneficially verifies the digital signature (step 617). A first verifiable proof (e.g., a payment proof, proof of payment) is received by the holder transaction agent 72 from a verifier transaction agent 82 (i.e., the fourth agent) (step 630). The first verifiable proof is transmitted by the holder transaction agent 72 to an issuer transaction agent 62 (i.e., the fifth agent) (step 632). An unlock signature for a locked credential provided by an issuer agent 22 (i.e., the sixth agent) to the holder agent 42 is received by the holder transaction agent 72 from the issuer transaction agent (step 636), and the unlock signature is transmitted by the holder transaction agent 72 to the verifier transaction agent 82 (step 638).

The first method further includes transmitting by the holder agent 42 to the verifier agent 52 a request to initiate a use of a service (step 602), receiving by the holder agent 42 from the verifier agent 52 a request for one or more data points that support verification of an entity to initiate the use of the service (step 604), and transmitting by the holder agent 42 to the verifier agent 52 one or more requirements for fulfilling the one or more data points (step 612). For example, the entity can include one or both of a user of the holder agent 42 or an organization associated with the user of the holder agent 42. The one or more requirements can include for example one or more of a price, a service level agreement ("SLA"), or a policy. A data point can include for example one or more of a first name, last name, date of birth, credit card number, social security number, or passport number. The digitally signed transaction is received by the holder agent 42 from the verifier agent 52 (step 614), and a second verifiable proof (e.g., a data point proof) is transmitted by the holder agent 42 to the verifier agent 52, the second verifiable proof based on the locked credential and including the one or more data points (step 622). For example, the second verifiable proof can include the locked credential including the one or more data points. The first method can further include updating by the holder transaction agent 72 a ledger based on the digitally signed transaction received from the holder agent 42 (step 618).

The first method further includes transmitting by the holder agent 42 a request to the issuer agent 22 for the locked credential (step 606) responsive to the request for the one or more data points from the verifier agent 52, receiving by the holder agent 42 the locked credential from the issuer agent 22 (step 610), and generating by the holder agent 42 the second verifiable proof based on the locked credential (step 622). A request for entity-identifying information can be received by the holder agent 42 from the issuer agent 22, the holder agent 42 can acquire from a user the entity-identifying information, and the entity-identifying information can be transmitted by the holder agent 42 to the issuer agent 22 (step 608). Entity identifying information can include for example a driver license, business license, passport, or social security card.

The first method further includes receiving by the verifier transaction agent 82 from the verifier agent 52 the digitally signed transaction and the second verifiable proof (step 626) and transmitting by the verifier transaction agent 82 to the verifier agent 52 the unlock signature (step 640). A ledger can be updated by the verifier transaction agent 82 based on the digitally signed transaction and the second verifiable proof (step 628). The unlock signature is received by the verifier agent 52 from the verifier transaction agent 82 (step 640), the second verifiable proof is unlocked by the verifier agent 52 using the unlock signature (step 642), and the verifier agent 52 enables the use of the service responsive to the unlocking of the second verifiable proof by the verifier agent 52.

Further to the description above and referring to FIG. 6A, the process flow and system 800 enables a second method for transacting over a network by a plurality of agents including a first agent, second agent, third agent, fourth agent, fifth agent, and sixth agent. The second method is described with reference to the steps and elements of the process flow and system 800 wherein the first agent is depicted as a holder transaction agent 72, the second agent is depicted as a holder agent 42, the third agent is depicted as a verifier agent 52, the fourth agent is depicted as an issuer transaction agent 62, the fifth agent is depicted as an issuer agent 22, and the sixth agent is depicted as a verifier transaction agent 82. The depictions of the plurality of agents with respect to the process flow and system 800 are exemplary in nature, and the process flow and system 800 is not limited by the particular naming of each agent.

The second method for transacting over a network includes receiving by a holder transaction agent 72 (i.e., the first agent) a first transaction (e.g., a free transaction) from a holder agent 42 (i.e., the second agent) (step 820), the first transaction initiated by a verifier agent 52 (i.e., the third agent). A first verifiable proof (e.g., proof of payment) is transmitted by the holder transaction agent 72 to an issuer transaction agent 62 (i.e., the fourth agent) (step 832). The second method further includes receiving by the holder transaction agent 72 from the issuer transaction agent 62 a credential signature for a verifiable credential including one or more data points provided by an issuer agent 22 (i.e., the fifth agent) to the holder agent 42 for the first transaction (step 834) and transmitting by the holder transaction agent 72 to the holder agent 42 the credential signature (step 836).

The second method further includes receiving by the holder transaction agent 72 from the holder agent 42 a second transaction (e.g., a credential request transaction) including identifying data of the issuer agent 22 (step 820) and transmitting by the holder transaction agent 72 to the issuer transaction agent 62 the first verifiable proof based on the second transaction (step 832).

The second method further includes transmitting by the holder agent 42 to the issuer agent 22 a request for the verifiable credential, the request for the verifiable credential including the second transaction (step 812) and providing by the holder agent 42 to the issuer agent 22 entity-identifying information (step 826). The verifiable credential is received by the holder agent 42 from the issuer agent 22 (step 828). An indication that the verifiable credential was received by the holder agent 42 is received by the holder transaction agent 72 from the holder agent 42 (step 830). The transmitting by the holder transaction agent 72 to the issuer transaction agent 62 the first verifiable proof (e.g., the proof of payment) (step 832) is responsive to the receiving by the holder transaction agent 72 from the holder agent 42 the indication that the verifiable credential was received by the holder agent 42.

The second method further includes transmitting by the holder agent 42 to the verifier agent 52 a request to initiate a use of a service (step 802) and receiving by the holder agent 42 from the verifier agent 52 a request for the one or more data points to initiate the use of the service (step 810). The credential signature is applied to the verifiable credential by the holder agent 42 to generate a signed credential including the one or more data points (step 837), and the signed credential including the one or more data points is transmitted by the holder agent 42 to the verifier agent 52 (step 838). A second verifiable proof including the one or more data points can be generated by the holder agent 42 based on the signed credential (step 837). The second verifiable proof including the one or more data points can be transmitted by the holder agent 42 to the verifier agent 52 (step 838). The second verifiable proof can for example be generated and transmitted by the holder agent 42 to the verifier agent 52 as a verifiable presentation ("VP") including the signed credential.

The second method further includes receiving by a verifier transaction agent 82 from the verifier agent 52 an indication that the second verifiable proof has been received by the verifier agent 52 (step 840). The indication that the second verifiable proof has been received by the verifier agent 52 is received by the holder transaction agent 72 from the verifier transaction agent 82 (step 844). The indication that the second verifiable proof has been received by the verifier agent 52 is transmitted by the holder transaction agent 72 to the holder agent 42 (step 846).

The second method further includes updating by the holder transaction agent 72 a ledger based on the second transaction (e.g., a credential request transaction) from the holder agent 42 (step 822) and updating by the holder transaction agent 72 the ledger based on the indication that the second verifiable proof has been received by the verifier agent 52 (step 848).

The second method further includes receiving by the issuer transaction agent 62 from the issuer agent 22 the second transaction (e.g., a credential request transaction) (step 814) and transmitting the credential signature by the issuer transaction agent 62 to the holder transaction agent 72 based on the second transaction and the first verifiable proof (e.g., a proof of payment) (step 834). The second transaction can include a digitally signed transaction, and the issuer transaction agent 62 can verify the digitally signed transaction (step 815).

Further to the description above and referring to FIG. 7, the process flow and system 1000 enables a third method for transacting over a network by a plurality of agents including a first agent, second agent, third agent, and fourth agent. The third method is described with reference to the steps and elements of the process flow and system 1000 wherein the first agent is depicted as a holder agent 42, the second agent is depicted as a verifier agent 52, the third agent is depicted as a holder transaction agent 72, and the fourth agent is depicted as a verifier transaction agent 82. The depictions of the plurality of agents with respect to the process flow and system 1000 are exemplary in nature, and the process flow and system 1000 is not limited by the particular naming of each agent.

The third method for transacting over a network includes transmitting by a holder agent 42 (i.e., the first agent) to a verifier agent 52 (i.e., the second agent) a request to initiate a use of a service (step 1002), receiving by the holder agent 42 from the verifier agent 52 a request for one or more data points to initiate the use of the service (step 1010), transmitting by the holder agent 42 to the verifier agent 52 one or more requirements for fulfilling the one or more data points (step 1012). A digitally signed transaction (e.g., a payment transaction) including a digital signature is received by the holder agent 42 from the verifier agent 52 (step 1014). The digitally signed transaction is transmitted by the holder agent 42 to a holder transaction agent 72 (i.e., the third agent) (step 1016). An indication that a first verifiable proof (e.g., proof of payment, payment proof) for the digitally signed transaction was received is received by the holder agent 42 from the holder transaction agent 72 (step 1024), and the holder agent 42 transmits to the verifier agent 52 a second verifiable proof, the second verifiable proof based on a verifiable credential including the one or more data points (step 1026).

The third method for transacting over a network further includes receiving by the holder transaction agent 72 from a verifier transaction agent 82 (i.e., the fourth agent) the first verifiable proof (e.g., proof of payment, payment proof) (step 1022) and transmitting by the holder transaction agent 72 to the holder agent 42 the indication that the first verifiable proof for the digitally signed transaction was received (step 1024).

The second verifiable proof beneficially includes the verifiable credential. The second verifiable proof can be transmitted as a verifiable presentation ("VP") including the verifiable credential (step 1026). The third method for transacting over a network further includes receiving by a verifier transaction agent 82 from the verifier agent 52 an indication that the second verifiable proof has been received by the verifier agent 52 to complete the digitally signed transaction (step 1028), receiving by the holder transaction agent 72 from the verifier transaction agent 82 the indication that the second verifiable proof has been received by the verifier agent 52 (step 1032), and transmitting by the holder transaction agent 72 to the holder agent 42 the indication that the second verifiable proof has been received by the verifier agent 52 (step 1034).

Further to the description above and referring to FIG. 4, the process flows and systems 600, 700, 800, 900, 1000 are enabled by the transaction scheme system 500 for transacting over a network by a plurality of agents including a first agent, second agent, third agent, fourth agent, fifth agent, and sixth agent. With respect to the transaction scheme system 500, the first agent is depicted as a holder transaction agent 72, the second agent is depicted as a holder agent 42, the third agent is depicted as a verifier agent 52, the fourth agent is depicted as a verifier transaction agent 82, the fifth agent is depicted as an issuer transaction agent 62, and the sixth agent is depicted as an issuer agent 22. A first computing device is depicted as a holder transaction agent service provider system 70 and a second computing device is depicted as a holder device 40. The depictions of the plurality of agents, devices, and ledgers with respect to the transaction scheme system 500 are exemplary in nature, and the transaction scheme system 500 is not limited by the particular naming of each agent, device, or ledger.

The transaction scheme system 500 is configured for transacting over a network and includes a holder transaction agent 72 (i.e., the first agent) and a holder agent 42 (i.e., the second agent). The holder agent 42 is operable to transact with a verifier agent 52 (i.e., the third agent) for use of a service. The verifier agent 52 is enabled to communicate with a verifier transaction agent 82 (i.e., the fourth agent). The holder transaction agent 72 is operable to communicate with the holder agent 42 to facilitate the transacting by the holder agent 42 with the verifier agent 52 for the use of the service, and the holder transaction agent 72 is operable to communicate with the verifier transaction agent 82 to facilitate the transacting by the holder agent 42 with the verifier agent 52 for the use of the service.

The holder transaction agent 72 is further operable to transact with an issuer transaction agent 62 (i.e., the fifth agent) for a signature for a verifiable credential to facilitate the transacting by the holder agent 42 with the verifier agent 52 for the use of the service. The holder agent 42 is further operable to transact with an issuer agent 22 (i.e., the sixth agent) for the verifiable credential to facilitate the transacting by the holder agent 42 with the verifier agent 52 for the use of the service, the issuer agent 22 enabled to communicate with the issuer transaction agent 62. The holder agent 42 is further operable to transmit the verifiable credential to the verifier agent 52.

The holder transaction agent 72 is further operable to transmit the signature for the verifiable credential to the verifier transaction agent 82. The verifier transaction agent 82, included in the transaction scheme system 500, is operable to transmit the signature for the verifiable credential to the verifier agent 52. The transaction scheme system 500 further includes a transaction ledger 76, the holder transaction agent 72 operable to update the transaction ledger 76 based on the transacting by the holder agent 42 for the use of the service. The transaction scheme system 500 further includes a verified ledger 86, the verifier transaction agent 82 operable to update the verified ledger 86 based on the transacting by the holder agent 42 for the use of the service.

The transaction scheme system 500 further includes a holder transaction agent service provider system 70 (i.e., the first computing device) on which the holder transaction agent 72 is enabled and a holder device 40 (i.e., the second computing device) on which the holder agent 42 is enabled.

The transaction scheme system 500 further includes the issuer transaction agent 62 which is operable to transact with the holder transaction agent 72 to provide the holder transaction agent 72 a signature for a verifiable credential to facilitate the transacting by the holder agent 42 with the verifier agent 52 for the use of the service. The verifier transaction agent 82 is operable to receive the signature for the verifiable credential from the holder transaction agent 72 and to transmit the signature for the verifiable credential to the verifier agent 52. The holder agent 42 is further operable to transact with an issuer agent 22 for the verifiable credential to facilitate the transacting by the holder agent 42 with the verifier agent 52 for the use of the service. The holder agent 42 is further operable to transmit the verifiable credential to the verifier agent 52.

The holder agent 42 is further operable to transmit to the issuer agent 22 a request for the verifiable credential. The issuer transaction agent 62 is further operable to receive the request for the verifiable credential from the issuer agent 22, receive a verifiable proof from the holder transaction agent 72, and transmit the signature for the verifiable credential to the holder transaction agent 72 based on the request for the verifiable credential and the verifiable proof.

Four further exemplary payment schemes are summarized in Table 3. The fourth and sixth payment schemes support immediate payment and the fifth and seventh payment schemes support in-batch payment with per transaction tracking.

TABLE 3

| Payment Scheme | Description | Payer | Payee | Frequency |
|---|---|---|---|---|
| 4th | Verifier pays issuer per verification based on policy | Verifier | Single issuer | Per verification immediately |
| 5th | Verifier tracks issuer payment per verification based on policy, verifier pays in batch | Verifier | Single issuer | Per verification in batch |
| 6th | Verifier pays issuers as part of a compound transaction policy | Verifier | Plurality (list) of issuers | Compound verification |
| 7th | Verifier tracks issuer payment as part of a compound transaction policy, verifier pays each issuer in batch | Verifier | Plurality (list) of issuers | Compound verification in batch |

Figure 8:
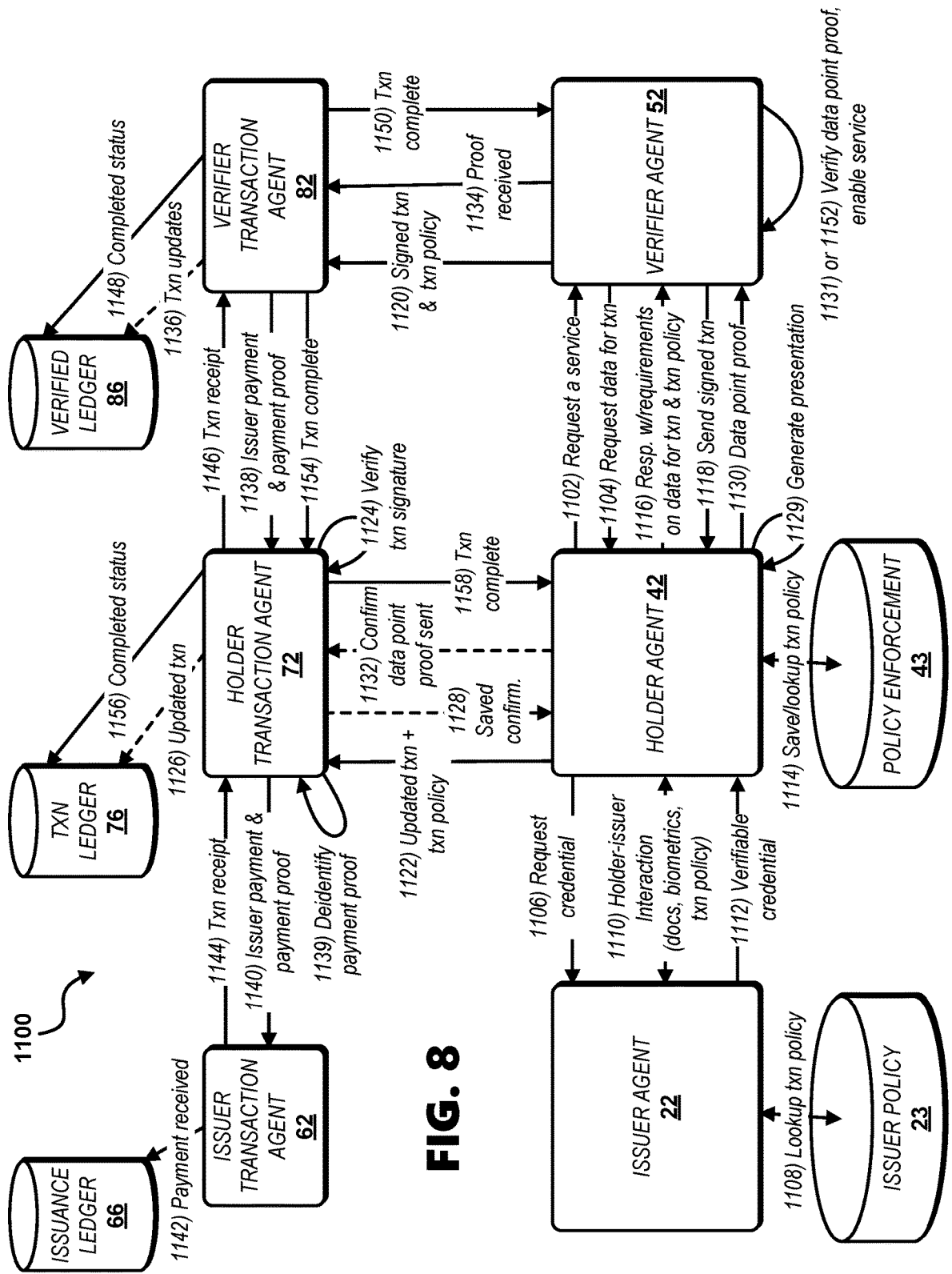

In the fourth payment scheme in Table 3, the verifier pays the issuer per verification of a transaction as defined by a policy. The fourth payment scheme implements transaction agents in the verification of credential processes. Payment terms of the fourth payment scheme include a requirement to pay per verification of a transaction substantially immediately, as defined by a policy. Referring to FIG. 8, an exemplary scenario where the fourth payment scheme applies is represented by the process flow and system 1100. In the process flow and system 1100 a new verifiable credential is required from an issuer agent 22. Pre-conditions of the process flow and system 1100 include a requirement that no prior verifiable credential is held by the holder agent 42. Alternatively, if the holder agent 42 already possesses a verifiable credential previously received from the issuer agent 22, transactions between the issuer agent 22 and the holder agent 42 can be omitted from the process flow and system 1100.

The process flow and system 1100 enables methods for transacting over a network by a plurality of agents including a first agent, second agent, third agent, fourth agent, fifth agent, and sixth agent. As described with respect to the process flow and system 1100, the first agent is depicted as a holder transaction agent 72, the second agent is depicted as a holder agent 42, the third agent is depicted as a verifier agent 52, the fourth agent is depicted as an issuer agent 22, the fifth agent is depicted as a verifier transaction agent 82, and the sixth agent is depicted as an issuer transaction agent 62. The depictions of the plurality of agents with respect to the process flow and system 1100 are exemplary in nature, and the process flow and system 1100 is not limited by the particular naming of each agent.

The process flow and system 1100 is shown enabled in a network environment. A holder via the holder agent 42 (i.e., the second agent) wants to initiate a transaction for use of a network-enabled service from a provider, and the provider acting as a verifier via the verifier agent 52 (i.e., the third agent) wants to verify the holder. The holder agent 42 requests the service from the verifier agent 52 (step 1102). The verifier agent 52 specifies to the holder agent 42 which one or more data points such as attributes (e.g., attributes of a verifiable credential) for the transaction are required in a request for data for the transaction (e.g., a presentation request) (step 1104), the one or more data points for example defining terms for the transaction (e.g., a contract) analogous to contract terms. Data points can include for example one or more of a holder's first name, last name, date of birth, credit card number, social security number, or passport number. The holder agent 42 requests a verifiable credential from the issuer agent 22 (i.e., the fourth agent) responsive to the request for data from the verifier agent 52 (step 1106). The holder agent 42 does not need to disclose the identity of the verifier agent 52 in its request to the issuer agent 22, but the holder agent 42 can present the data points required by the verifier agent 52.

The issuer agent 22 acquires a transaction policy from an issuer policy datastore 23 responsive to the request for the verifiable credential (step 1108). The transaction policy is provided in machine readable format (e.g., JSON, JSON-LD). The holder agent 42 and issuer agent 22 interact (step 1110) in order to satisfy conditions that need to be met for the issuer agent 22 to be able to issue the requested verifiable credential based on the use case, type of credential, and assurance level. For example, for a know-your-client ("KYC") type verifiable credential, the holder of the holder agent 42 may be required to present their driver license or other identification on camera alongside their face. The issuer agent 22 transmits the transaction policy to the holder agent 42 in the step 1110, the transaction policy defining one or more processes to be adhered to for transacting for the verifiable credential. The issuer agent 22 sends to the holder agent 42 a cryptographically verifiable credential (e.g., a locked credential or unlocked credential) of the holder (step 1112).

The holder agent 42 saves the transaction policy for the cryptographically verifiable credential provided by the issuer agent 22 to a policy enforcement datastore 43 (step 1114), allowing subsequent use of the cryptographically verifiable credential by the holder agent 42 without having to transact with the issuer agent 22 for the transaction policy and allowing the holder agent 42 to check compliance to the transaction policy whenever the cryptographically verifiable credential is used. The holder agent 42 transmits a response to the verifier agent 52 (e.g., a response to a presentation request) including one or more requirements on the data requested by the verifier agent 52 for fulfilling one or more data points for the transaction (e.g., a contract) to be initiated, the one or more requirements including the transaction policy (step 1116). The transaction policy or other requirements provided by the holder agent 42 include for example one or more of price, a service level agreement ("SLA"), or other policies to be adhered to for the data requested. If the one or more requirements including the transaction policy is acceptable to the verifier agent 52, the verifier agent 52 responds by updating the transaction to generate a digitally signed transaction that confirms that the one or more requirements including the transaction policy is acceptable, and the verifier agent 52 transmits a response to the holder agent 42 including the signed transaction (step 1118). The signed transaction includes data of the issuer agent 22 (e.g., digital identity of the issuer agent 22). The verifier agent 52 sends to the verifier transaction agent 82 (i.e., the fifth agent) the signed transaction and the transaction policy received from the holder agent 42 (step 1120).

The signed (i.e., "updated") transaction obtained by the holder agent 42 from the verifier agent 52 in step 1118, including data of the issuer agent 22 (e.g., digital identity of the issuer agent 22), and the transaction policy obtained by the holder agent 42 from the issuer agent 22 in step 1110 are sent by the holder agent 42 to the holder transaction agent 72 (i.e., the first agent) (step 1122). The holder transaction agent 72 beneficially verifies the signature of the signed transaction, for example by applying a public key associated with the verifier agent 52 (step 1124). The signed (i.e., "updated") transaction received by the holder transaction agent 72 from the holder agent 42 in the step 1122 is written to the transaction ledger 76 by the holder transaction agent 72 (step 1126). Confirmation of storing of the signed transaction on the transaction ledger 76 is transmitted by the holder transaction agent 72 to the holder agent 42 (step 1128). The holder agent 42 generates a cryptographically verifiable presentation including a cryptographically verifiable proof based on the cryptographically verifiable credential (step 1129). The holder agent 42 sends the verifier agent 52 the cryptographically verifiable presentation including the cryptographically verifiable proof, based on the cryptographically verifiable credential (e.g., including the cryptographically verifiable credential), including the one or more data points requested by the verifier agent 52 ("data point proof") (step 1130). The data point proof includes the presentation of the requested one or more data points and one or more cryptographically verifiable proofs associated with the requested one or more data points. In an embodiment in which the cryptographically verifiable credential is not locked, the verifier agent 52 cryptographically verifies the cryptographically verifiable proof, for example using a public key of the issuer agent 22, validates the one or more data points, and enables the service requested by the holder agent 42 responsive to the verification and the validation (step 1131). In an embodiment in which the cryptographically verifiable credential is locked (i.e., a locked credential), verification and validation is contingent upon receipt of an unlock signature from the issuer transaction agent 62.

The holder agent 42 confirms to the holder transaction agent 72 the fact that the verifier agent 52 was sent the data point proof (step 1132), thus unblocking the payment part of the transaction by action of the holder transaction agent 72. The verifier agent 52 sends to the verifier transaction agent 82 the signed transaction and the data point proof received from the holder agent 42 (step 1134).

The verifier transaction agent 82 saves the signed transaction and the data point proof to a verified ledger 86 (step 1136) to trigger payment initiation. The verifier transaction agent 82 sends payment and proof of the payment for the issuer agent 22 to the holder transaction agent 72 (step 1138). The holder transaction agent 72 deidentifies the payment and the proof of the payment (step 1139). The payment and the proof of the payment for the issuer agent 22 ("payment proof"), which does not disclose the payer's identity, are relayed to the issuer transaction agent 62 (i.e., the sixth agent) by the holder transaction agent 72 (step 1140). The issuer transaction agent 62 saves the payment proof to the issuance ledger 66 (step 1142) so that a transaction receipt for the cryptographically verifiable credential as associated with the data point proof can be sent back to the verifier agent 52 via the holder transaction agent 72 and verifier transaction agent 82.

The issuer transaction agent 62 sends to the holder transaction agent 72 the transaction receipt for the cryptographically verifiable credential associated with the data point proof associated with the signed transaction (step 1144) for relay to the verifier agent 52. The holder transaction agent 72 relays the transaction receipt received from the issuer transaction agent 62 to the verifier transaction agent 82 (step 1146). The verifier transaction agent 82 updates the verified ledger 86 with a completed status reflecting a completed transaction (step 1148). The verifier transaction agent 82 sends to the verifier agent 52 a notification of a completed transaction including the transaction receipt received from the issuer transaction agent 62 (step 1150). In a case in which the cryptographically verifiable credential is a locked credential, the transaction receipt from the issuer transaction agent 62 can include an unlock signature for the locked credential to unlock the data point proof associated with the signed transaction. In the case in which the cryptographically verifiable credential is a locked credential, the verifier agent 52 subsequently unlocks the data point proof received from the holder agent 42 for the signed transaction using the unlock signature for the locked credential, and the verifier agent 52 cryptographically verifies the cryptographically verifiable proof, for example using a public key of the issuer agent 22, validates the one or more data points, and enables the service requested by the holder agent 42 responsive to the verification and the validation (step 1152).

The verifier transaction agent 82 notifies the holder transaction agent 72 that the transaction has been completed (step 1154). The holder transaction agent 72 then updates the transaction ledger 76 with the completed status (step 1156). The holder transaction agent 72 notifies the holder agent 42 that the transaction has been completed (step 1158), and the holder agent 42 may choose to show any updates to a user or system.

Steps 1126, 1128, 1132, 1136 provide additional levels of completeness that ensure that the SSI system 300 can detect issues and/or show progress throughout the flow sequence of the process flow and system 1100. A system implementation may choose to skip one or more of steps 1126, 1128, 1132, 1136 for optimization purposes without losing the overall resultant exchange of a transaction.

Figure 9:
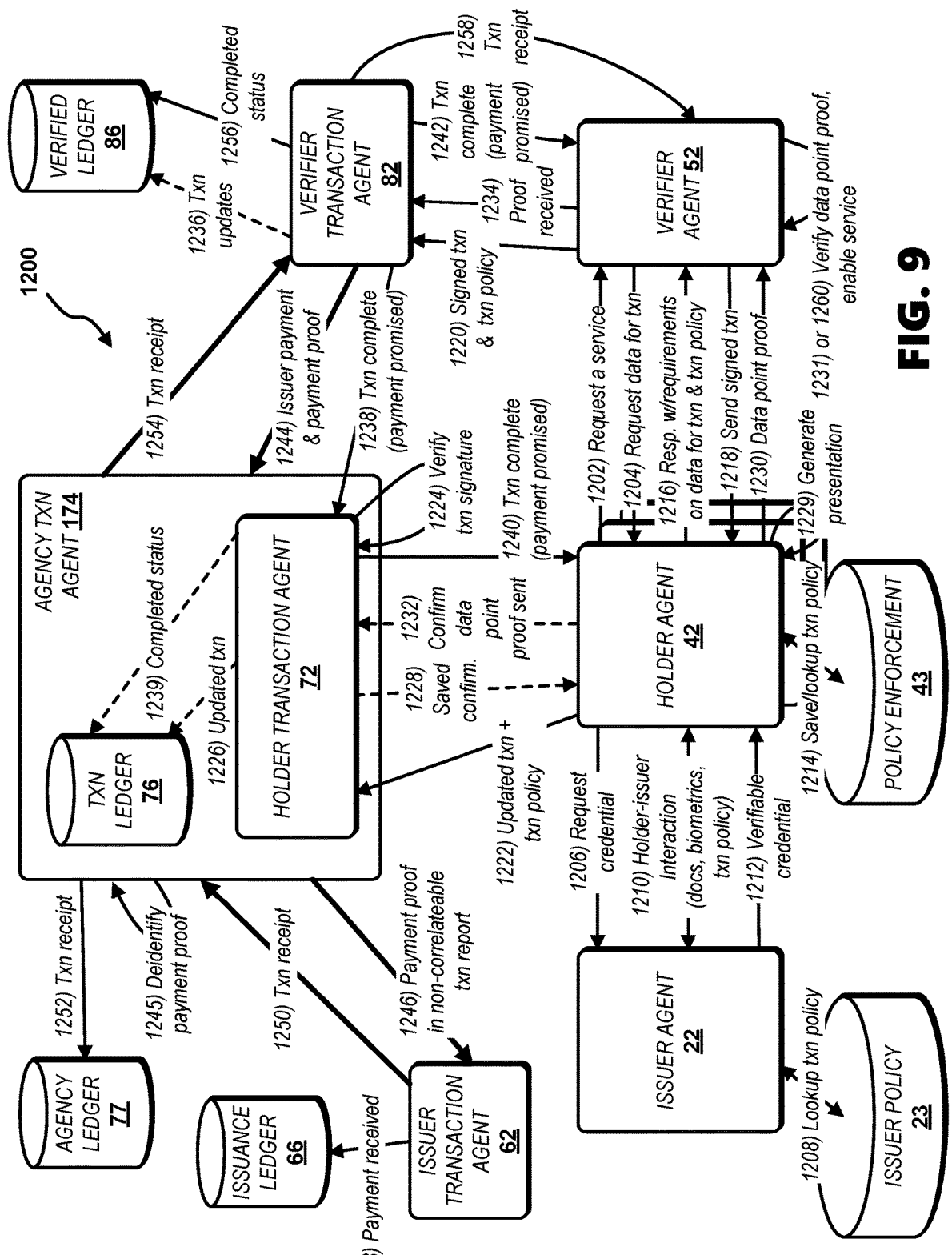

In the fifth payment scheme in Table 3, the verifier tracks required issuer payment per verification of a transaction as defined by a policy and pays in batch to the issuer. The fifth payment scheme implements transaction agents in the verification of credential processes. Payment terms of the fifth payment scheme include a requirement to pay per verification of a transaction in batch, as defined by a policy. Referring to FIG. 9, an exemplary scenario where the fifth payment scheme applies is represented by the process flow and system 1200. In the process flow and system 1200 a new verifiable credential is required from an issuer agent 22. Pre-conditions of the process flow and system 1200 include a requirement that no prior verifiable credential is held by the holder agent 42. Alternatively, if the holder agent 42 already possesses a verifiable credential previously received from the issuer agent 22, transactions between the issuer agent 22 and the holder agent 42 can be omitted from the process flow and system 1200.

The process flow and system 1200 enables methods for transacting over a network by a plurality of agents including a first agent, second agent, third agent, fourth agent, fifth agent, sixth agent, and ninth agent. As described with respect to the process flow and system 1200, the first agent is depicted as a holder transaction agent 72, the second agent is depicted as a holder agent 42, the third agent is depicted as a verifier agent 52, the fourth agent is depicted as an issuer agent 22, the fifth agent is depicted as a verifier transaction agent 82, the sixth agent is depicted as an issuer transaction agent 62, and the ninth agent is depicted as an agency transaction agent 174. The depictions of the plurality of agents with respect to the process flow and system 1200 are exemplary in nature, and the process flow and system 1200 is not limited by the particular naming of each agent.

The process flow and system 1200 is shown enabled in a network environment. A holder via the holder agent 42 (i.e., the second agent) wants to initiate a transaction for use of a network-enabled service from a provider, and the provider acting as a verifier via the verifier agent 52 (i.e., the third agent) wants to verify the holder. The holder agent 42 requests the service from the verifier agent 52 (step 1202). The verifier agent 52 specifies to the holder agent 42 which one or more data points such as attributes (e.g., attributes of a verifiable credential) for the transaction are required in a request for data for the transaction (e.g., a presentation request) (step 1204), the one or more data points for example defining terms for the transaction (e.g., a contract) analogous to contract terms. Data points can include for example one or more of a holder's first name, last name, date of birth, credit card number, social security number, or passport number. The holder agent 42 requests a verifiable credential from the issuer agent 22 (i.e., the fourth agent) responsive to the request for data from the verifier agent 52 (step 1206). The holder agent 42 does not need to disclose the identity of the verifier agent 52 in its request to the issuer agent 22, but the holder agent 42 can present the data points required by the verifier agent 52.

The issuer agent 22 acquires a transaction policy from an issuer policy datastore 23 responsive to the request for the verifiable credential (step 1208). The transaction policy is provided in machine readable format (e.g., JSON, JSON-LD). The holder agent 42 and issuer agent 22 interact (step 1210) in order to satisfy conditions that need to be met for the issuer agent 22 to be able to issue the requested verifiable credential based on the use case, type of credential, and assurance level. For example, for a know-your-client ("KYC") type verifiable credential, the holder of the holder agent 42 may be required to present their driver license or other identification on camera alongside their face. The issuer agent 22 transmits the transaction policy to the holder agent 42 in the step 1210, the transaction policy defining one or more processes to be adhered to for transacting for the verifiable credential. The issuer agent 22 sends to the holder agent 42 a cryptographically verifiable credential (e.g., a locked credential or unlocked credential) of the holder (step 1212).

The holder agent 42 saves the transaction policy for the cryptographically verifiable credential provided by the issuer agent 22 to a policy enforcement datastore 43 (step 1214), allowing subsequent use of the cryptographically verifiable credential by the holder agent 42 without having to transact with the issuer agent 22 for the transaction policy and allowing the holder agent 42 to check compliance to the transaction policy whenever the cryptographically verifiable credential is used. The holder agent 42 transmits a response to the verifier agent 52 (e.g., a response to a presentation request) including one or more requirements on the data requested by the verifier agent 52 for fulfilling one or more data points for the transaction (e.g., a contract) to be initiated, the one or more requirements including the transaction policy (step 1216). The transaction policy or other requirements provided by the holder agent 42 include for example one or more of price, a service level agreement ("SLA"), or other policies to be adhered to for the data requested. If the one or more requirements including the transaction policy is acceptable to the verifier agent 52, the verifier agent 52 responds by updating the transaction to generate a digitally signed transaction that confirms that the one or more requirements including the transaction policy is acceptable, and the verifier agent 52 transmits a response to the holder agent 42 including the signed transaction (step 1218). The signed transaction includes data of the issuer agent 22 (e.g., digital identity of the issuer agent 22). The verifier agent 52 sends to the verifier transaction agent 82 (i.e., the fifth agent) the signed transaction and the transaction policy received from the holder agent 42 (step 1220).

The signed (i.e., "updated") transaction obtained by the holder agent 42 from the verifier agent 52 in step 1218, including data of the issuer agent 22 (e.g., digital identity of the issuer agent 22), and the transaction policy obtained by the holder agent 42 from the issuer agent 22 in step 1210 are sent by the holder agent 42 to the holder transaction agent 72 (i.e., the first agent) (step 1222). The holder transaction agent 72 beneficially verifies the signature of the signed transaction, for example by applying a public key associated with the verifier agent 52 (step 1224). The signed (i.e., "updated") transaction received by the holder transaction agent 72 from the holder agent 42 in the step 1222 is written to the transaction ledger 76 by the holder transaction agent 72 (step 1226). Confirmation of storing of the signed transaction on the transaction ledger 76 is transmitted by the holder transaction agent 72 to the holder agent 42 (step 1228). The holder agent 42 generates a cryptographically verifiable presentation including a cryptographically verifiable proof based on the cryptographically verifiable credential (step 1229). The holder agent 42 sends the verifier agent 52 the cryptographically verifiable presentation including the cryptographically verifiable proof, based on the cryptographically verifiable credential (e.g., including the cryptographically verifiable credential), including the one or more data points requested by the verifier agent 52 ("data point proof") (step 1230). The data point proof includes the presentation of the requested one or more data points and one or more cryptographically verifiable proofs associated with the requested one or more data points. In an embodiment in which the cryptographically verifiable credential is not locked, the verifier agent 52 cryptographically verifies the cryptographically verifiable proof, for example using a public key of the issuer agent 22, validates the one or more data points, and enables the service requested by the holder agent 42 (step 1231). In an embodiment in which the cryptographically verifiable credential is locked (i.e., a locked credential), verification and validation is contingent upon receipt of an unlock signature from the issuer transaction agent 62.

The holder agent 42 confirms to the holder transaction agent 72 the fact that the verifier agent 52 was sent the data point proof (step 1232), thus unblocking the payment part of the transaction by action of the holder transaction agent 72. The verifier agent 52 sends to the verifier transaction agent 82 the signed transaction and the data point proof received from the holder agent 42 (step 1234).

The verifier transaction agent 82 saves the signed transaction and the data point proof to a verified ledger 86 (step 1236) to trigger payment initiation. The verifier transaction agent 82 notifies an agency transaction agent 174 (i.e., the ninth agent) which supports the holder transaction agent 72 that the transaction between the holder agent 42 and the verifier agent 52 has been completed and payment is promised by the verifier transaction agent 82 for a future batch payment operation (step 1238). The holder transaction agent 72, within the agency transaction agent 174, updates the transaction ledger 76 with a completed status based on the completion of the transaction between the holder agent 42 and the verifier agent 52 (step 1239). The holder transaction agent 72 notifies the holder agent 42 that the transaction has been completed so that the holder agent 42 can show updates to a user or a particular system (step 1240). The verifier transaction agent 82 transmits to the verifier agent 52 an indication of a completed status with an indication that payment for the issuer agent 22 is promised and pending (step 1242). The verifier transaction agent 82 sends to the agency transaction agent 174, operating on behalf of the verifier transaction agent 82, payment and proof of the payment for the issuer agent 22 for a plurality of transactions between a plurality of holder agents 42 and the verifier agent 52, the plurality of transactions set forth for example in a transaction list (step 1244).

The agency transaction agent 174 deidentifies the payment and the proof of the payment (step 1245). The payment and the proof of the payment for the issuer agent 22 ("payment proof"), which does not disclose the payer's identity, are relayed to the issuer transaction agent 62 (i.e., the sixth agent) by the agency transaction agent 174 in a noncorrelatable transaction report, which report does not correlate to a payer (step 1246). The issuer transaction agent 62 saves the payment proof to the issuance ledger 66 (step 1248) so that a transaction receipt for the cryptographically verifiable credential as associated with the data point proof can be sent back to the verifier agent 52 via the agency transaction agent 174 and verifier transaction agent 82.

The issuer transaction agent 62 sends to the agency transaction agent 174 the transaction receipt for the cryptographically verifiable credential associated with the data point proof associated with the signed transaction (step 1250) for relay to the verifier agent 52. The agency transaction agent 174 saves the transaction receipt to an agency ledger 77 for the holder agent 42 (step 1252). The agency transaction agent 174 relays the transaction receipt received from the issuer transaction agent 62 to the verifier transaction agent 82 (step 1254). The verifier transaction agent 82 updates the verified ledger 86 with a completed status reflecting a completed transaction (step 1256). The verifier transaction agent 82 sends to the verifier agent 52 a notification of a completed transaction including the transaction receipt received from the issuer transaction agent 62 (step 1258). In a case in which the cryptographically verifiable credential is a locked credential, the transaction receipt from the issuer transaction agent 62 can include an unlock signature for the locked credential to unlock the data point proof associated with the signed transaction. In the case in which the cryptographically verifiable credential is a locked credential, the verifier agent 52 subsequently unlocks the data point proof received from the holder agent 42 for the signed transaction using the unlock signature for the locked credential, and the verifier agent 52 cryptographically verifies the cryptographically verifiable proof, for example using a public key of the issuer agent 22, validates the one or more data points, and enables the service requested by the holder agent (step 1260).

Steps 1226, 1228, 1232, 1236, 1239 provide additional levels of completeness that ensure that the process flow and system 1200 can detect issues and/or show progress throughout the flow sequence. A system implementation may choose to skip one or more of steps 1226, 1228, 1232, 1236, 1239 for optimization purposes without losing the overall resultant exchange of a transaction.

Figure 10:
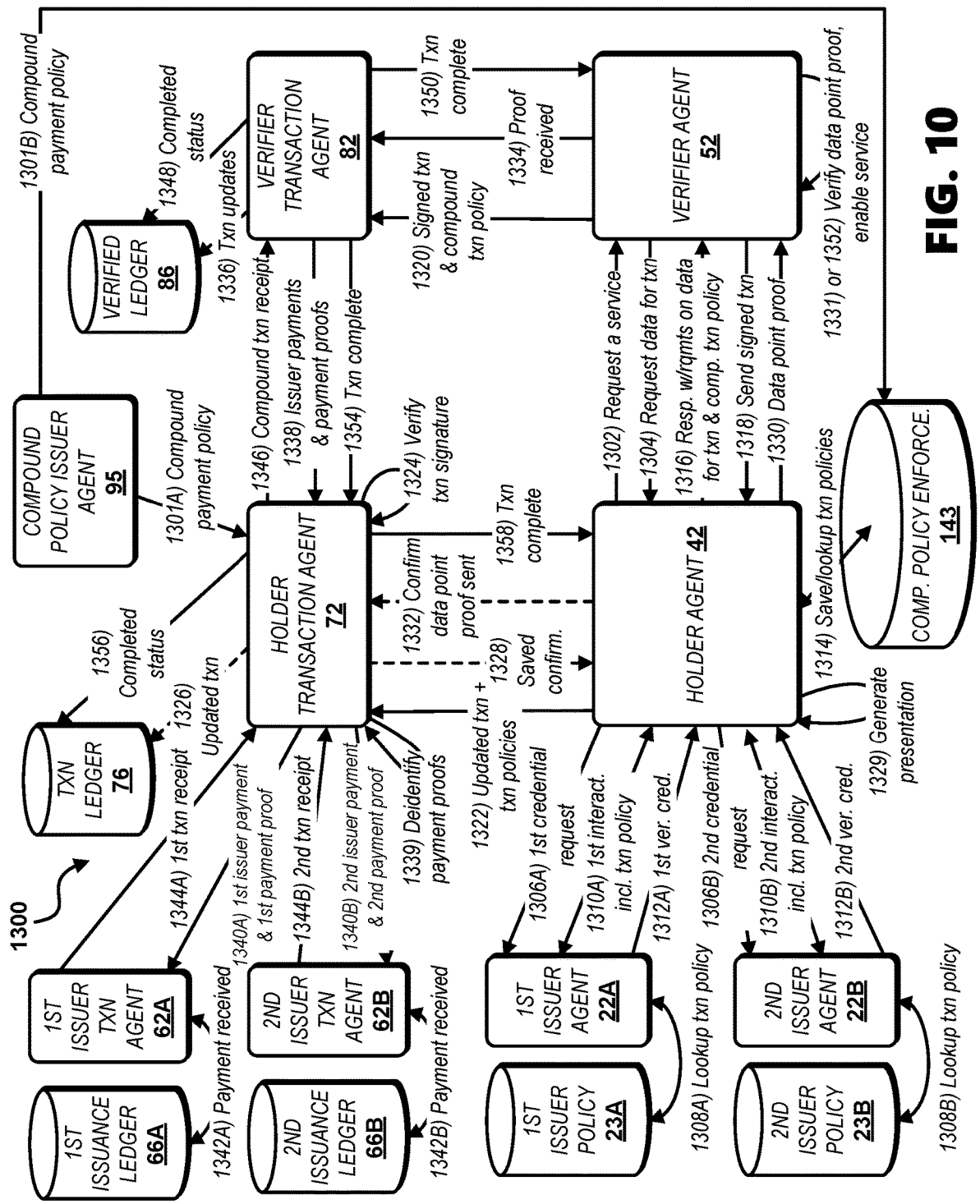

In the sixth payment scheme in Table 3, the verifier pays the issuers as part of a compound transaction policy as defined by a plurality of transaction policies. The sixth payment scheme implements transaction agents in the verification of credential processes. Payment terms of the sixth payment scheme include a requirement to pay per verification of a transaction substantially immediately, as defined by a plurality of policies of a plurality of issuers. Referring to FIG. 10, an exemplary scenario where the sixth payment scheme applies is represented by the process flow and system 1300. In the process flow and system 1300 a new first verifiable credential is required from a first issuer agent 22A, and a new second verifiable credential is required from a second issuer agent 22B. Pre-conditions of the process flow and system 1300 include a requirement that no prior verifiable credential is held by the holder agent 42. Alternatively, if the holder agent 42 already possesses a first verifiable credential previously received from the first issuer agent 22A and a second verifiable credential previously received from the second issuer agent 22B, transactions between the first issuer agent 22A and the holder agent 42 and transactions between the second issuer agent 22B and the holder agent 42 can be omitted from the process flow and system 1300.

The process flow and system 1300 enables methods for transacting over a network by a plurality of agents including a first agent, second agent, third agent, fourth agent, fifth agent, sixth agent, seventh agent, and eighth agent. As described with respect to the process flow and system 1300, the first agent is depicted as a holder transaction agent 72, the second agent is depicted as a holder agent 42, the third agent is depicted as a verifier agent 52, the fourth agent is depicted as a first issuer agent 22A, the fifth agent is depicted as a verifier transaction agent 82, the sixth agent is depicted as a first issuer transaction agent 62A, the seventh agent is depicted as a second issuer agent 22B, and the eighth agent is depicted as a second issuer transaction agent 62B. The depictions of the plurality of agents with respect to the process flow and system 1300 are exemplary in nature, and the process flow and system 1300 is not limited by the particular naming of each agent.

The process flow and system 1300 is shown enabled in a network environment. A compound policy issuer agent 95 transmits a compound payment policy to the holder transaction agent 72 (step 1301A) and to a compound policy enforcement data store 143 (step 1301B), the compound payment policy setting requirements for collecting payments and payment proofs for a plurality of issuers and for transmitting the payments and payment proofs to the plurality of issuers via transaction agents. A holder via the holder agent 42 (i.e., the second agent) wants to initiate a transaction for use of a network-enabled service from a provider, and the provider acting as a verifier via the verifier agent 52 (i.e., the third agent) wants to verify the holder. The holder agent 42 requests the service from the verifier agent 52 (step 1302). The verifier agent 52 specifics to the holder agent 42 which one or more data points such as attributes (e.g., attributes of a verifiable credential) for the transaction are required in a request for data for the transaction (e.g., a presentation request) (step 1304), the one or more data points for example defining terms for the transaction (e.g., a contract) analogous to contract terms. Data points can include for example one or more of a holder's first name, last name, date of birth, credit card number, social security number, or passport number. The holder agent 42 requests a first verifiable credential from the first issuer agent 22A (i.e., the fourth agent) responsive to the request for data from the verifier agent 52 (step 1306A). The holder agent 42 further requests a second verifiable credential from the second issuer agent 22B (i.e., the seventh agent) responsive to the request for data from the verifier agent 52 (step 1306B). The holder agent 42 does not need to disclose the identity of the verifier agent 52 in its requests to the first issuer agent 22A and the second issuer agent 22B, but the holder agent 42 can present the data points required by the verifier agent 52.

The first issuer agent 22A acquires a first transaction policy from a first issuer policy datastore 23A responsive to the request for the first verifiable credential (step 1308A). The second issuer agent 22B acquires a second transaction policy from a second issuer policy datastore 23B responsive to the request for the second verifiable credential (step 1308B). The first transaction policy and the second transaction policy are each provided in machine readable format (e.g., JSON, JSON-LD). The holder agent 42 and the first issuer agent 22A interact (step 1310A) in order to satisfy conditions that need to be met for the first issuer agent 22A to be able to issue the requested first verifiable credential based on the use case, type of credential, and assurance level. The holder agent 42 and the second issuer agent 22B interact (step 1310B) in order to satisfy conditions that need to be met for the second issuer agent 22B to be able to issue the requested second verifiable credential based on the use case, type of credential, and assurance level. For example, in the interactions steps 1310A, 1310B, for a know-your-client ("KYC") type verifiable credential, the holder of the holder agent 42 may be required to present their driver license or other identification on camera alongside their face. The first issuer agent 22A transmits the first transaction policy to the holder agent 42 in the step 1310A, the transaction policy defining one or more processes to be adhered to for transacting for the first verifiable credential. The second issuer agent 22B transmits the second transaction policy to the holder agent 42 in the step 1310B, the second transaction policy defining one or more processes to be adhered to for transacting for the second verifiable credential. The first issuer agent 22A sends to the holder agent 42 a first cryptographically verifiable credential (e.g., a locked credential or unlocked credential) of the holder (step 1312A). The second issuer agent 22B sends to the holder agent 42 a second cryptographically verifiable credential (e.g., a locked credential or unlocked credential) of the holder (step 1312B).

The holder agent 42 saves the first transaction policy for the first cryptographically verifiable credential provided by the first issuer agent 22A and the second transaction policy for the second cryptographically verifiable credential provided by the second issuer agent 22B to the compound policy enforcement datastore 143 (step 1314), allowing subsequent use of the first cryptographically verifiable credential and the second cryptographically verifiable credential by the holder agent 42 without having to transact with the first issuer agent 22A for the first transaction policy and the second issuer agent 22B for the second transaction policy and allowing the holder agent 42 to check compliance to the first transaction policy and the second transaction policy whenever the first cryptographically verifiable credential and the second cryptographically verifiable credential are used. The holder agent 42 generates a compound transaction policy including the first transaction policy and the second transaction policy and transmits a response to the verifier agent 52 (e.g., a response to a presentation request) including one or more requirements on the data requested by the verifier agent 52 for fulfilling one or more data points for the transaction (e.g., a contract) to be initiated, the one or more requirements including the compound transaction policy including the first transaction policy and the second transaction policy (step 1316). The first transaction policy, second transaction policy or other requirements provided by the holder agent 42 include for example one or more of price, a service level agreement ("SLA"), or other policies to be adhered to for the data requested. If the one or more requirements including the first transaction policy and the second transaction policy (provided as a compound transaction policy) are acceptable to the verifier agent 52, the verifier agent 52 responds by updating the transaction to generate a digitally signed transaction that confirms that the one or more requirements, including the first transaction policy and second transaction policy, are acceptable, and the verifier agent 52 transmits a response to the holder agent 42 including the signed transaction (step 1318). The signed transaction includes data of the first issuer agent 22A and the second issuer agent 22B (e.g., digital identities of the first issuer agent 22A and second issuer agent 22B). The verifier agent 52 sends to the verifier transaction agent 82 (i.e., the fifth agent) the signed transaction and the compound transaction policy including the first transaction policy and the second transaction policy received from the holder agent 42 (step 1320).

The signed (i.e., "updated") transaction obtained by the holder agent 42 from the verifier agent 52 in step 1318, including data of the first issuer agent 22A and the second issuer agent 22B (e.g., digital identities of the first issuer agent 22A and second issuer agent 22B), and the first transaction policy and the second transaction policy obtained by the holder agent 42 respectively from the first issuer agent 22A and the second issuer agent 22B in steps 1310A, 1310B are sent by the holder agent 42 to the holder transaction agent 72 (i.e., the first agent) (step 1322). The holder transaction agent 72 beneficially verifies the signature of the signed transaction, for example by applying a public key associated with the verifier agent 52 (step 1324). The signed (i.e., "updated") transaction received by the holder transaction agent 72 from the holder agent 42 in the step 1322 is written to the transaction ledger 76 by the holder transaction agent 72 (step 1326). Confirmation of storing of the signed transaction on the transaction ledger 76 is transmitted by the holder transaction agent 72 to the holder agent 42 (step 1328). The holder agent 42 generates a compound cryptographically verifiable presentation including a first cryptographically verifiable proof based on the first cryptographically verifiable credential and a second cryptographically verifiable proof based on the second cryptographically verifiable credential (step 1329). The holder agent 42 sends the verifier agent 52 the compound cryptographically verifiable presentation including the first cryptographically verifiable proof and the second cryptographically verifiable proof, based on the first cryptographically verifiable credential and the second cryptographically verifiable credential (e.g., including the first cryptographically verifiable credential and the second cryptographically verifiable credential), including the one or more data points requested by the verifier agent 52 ("compound data point proof") (step 1330). The compound data point proof includes the presentation of the requested one or more data points and the cryptographically verifiable proofs associated with the requested one or more data points. In an embodiment in which the first cryptographically verifiable credential and the second cryptographically verifiable credential are not locked, the verifier agent 52 cryptographically verifies the first cryptographically verifiable proof and the second cryptographically verifiable proof, for example respectively using a first public key of the first issuer agent 22A and a second public key of the second issuer agent 22B, validates the one or more data points, and enables the service requested by the holder agent 42 responsive to the verification and the validation (step 1331). In an embodiment in which either of the first cryptographically verifiable credential or the second cryptographically verifiable credential is locked (i.e., a locked credential), verification and validation is contingent upon receipt of an unlock signature from one or both of the first issuer transaction agent 62A or the second issuer transaction agent 62B.

The holder agent 42 confirms to the holder transaction agent 72 the fact that the verifier agent 52 was sent the data point proof (step 1332), thus unblocking the payment part of the transaction by action of the holder transaction agent 72. The verifier agent 52 sends to the verifier transaction agent 82 the signed transaction and the data point proof received from the holder agent 42 (step 1334).

The verifier transaction agent 82 saves the signed transaction and the data point proof to a verified ledger 86 (step 1336) to trigger payment initiation. The verifier transaction agent 82 sends a first payment and a first proof of the first payment for the first issuer agent 22A and a second payment and a second proof of the second payment for the second issuer agent 22B to the holder transaction agent 72 (step 1338). The holder transaction agent 72 deidentifies the first and the second payments and the first and the second proofs of the payments (step 1339). The first payment and the first proof of the first payment for the first issuer agent 22A ("first payment proof"), which do not disclose the payer's identity, are relayed to the first issuer transaction agent 62A by the holder transaction agent 72 (step 1340A). The second payment the second proof of the second payment for the second issuer agent 22B ("second payment proof"), which does not disclose the payer's identity, are relayed to the second issuer transaction agent 62B (i.e., the eighth agent) by the holder transaction agent 72 (step 1340B). The first issuer transaction agent 62A saves the first payment proof to the first issuance ledger 66A (step 1342A) so that a first transaction receipt for the first cryptographically verifiable credential as associated with the data point proof can be sent back to the verifier agent 52 via the holder transaction agent 72 and verifier transaction agent 82. The second issuer transaction agent 62B saves the second payment proof to the second issuance ledger 66B (step 1342B) so that a second transaction receipt for the second cryptographically verifiable credential as associated with the data point proof can be sent back to the verifier agent 52 via the holder transaction agent 72 and verifier transaction agent 82.

The first issuer transaction agent 62A sends to the holder transaction agent 72 the first transaction receipt for the first cryptographically verifiable credential associated with the data point proof associated with the signed transaction (step 1344A) for relay to the verifier agent 52. The second issuer transaction agent 62B sends to the holder transaction agent 72 the second transaction receipt for the second cryptographically verifiable credential associated with the data point proof associated with the signed transaction (step 1344B) for relay to the verifier agent 52. The holder transaction agent 72 generates a compound transaction receipt based on the first transaction receipt and the second transaction receipt, and the holder transaction agent 72 relays the first transaction receipt received from the first issuer transaction agent 62A and the second transaction receipt received from the second issuer transaction agent 62B to the verifier transaction agent 82 in the form of the compound transaction receipt (step 1346). The verifier transaction agent 82 updates the verified ledger 86 with a completed status reflecting a completed transaction (step 1348). The verifier transaction agent 82 sends to the verifier agent 52 a notification of a completed transaction including the compound transaction receipt including the first transaction receipt and the second transaction receipt received from the first issuer transaction agent 62A and the second issuer transaction agent 62B respectively (step 1350).

In a case in which one or both of the first cryptographically verifiable credential or the second cryptographically verifiable credential is a locked credential, one or both of the first transaction receipt or the second transaction receipt from the first issuer transaction agent 62A or the second issuer transaction agent 62B respectively can include one or more unlock signatures for one or more locked credentials to unlock the data point proof associated with the signed transaction. In the case in which one or both of the first cryptographically verifiable credential or the second cryptographically verifiable credential is a locked credential, the verifier agent 52 subsequently unlocks the data point proof received from the holder agent 42 for the signed transaction using one or more unlock signatures for the one or more locked credentials, and the verifier agent 52 cryptographically verifies the first cryptographically verifiable proof and the second cryptographically verifiable proof, for example using a first public key of the first issuer agent 22A and a second public key of the second issuer agent 22B, validates the one or more data points, and enables the service requested by the holder agent 42 responsive to the verification and the validation (step 1352).

The verifier transaction agent 82 notifies the holder transaction agent 72 that the transaction has been completed (step 1354). The holder transaction agent 72 then updates the transaction ledger 76 with the completed status (step 1356). The holder transaction agent 72 notifies the holder agent 42 that the transaction has been completed (step 1358), and the holder agent 42 may choose to show any updates to a user or system.

Steps 1326, 1328, 1332, 1336 provide additional levels of completeness that ensure that the SSI system 300 can detect issues and/or show progress throughout the flow sequence of the process flow and system 1300. A system implementation may choose to skip one or more of steps 1326, 1328, 1332, 1336 for optimization purposes without losing the overall resultant exchange of a transaction. While a first issuer agent 22A and a second issuer agent 22B are depicted, the described process flow and system 1300 can be implemented with additional numbers of issuer agents.

Figure 11:
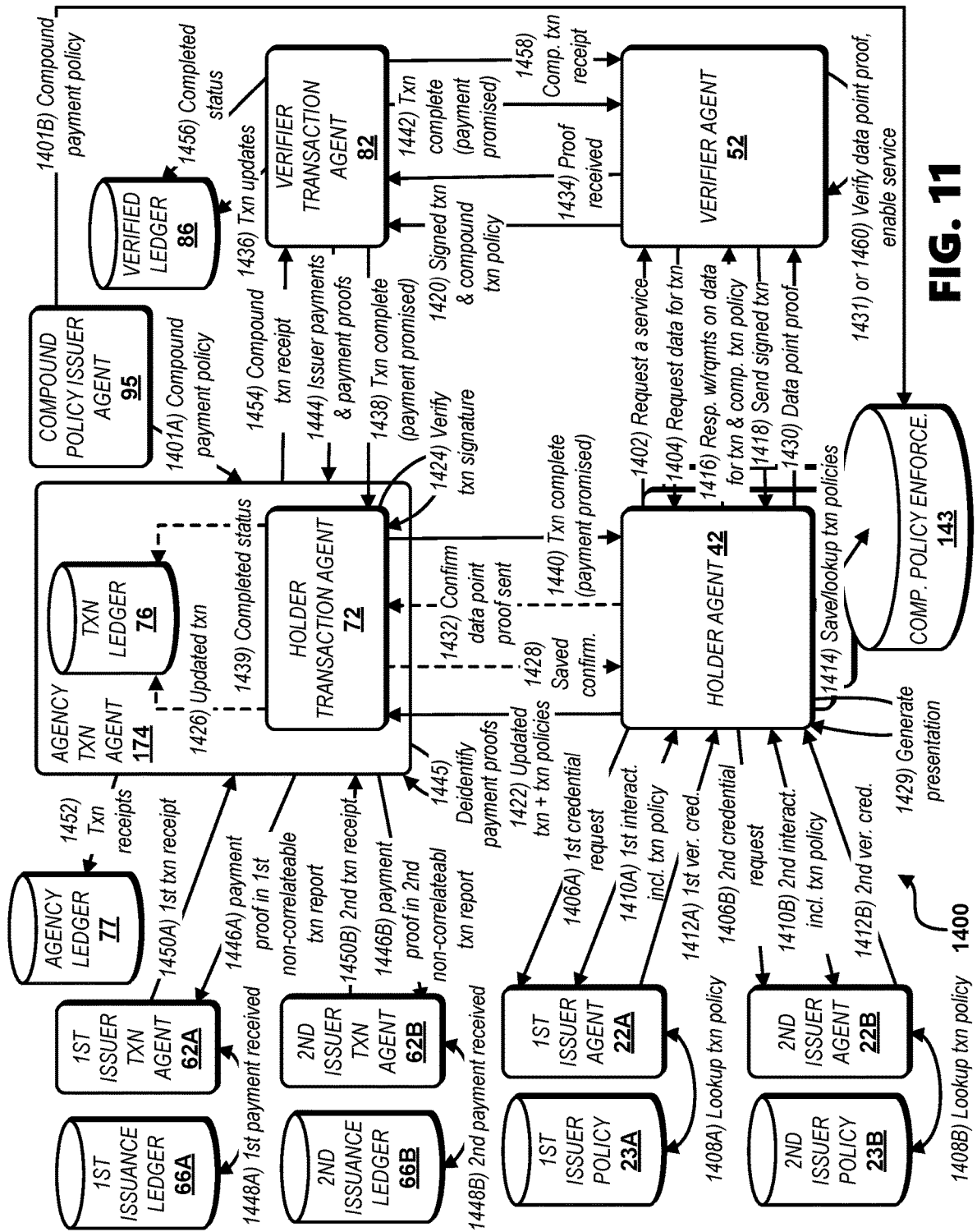

In the seventh payment scheme in Table 3, the verifier tracks required issuer payment as part of a compound transaction policy as defined by a plurality of transaction policies and pays in batch to each issuer. The sixth payment scheme implements transaction agents in the verification of credential processes. Payment terms of the seventh payment scheme include a requirement to pay per verification of a transaction in batch, as defined by a plurality of policies of a plurality of issuers. Referring to FIG. 11, an exemplary scenario where the seventh payment scheme applies is represented by the process flow and system 1400. In the process flow and system 1400 a new first verifiable credential is required from a first issuer agent 22A, and a new second verifiable credential is required from a second issuer agent 22B. Pre-conditions of the process flow and system 1400 include a requirement that no prior verifiable credential is held by the holder agent 42. Alternatively, if the holder agent 42 already possesses a first verifiable credential previously received from the first issuer agent 22A and a second verifiable credential previously received from the second issuer agent 22B, transactions between the first issuer agent 22A and the holder agent 42 and transactions between the second issuer agent 22B and the holder agent 42 can be omitted from the process flow and system 1400.

The process flow and system 1400 enables methods for transacting over a network by a plurality of agents including a first agent, second agent, third agent, fourth agent, fifth agent, sixth agent, seventh agent, eighth agent, and ninth agent. As described with respect to the process flow and system 1400, the first agent is depicted as a holder transaction agent 72, the second agent is depicted as a holder agent 42, the third agent is depicted as a verifier agent 52, the fourth agent is depicted as a first issuer agent 22A, the fifth agent is depicted as a verifier transaction agent 82, the sixth agent is depicted as a first issuer transaction agent 62A, the seventh agent is depicted as a second issuer agent 22B, the eighth agent is depicted as a second issuer transaction agent 62B, and the ninth agent is depicted as an agency transaction agent 174. The depictions of the plurality of agents with respect to the process flow and system 1400 are exemplary in nature, and the process flow and system 1400 is not limited by the particular naming of each agent.

The process flow and system 1400 is shown enabled in a network environment. A compound policy issuer agent 95 transmits a compound payment policy to the holder transaction agent 72 (step 1401A) and to a compound policy enforcement data store 143 (step 1401B), the compound payment policy setting requirements for collecting payments and payment proofs for a plurality of issuers and for transmitting the payments and payment proofs to the plurality of issuers via transaction agents. A holder via the holder agent 42 (i.e., the second agent) wants to initiate a transaction for use of a network-enabled service from a provider, and the provider acting as a verifier via the verifier agent 52 (i.e., the third agent) wants to verify the holder. The holder agent 42 requests the service from the verifier agent 52 (step 1402). The verifier agent 52 specifies to the holder agent 42 which one or more data points such as attributes (e.g., attributes of a verifiable credential) for the transaction are required in a request for data for the transaction (e.g., a presentation request) (step 1404), the one or more data points for example defining terms for the transaction (e.g., a contract) analogous to contract terms. Data points can include for example one or more of a holder's first name, last name, date of birth, credit card number, social security number, or passport number. The holder agent 42 requests a first verifiable credential from the first issuer agent 22A (i.e., the fourth agent) responsive to the request for data from the verifier agent 52 (step 1406A). The holder agent 42 further requests a second verifiable credential from the second issuer agent 22B (i.e., the seventh agent) responsive to the request for data from the verifier agent 52 (step 1406B). The holder agent 42 does not need to disclose the identity of the verifier agent 52 in its requests to the first issuer agent 22A and the second issuer agent 22B, but the holder agent 42 can present the data points required by the verifier agent 52.

The first issuer agent 22A acquires a first transaction policy from a first issuer policy datastore 23A responsive to the request for the first verifiable credential (step 1408A). The second issuer agent 22B acquires a second transaction policy from a second issuer policy datastore 23B responsive to the request for the second verifiable credential (step 1408B). The first transaction policy and the second transaction policy are each provided in machine readable format (e.g., JSON, JSON-LD). The holder agent 42 and the first issuer agent 22A interact (step 1410A) in order to satisfy conditions that need to be met for the first issuer agent 22A to be able to issue the requested first verifiable credential based on the use case, type of credential, and assurance level. The holder agent 42 and the second issuer agent 22B interact (step 1410B) in order to satisfy conditions that need to be met for the second issuer agent 22B to be able to issue the requested second verifiable credential based on the use case, type of credential, and assurance level. For example, in the interactions steps 1410A, 1410B, for a know-your-client ("KYC") type verifiable credential, the holder of the holder agent 42 may be required to present their driver license or other identification on camera alongside their face. The first issuer agent 22A transmits the first transaction policy to the holder agent 42 in the step 1410A, the transaction policy defining one or more processes to be adhered to for transacting for the first verifiable credential. The second issuer agent 22B transmits the second transaction policy to the holder agent 42 in the step 1410B, the second transaction policy defining one or more processes to be adhered to for transacting for the second verifiable credential. The first issuer agent 22A sends to the holder agent 42 a first cryptographically verifiable credential (e.g., a locked credential or unlocked credential) of the holder (step 1412A). The second issuer agent 22B sends to the holder agent 42 a second cryptographically verifiable credential (e.g., a locked credential or unlocked credential) of the holder (step 1412B).

The holder agent 42 saves the first transaction policy for the first cryptographically verifiable credential provided by the first issuer agent 22A and the second transaction policy for the second cryptographically verifiable credential provided by the second issuer agent 22B to the compound policy enforcement datastore 143 (step 1414), allowing subsequent use of the first cryptographically verifiable credential and the second cryptographically verifiable credential by the holder agent 42 without having to transact with the first issuer agent 22A for the first transaction policy and the second issuer agent 22B for the second transaction policy and allowing the holder agent 42 to check compliance to the first transaction policy and the second transaction policy whenever the first cryptographically verifiable credential and the second cryptographically verifiable credential are used. The holder agent 42 generates a compound transaction policy including the first transaction policy and the second transaction policy and transmits a response to the verifier agent 52 (e.g., a response to a presentation request) including one or more requirements on the data requested by the verifier agent 52 for fulfilling one or more data points for the transaction (e.g., a contract) to be initiated, the one or more requirements including a compound transaction policy including the first transaction policy and the second transaction policy (step 1416). The first transaction policy, second transaction policy or other requirements provided by the holder agent 42 include for example one or more of price, a service level agreement ("SLA"), or other policies to be adhered to for the data requested. If the one or more requirements including the first transaction policy and the second transaction policy (provided as a compound transaction policy) are acceptable to the verifier agent 52, the verifier agent 52 responds by updating the transaction to generate a digitally signed transaction that confirms that the one or more requirements, including the first transaction policy and second transaction policy, are acceptable, and the verifier agent 52 transmits a response to the holder agent 42 including the signed transaction (step 1418). The signed transaction includes data of the first issuer agent 22A and the second issuer agent 22B (e.g., digital identities of the first issuer agent 22A and second issuer agent 22B). The verifier agent 52 sends to the verifier transaction agent 82 (i.e., the fifth agent) the signed transaction and the compound transaction policy including the first transaction policy and the second transaction policy received from the holder agent 42 (step 1420).

The signed (i.e., "updated") transaction obtained by the holder agent 42 from the verifier agent 52 in step 1418, including data of the first issuer agent 22A and the second issuer agent 22B (e.g., digital identities of the first issuer agent 22A and second issuer agent 22B), and the first transaction policy and the second transaction policy obtained by the holder agent 42 respectively from the first issuer agent 22A and the second issuer agent 22B in steps 1410A, 1410B are sent by the holder agent 42 to the holder transaction agent 72 (i.e., the first agent) (step 1422). The holder transaction agent 72 beneficially verifies the signature of the signed transaction, for example by applying a public key associated with the verifier agent 52 (step 1424). The signed (i.e., "updated") transaction received by the holder transaction agent 72 from the holder agent 42 in the step 1422 is written to the transaction ledger 76 by the holder transaction agent 72 (step 1426). Confirmation of storing of the signed transaction on the transaction ledger 76 is transmitted by the holder transaction agent 72 to the holder agent 42 (step 1428). The holder agent 42 generates a compound cryptographically verifiable presentation including a first cryptographically verifiable proof based on the first cryptographically verifiable credential and a second cryptographically verifiable proof based on the second cryptographically verifiable credential (step 1429). The holder agent 42 sends the verifier agent 52 the compound cryptographically verifiable presentation including the first cryptographically verifiable proof and the second cryptographically verifiable proof, based on the first cryptographically verifiable credential and the second cryptographically verifiable credential (e.g., including the first cryptographically verifiable credential and the second cryptographically verifiable credential), including the one or more data points requested by the verifier agent 52 ("compound data point proof") (step 1430). The compound data point proof includes the presentation of the requested one or more data points and the cryptographically verifiable proofs associated with the requested one or more data points. In an embodiment in which the first cryptographically verifiable credential and the second cryptographically verifiable credential are not locked, the verifier agent 52 cryptographically verifies the first cryptographically verifiable proof and the second cryptographically verifiable proof, for example respectively using a first public key of the first issuer agent 22A and a second public key of the second issuer agent 22B, validates the one or more data points, and enables the service requested by the holder agent 42 responsive to the verification and the validation (step 1431). In an embodiment in which either of the first cryptographically verifiable credential or the second cryptographically verifiable credential is locked (i.e., a locked credential), verification and validation is contingent upon receipt of an unlock signature from one or both of the first issuer transaction agent 62A or the second issuer transaction agent 62B.

The holder agent 42 confirms to the holder transaction agent 72 the fact that the verifier agent 52 was sent the data point proof (step 1432), thus unblocking the payment part of the transaction by action of the holder transaction agent 72. The verifier agent 52 sends to the verifier transaction agent 82 the signed transaction and the data point proof received from the holder agent 42 (step 1434).

The verifier transaction agent 82 saves the signed transaction and the data point proof to a verified ledger 86 (step 1436) to trigger payment initiation. The verifier transaction agent 82 notifies an agency transaction agent 174 (i.e., the ninth agent) which supports the holder transaction agent 72 that the transaction between the holder agent 42 and the verifier agent 52 has been completed and payment is promised by the verifier transaction agent 82 for a future batch payment operation (step 1438). The holder transaction agent 72, within the agency transaction agent 174, updates the transaction ledger 76 with a completed status based on the completion of the transaction between the holder agent 42 and the verifier agent 52 (step 1439). The holder transaction agent 72 notifies the holder agent 42 that the transaction has been completed so that the holder agent 42 can show updates to a user or a particular system (step 1440). The verifier transaction agent 82 transmits to the verifier agent 52 an indication of a completed status with an indication that payments for the first issuer agent 22A and the second issuer agent 22B are promised and pending (step 1442). The verifier transaction agent 82 sends to the agency transaction agent 174, operating on behalf of the verifier transaction agent 82, a first payment and a first proof of the first payment for the first issuer agent 22A and a second payment and a second proof of the second payment for the second issuer agent 22B for a plurality of transactions between a plurality of holder agents 42 and the verifier agent 52, the plurality of transactions set forth for example in a transaction list (step 1444).

The agency transaction agent 174 deidentifies the first and the second payments and the first and the second proofs of the payments (step 1445). The first payment and the first proof of the first payment for the first issuer agent 22A ("first payment proof"), which does not disclose the payer's identity are relayed to the first issuer transaction agent 62A (i.e., the sixth agent) by the agency transaction agent 174 in a first noncorrelatable transaction report to the first issuer transaction agent 62A, which report does not correlate to a payer (steps 1446A). The second payment and the second proof of the second payment for the second issuer agent 22B ("second payment proof"), which does not disclose the payer's identity, are relayed to the second issuer transaction agent 62B (i.e., the eighth agent) by the agency transaction agent 174 in a second noncorrelatable transaction report to the second issuer transaction agent 62B, which report does not correlate to a payer (steps 1446B). The first issuer transaction agent 62A saves the first payment proof to the first issuance ledger 66A (step 1448A) so that a first transaction receipt for the first cryptographically verifiable credential as associated with the data point proof can be sent back to the verifier agent 52 via the agency transaction agent 174 and the verifier transaction agent 82. The second issuer transaction agent 62B saves the second payment proof to the second issuance ledger 66B (step 1448B) so that a second transaction receipt for the second cryptographically verifiable credential as associated with the data point proof can be sent back to the verifier agent 52 via the agency transaction agent 174 and the verifier transaction agent 82.

The first issuer transaction agent 62A sends to the agency transaction agent 174 the first transaction receipt for the first cryptographically verifiable credential associated with the data point proof associated with the signed transaction (step 1450A) for relay to the verifier agent 52. The second issuer transaction agent 62B sends to the agency transaction agent 174 the second transaction receipt for the second cryptographically verifiable credential associated with the data point proof associated with the signed transaction (step 1450B) for relay to the verifier agent 52. The agency transaction agent 174 saves the first transaction receipt and the second transaction receipt to an agency ledger 77 for the holder agent 42 (step 1452). The agency transaction agent 174 generates a compound transaction receipt based on the first transaction receipt and the second transaction receipt, and the agency transaction receipt 174 relays the first transaction receipt received from the first issuer transaction agent 62A and the second transaction receipt received from the second issuer transaction agent 62B to the verifier transaction agent 82 in the form of the compound transaction receipt (step 1454). The verifier transaction agent 82 updates the verified ledger 86 with a completed status reflecting a completed transaction (step 1456). The verifier transaction agent 82 sends to the verifier agent 52 a notification of a completed transaction including the compound transaction receipt including the first transaction receipt and the second transaction receipt received from the first issuer transaction agent 62A and the second issuer transaction agent 62B respectively (step 1458).

In a case in which one or both of the first cryptographically verifiable credential or the second cryptographically verifiable credential is a locked credential, one or both of the first transaction receipt or the second transaction receipt from the first issuer transaction agent 62A or the second issuer transaction agent 62B respectively can include one or more unlock signatures for one or more locked credentials to unlock the data point proof associated with the signed transaction. In the case in which one or both of the first cryptographically verifiable credential or the second cryptographically verifiable credential is a locked credential, the verifier agent 52 subsequently unlocks the data point proof received from the holder agent 42 for the signed transaction using one or more unlock signatures for the one or more locked credentials, and the verifier agent 52 cryptographically verifies the first cryptographically verifiable proof and the second cryptographically verifiable proof, for example using a first public key of the first issuer agent 22A and a second public key of the second issuer agent 22B, validates the one or more data points, and enables the service requested by the holder agent 42 responsive to the verification and the validation (step 1460).

Steps 1426, 1428, 1432, 1436, 1439 provide additional levels of completeness that ensure that the process flow and system 1400 can detect issues and/or show progress throughout the flow sequence. A system implementation may choose to skip one or more of steps 1426, 1428, 1432, 1436, 1439 for optimization purposes without losing the overall resultant exchange of a transaction. While a first issuer agent 22A and a second issuer agent 22B are depicted, the described process flow and system 1400 can be implemented with additional numbers of issuer agents.

The scenarios represented by the process flows and systems 1100, 1200, 1300, 1400 enable the second co-protocol and the third co-protocol as described above. In the second co-protocol, the holder agent 42 requests a service as part of a transaction that requires a verifiable credential, and the issuer agent 22 requires payment prior to the issuer agent 22 providing an unlock signature (if necessary) allowing the verifier agent 52 to make use of the verifiable credential. In the second co-protocol, the verifier of the verifier agent 52 is the payer and the issuer agent 22 is the payee. In the third co-protocol, a service is used by a holder of a holder agent 42 in a transaction with a verifier of a verifier agent 52 that requires a verifiable credential, and a system provider of the holder agent 42 requires payment for using elements of the process flows and systems 1100, 1200, 1300, 1400 as part of the transaction. In the third co-protocol, the verifier of the verifier agent 52 is the payer and the system provider of the holder agent 42 is the payee.

The scenarios represented by the process flows and systems 1100, 1200, 1300, 1400 are particularly suited for application in support of the herein described first use case which includes providing identity proof for online service sign up. The scenarios represented by the process flows and systems 1100, 1200, 1300, 1400 are further suited for application in support of the herein described fourth use case including providing a proof of certified buyer of a particular product when a user (i.e., buyer) writes a product/service review. With regard to the fourth use case, the issuer agent 22 may be motivated not to allow certain incident response platforms ("IRPs") to be able to verify the verifiable credential (e.g., if the IRPs publish bad reviews). Alternatively, other use cases can be supported by the scenarios represented by the process flows and systems 1100, 1200, 1300, 1400.

The processes represented by the process flows and systems 1100, 1200, 1300, 1400 enable combining SSI digital wallets, enabled by holder agents 42, and cryptographically verifiable credentials with a policy-based workflow to enable regularly extracting payments from a verifier to an issuer without leaking a holder's credential usage information. SSI components establish a bidirectional trust relationship between the holder agent 42 and the verifier agent 52 that creates the motivation for a verifier to make good on its promise to pay for the data supplied by the holder agent 42 according to the terms agreed to by the verifier which can be proven by the verifier's digital signature on the transaction contract. Accordingly, this payment mechanism can be used even if the holder's data is not cryptographically locked.

The processes represented by the process flows and systems 1100, 1200, 1300, 1400 introduce policy-based transaction payment systems for SSI trust networks to leverage agreed policies between verifiers and issuers. The represented processes are highly scalable and support instantaneous and batch payment schemes and scenarios as described. The represented processes introduce governance support for different payment policies across different use cases built on SSI networks. The represented processes support one of the key attributes of privacy protection in that issuers are unable to learn where holders are presenting credentials to verifiers while still receiving payment for credential usage.

The processes represented by the process flows and systems 600, 700, 800, 900, 1000, 1100, 1200, 1300, 1400 define transaction payment systems for SSI-based verifiable credentials. The represented processes enable payment based on per-transaction or per-issuance of a verifiable credential. The payment enforcement mechanisms for the process flows and systems 600, 700 include cryptographic locking of data transferred from the holder to the verifier. The payment enforcement mechanisms of the process flows and systems 1100, 1200, 1300, 1400 alternatively or additionally include policy-based enforcement mechanisms that rely on digital signatures over payment commitments but do not require the complexity and rigidity of cryptographic locking of the data.

The process flows and systems 600, 700, 800, 900, 1000, 1100, 1200, 1300, 1400 provide advantages in tracking transactions and processing billing when verifiable credential use occurs. Particularly with respect to the process flows and systems 1100, 1200, 1300, 1400, by enabling tracking of verifiable credentials used by issuers, holders, and verifiers, correct/privacy-aware/non-disputable records are shared based on policy rules, and under the described systems and processes, mechanisms for tracking transactions are translated into policy reporting rules for verifiable credential use. The represented processes provide SSI-based distributed systems which can employ policy across three separate functional roles (issuer, holder, verifier).

The process flows and systems 600, 700, 800, 900, 1000, 1100, 1200, 1300, 1400 provide advantages over conventional transactional processes and systems in which merchants (e.g., verifiers) connect to data providers (e.g., issuers such as banks or governments issuing data to individuals or organizations) to share the identity of the person using their services. In conventional transactional processes and systems, data providers learn where the holders used their data, which is serious privacy issue. Further, conventional transactional processes and systems allow data providers to become data aggregators that can mine and sell a holder's data. The process flows and systems 600, 700, 800, 900, 1000, 1100, 1200, 1300, 1400 deliver mechanisms to enable and track transactions for payment and to allow issuers (e.g., data providers) and verifiers (e.g., merchants) to track the transactions for payment without disclosing to an issuer how a holder transacts using their data.

The process flows and systems 1100, 1200, 1300, 1400 allow further benefit in providing a transactional payment tracking system for SSI without the requirement that cryptographic locking be built into protocol exchanges and the handling of the verifiable credentials. The cryptographic locking mechanisms defined in the process flows and systems 600, 700 are robust, but an implementer may require more flexibility. The process flows and systems 1100, 1200, 1300, 1400 provide an option with regard to payment enforcement mechanism to incorporate a policy-based payment enforcement mechanism which can overlay on top of protocols and exchanges that provide a base security layer and which are flexible to adopt and modify over time. The process flows and systems 1100, 1200, 1300, 1400 implement policy systems incorporating SSI-based verifiable credential mechanisms as the base mechanisms.

Further to the description above and referring to FIGS. 8-11, the process flows and systems 1100 and 1200 enable a fourth method and the process flows and systems 1300 and 1400 enable a fifth method. The fourth and fifth methods are for transacting over a computer network by a plurality of agents including a first agent, second agent, third agent, fourth agent, fifth agent, sixth agent, seventh agent, eighth agent, and ninth agent. The fourth and fifth methods individually or collectively set forth first entity-identifying information, second entity-identifying information, a first cryptographically verifiable credential, and a second cryptographically verifiable credential. The fourth and fifth methods are described with reference to the steps and elements of one or more of the process flows and systems 1100, 1200, 1300, 1400. The first agent is depicted as a holder transaction agent 72, the second agent or plurality of second agents is depicted as a holder agent 42 or plurality of holder agents 42, the third agent is depicted as a verifier agent 52, the fourth agent is depicted as a first issuer agent 22A, the fifth agent is depicted as a verifier transaction agent 82, the sixth agent is depicted as a first issuer transaction agent 62A, the seventh agent is depicted as a second issuer agent 22B, the eighth agent is depicted as a second issuer transaction agent 62B, and the ninth agent is depicted as an agency transaction agent 174. With respect to the fourth and fifth methods, the issuer agent 22 and the issuer transaction agent 62 of the process flows and systems 1100, 1200 are identified as the first issuer agent 22A and the first issuer transaction agent 62A respectively. The depictions of the agents and credentials with respect to the process flows and systems 1100, 1200, 1300, 1400 are exemplary in nature, and the process flows and systems 1100, 1200, 1300, 1400 are not limited by the particular naming of each agent and credential.

The fourth method for transacting over a computer network includes receiving by a holder transaction agent 72 (i.e., the first agent) a digitally signed transaction from a holder agent 42 (i.e., the second agent) (steps 1122, 1322), the digitally signed transaction received by the holder agent 42 from a verifier agent 52 (i.e., the third agent) and including a digital signature. The holder transaction agent 72 receives a first transaction policy from the holder agent 42 (steps 1122, 1322), the first transaction policy received by the holder agent 42 from a first issuer agent 22A (i.e., the fourth agent). The holder transaction agent 72 cryptographically verifies the digitally signed transaction (steps 1124, 1324). The holder transaction agent 72 receives from a verifier transaction agent 82 (i.e., the fifth agent) based on the first transaction policy a first transaction proof (e.g., proof of payment, payment proof) (steps 1138, 1338), and the holder transaction agent 72 transmits to a first issuer transaction agent 62A (i.e., the sixth agent) the first transaction proof (steps 1140, 1340A). The holder transaction agent 72 updates a transaction ledger 76 based on the digitally signed transaction received from the holder agent (steps 1126, 1326).

The fourth method for transacting over a computer network further includes transmitting by the holder agent 42 to the verifier agent 52 a request to initiate a use of a network-enabled service (steps 1102, 1302). The holder agent 42 receives from the verifier agent 52 a request for one or more data points that supports verification of an entity to initiate the use of the network-enabled service (steps 1104, 1304). The holder agent 42 transmits to the verifier agent 52 one or more requirements for fulfilling the one or more data points, the one or more requirements including the first transaction policy (steps 1116, 1316). The holder agent 42 receives from the verifier agent 52 the digitally signed transaction (steps 1118, 1318), and the holder agent 42 transmits to the verifier agent 52 a first cryptographically verifiable proof including the one or more data points (steps 1130, 1330).

The holder agent 42 transmits a first credential request to the first issuer agent 22A (steps 1106, 1306A) responsive to the request for the one or more data points from the verifier agent 52. The holder agent 42 receives a first cryptographically verifiable credential from the first issuer agent 22A (steps 1112, 1312A). The holder agent 42 generates a cryptographically verifiable presentation including the first cryptographically verifiable proof based on the first cryptographically verifiable credential (steps 1129, 1329), and the holder agent 42 transmits to the verifier agent the cryptographically verifiable presentation including the first cryptographically verifiable proof (steps 1130, 1330). The first cryptographically verifiable proof can include the first cryptographically verifiable credential.

The holder agent 42 can receive from the first issuer agent 22A a request for entity-identifying information in response to which the holder agent 42 acquires from a user the entity-identifying information and transmits to the first issuer agent 22A the entity-identifying information (steps 1110, 1310A). The entity-identifying information can include one or more of a driver license, business license, passport, or social security card.

The holder transaction agent 72 can receive from the first issuer transaction agent 62A a first unlock signature for the first cryptographically verifiable credential in a first transaction receipt (steps 1144, 1344A). The holder transaction agent 72 transmits the first unlock signature to the verifier transaction agent 82 (steps 1146, 1346). The verifier transaction agent 82 receives from the verifier agent 52 the digitally signed transaction, the first transaction policy, and the first cryptographically verifiable proof (steps 1120, 1134, 1320, 1334), and the verifier transaction agent 82 transmits to the verifier agent 52 the first unlock signature in a notification of a completed transaction (steps 1150, 1350). The verifier transaction agent 82 updates a verified ledger 86 based on the digitally signed transaction, the first transaction policy, and the first cryptographically verifiable proof (steps 1136, 1336). The verifier agent 52 receives from the verifier transaction agent 82 the first unlock signature (steps 1150, 1350), and the verifier agent 52 cryptographically unlocks the first cryptographically verifiable proof using the first unlock signature (steps 1152, 1352). The verifier agent 52 enables the use of the network-enabled service responsive to the unlocking of the first cryptographically verifiable proof by the verifier agent 52 (steps 1152, 1352). Alternatively, the fourth method can be performed without use of an unlock signature in the case in which the first cryptographically verifiable credential and the a first cryptographically verifiable proof are not locked.

In an illustrative embodiment, the one or more data points include a plurality of data points including one or more first data points and one or more second data points. The fourth method further includes transmitting by the holder agent 42 a first credential request to the first issuer agent 22A (steps 1106, 1306A) responsive to the request for the one or more data points from the verifier agent 52 and transmitting by the holder agent 42 a second credential request to a second issuer agent 22B (i.e., the seventh agent) (step 1306B) responsive to the request for the one or more data points from the verifier agent 52. The holder agent 42 receives a first cryptographically verifiable credential from the first issuer agent 22A (steps 1112, 1312A). The holder agent 42 receives from the second issuer agent 22B a second transaction policy (step 1310B), and the holder agent 42 receives from the second issuer agent 22B a second cryptographically verifiable credential (step 1312B). The holder agent 42 transmits to the verifier agent 52 the second transaction policy (step 1316). The holder transaction agent 72 receives from the holder agent 42 the second transaction policy (step 1322). The holder agent 42 transmits to the verifier agent 52 the first cryptographically verifiable proof including the one or more first data points based on the first cryptographically verifiable credential (steps 1130, 1330) and the holder agent 42 transmits to the verifier agent 52 a second cryptographically verifiable proof including the one or more second data points based on the second cryptographically verifiable credential (step 1330).

The holder transaction agent 72 deidentifies a source of the first transaction proof (e.g., proof of payment, payment proof) (steps 1139, 1339), and the holder transaction agent 72 transmits the deidentified first transaction proof to the first issuer transaction agent 62A (steps 1140, 1340A). The holder transaction agent 72 receives a second transaction proof (e.g., proof of payment, payment proof) based on the second transaction policy from the verifier transaction agent 82 (step 1338). The holder transaction agent 72 deidentifies a source of the second transaction proof (step 1339), and the holder transaction agent 72 transmits the deidentified second transaction proof to a second issuer transaction agent 62B (i.e., the eight agent) (step 1340B).

The holder agent 42 generates a cryptographically verifiable presentation including the first cryptographically verifiable proof based on the first cryptographically verifiable credential and the second cryptographically verifiable proof based on the second cryptographically verifiable credential (step 1329), and the holder agent 42 transmits to the verifier agent 52 the cryptographically verifiable presentation including the first cryptographically verifiable proof and the second cryptographically verifiable proof (step 1330).

The holder agent 42 receives from the first issuer agent 22A a request for first entity-identifying information (steps 1110, 1310A), and the holder agent 42 receives from the second issuer agent 22B a request for second entity-identifying information (step 1310B). The holder agent 42 acquires from a user the first entity-identifying information and the second entity-identifying information. The holder agent 42 transmits to the first issuer agent 22A the first entity-identifying information to transact for the first cryptographically verifiable credential (steps 1110, 1310A), and the holder agent 42 transmits to the second issuer agent 22B the second entity-identifying information to transact for the second cryptographically verifiable credential (step 1310B).

The holder transaction agent 72 can receive from the first issuer transaction agent 62A a first unlock signature for the first cryptographically verifiable credential in a first transaction receipt (steps 1144, 1344A), and the holder transaction agent 72 can receive from a second issuer transaction agent 62B (i.e., the eighth agent) a second unlock signature for the second cryptographically verifiable credential in a second transaction receipt (step 1344B). The holder transaction agent 72 transmits the first unlock signature for the first cryptographically verifiable credential and the second unlock signature for the second cryptographically verifiable credential to the verifier transaction agent 82 (step 1346). Alternatively, the fourth method can be performed without use of an unlock signature in the case on which the first cryptographically verifiable credential and the second cryptographically verifiable credential are not locked.

In the fourth method, the one or more data points can include for example one or more of a first name, last name, date of birth, credit card number, social security number, or passport number. The one or more requirements can further include one or both of a price or a service level agreement. The entity can include one or both of a user of the holder agent or an organization associated with the user of the holder agent. One or both of the first transaction proof or the second transaction proof can include a cryptographically verifiable payment proof.

The holder transaction agent 72 cryptographically verifies the digital signature (steps 1124, 1324), and the holder transaction agent 72 receives from the verifier transaction agent 82 one or both of the first transaction proof (e.g., proof of payment, payment proof) or the second transaction proof further (e.g., proof of payment, payment proof) based on the cryptographically verifying by the holder transaction agent 72 the digital signature (steps 1138, 1338). The holder transaction agent 72 deidentifies a source of the first transaction proof (steps 1139, 1339) and a source of the second transaction proof (step 1339), and the holder transaction agent 72 transmits the deidentified first transaction proof to the first issuer transaction agent 62A (steps 1140, 1340A) and transmits the deidentified second transaction proof to the second issuer transaction agent 62B (step 1340B).

The fifth method for transacting over a computer network includes receiving by a holder transaction agent 72 (i.e., the first agent) a digitally signed transaction from a plurality of holder agents 42 (i.e., the plurality of second agents) (steps 1222, 1422), the digitally signed transaction received by the plurality of holder agents 42 from a verifier agent 52 (i.e., the third agent) and including a digital signature. The holder transaction agent 72 cryptographically verifies the digitally signed transaction (steps 1224, 1424). The holder transaction agent 72 receives a first transaction policy from the plurality of holder agents 42 (steps 1222, 1422), the first transaction policy received by the plurality of holder agents 42 from a first issuer agent 22A (i.e., the fourth agent). An agency transaction agent 174 (i.e., the ninth agent) receives from a verifier transaction agent 82 (i.e., the fifth agent) a plurality of transaction proofs (e.g., proofs of payment, payment proofs) based on the first transaction policy for the plurality of holder agents 42 (steps 1244, 1444). The agency transaction agent 174 deidentifies a source of the plurality of transaction proofs (steps 1245, 1445), and the agency transaction agent 174 transmits the deidentified plurality of transaction proofs to a first issuer transaction agent 62A (i.e., the sixth agent) (steps 1246, 1446A).

The plurality of holder agents 42 transmit to the verifier agent 52 a request to initiate a use of a network-enabled service (steps 1202, 1402). The plurality of holder agents 42 receive from the verifier agent 52 a request for one or more data points that support verification of an entity to initiate the use of the network-enabled service (steps 1204, 1404). The plurality of holder agents 42 transmit to the verifier agent 52 one or more requirements for fulfilling the one or more data points, the one or more requirements including the first transaction policy (steps 1216, 1416). The plurality of holder agents 42 receive from the verifier agent 52 the digitally signed transaction (steps 1218, 1418), and the plurality of holder agents 42 transmit to the verifier agent 52 one or more cryptographically verifiable proofs including the one or more data points (steps 1230, 1430).

In an illustrative embodiment the one or more data points include a plurality of data points including one or more first data points and one or more second data points. The plurality of holder agents 42 transmit a first credential request to the first issuer agent 22A (steps 1206, 1406A) responsive to the first credential request for the one or more data points from the verifier agent 52. The plurality of holder agents 42 transmit a second credential request to a second issuer agent 22B (i.e., the seventh agent) (step 1406B) responsive to the second credential request for the one or more data points from the verifier agent 82. The plurality of holder agents 42 receive from the second issuer agent 22B a second transaction policy (step 1410B). The plurality of holder agents 42 receive from the first issuer agent 22A a first cryptographically verifiable credential (steps 1212, 1412A). The plurality of holder agents 42 receive from the second issuer agent 22B a second cryptographically verifiable credential (step 1412B). The plurality of holder agents 42 transmit to the verifier agent 52 the second transaction policy (step 1416). The holder transaction agent 72 receives from the plurality of holder agents 42 the second transaction policy (step 1422). The plurality of holder agents 42 transmit to the verifier agent 52 a first cryptographically verifiable proof including the one or more first data points based on the first cryptographically verifiable credential (steps 1230, 1430), and the plurality of holder agents 42 transmit to the verifier agent 52 a second cryptographically verifiable proof including the one or more second data points based on the second cryptographically verifiable credential (step 1430).

The plurality of holder agents 42 generate a cryptographically verifiable presentation including the first cryptographically verifiable proof based on the first cryptographically verifiable credential and the second cryptographically verifiable proof based on the second cryptographically verifiable credential (step 1429). The plurality of holder agents 42 transmit to the verifier agent 52 the cryptographically verifiable presentation including the first cryptographically verifiable proof and the second cryptographically verifiable proof (step 1430).

The plurality of holder agents 42 receive from the first issuer agent 22A a request for first entity-identifying information (steps 1210, 1410A). The plurality of holder agents 42 receive from the second issuer agent 22B a request for second entity-identifying information (step 1410B). The plurality of holder agents 42 acquire from a plurality of users the first entity-identifying information and the second entity-identifying information. The plurality of holder agents 42 transmit to the first issuer agent 22A the first entity-identifying information to transact for the first cryptographically verifiable credential (step 1410A), and the plurality of holder agents 42 transmit to the second issuer agent 22B the second entity-identifying information to transact for the second cryptographically verifiable credential (step 1410B).

FIG. 12 illustrates in abstract the function of an exemplary computer system 2000 on which the systems, methods and processes described herein can execute. For example, the issuer system 20, holder device 40, verifier system 50, issuer transaction agent service provider system 60, holder transaction agent service provider system 70, and verifier transaction agent service provider system 80 can each be embodied by a particular computer system 2000. The computer system 2000 may be provided in the form of a personal computer, laptop, handheld mobile communication device, mainframe, distributed computing system, or other suitable computer configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method for transacting over a network to initiate a use of a network-enabled service, the method comprising:
    receiving by a third agent from a second agent executed by a computing device a request via the network to initiate the use of the network-enabled service;
    transmitting by the third agent to the second agent a request for at least one data point that supports verification of an entity to initiate the use of the network-enabled service;
    receiving by the third agent from the second agent at least one requirement for fulfilling the at least one data point, the at least one requirement comprising a first transaction policy, the first transaction policy received by the second agent from a fourth agent;
    transmitting by the third agent to the second agent a digitally signed transaction comprising a digital signature;
    receiving by a first agent the digitally signed transaction from the second agent;
    cryptographically verifying by the first agent the digitally signed transaction;
    receiving by the first agent the first transaction policy from the second agent;
    receiving by the third agent from the second agent a first cryptographically verifiable proof comprising the at least one data point;
    receiving by the first agent from a fifth agent based on the first transaction policy a first transaction proof;
    transmitting by the first agent to a sixth agent the first transaction proof;
    receiving by the first agent from the sixth agent a first unlock signature for the first cryptographically verifiable proof;
    transmitting by the first agent the first unlock signature to the fifth agent;
    receiving by the third agent from the fifth agent the first unlock signature;
    cryptographically unlocking by the third agent the first cryptographically verifiable proof using the first unlock signature; and
    enabling by the third agent the use of the network-enabled service responsive to the unlocking of the first cryptographically verifiable proof by the third agent.

2. The method of claim 1, further comprising updating by the first agent a ledger based on the digitally signed transaction received from the second agent.

3. The method of claim 1, further comprising:
    transmitting by the second agent a first credential request to the fourth agent responsive to the request for the at least one data point from the third agent;
    receiving by the second agent a first cryptographically verifiable credential from the fourth agent;
    generating by the second agent a cryptographically verifiable presentation comprising the first cryptographically verifiable proof based on the first cryptographically verifiable credential; and
    transmitting by the second agent to the third agent the cryptographically verifiable presentation comprising the first cryptographically verifiable proof.

4. The method of claim 3, further comprising:
    receiving by the second agent from the fourth agent a request for entity-identifying information;
    acquiring by the second agent from a user the entity-identifying information; and
    transmitting by the second agent to the fourth agent the entity-identifying information.

5. The method of claim 4, wherein the entity-identifying information comprises at least one of a driver license, business license, passport, or social security card.

6. The method of claim 3, wherein the first unlock signature is for the first cryptographically verifiable credential, the method further comprising:
    receiving by the fifth agent from the third agent the digitally signed transaction, the first transaction policy, and the first cryptographically verifiable proof; and
    transmitting by the fifth agent to the third agent the first unlock signature.

7. The method of claim 6, further comprising updating by the fifth agent a ledger based on the digitally signed transaction, the first transaction policy, and the first cryptographically verifiable proof.

8. The method of claim 3, wherein the first cryptographically verifiable proof comprises the first cryptographically verifiable credential.

9. The method of claim 1, wherein the at least one data point comprises at least one of a first name, last name, date of birth, credit card number, social security number, or passport number.

10. The method of claim 1, wherein the at least one requirement further comprises at least one of a price or a service level agreement.

11. The method of claim 1, wherein the entity comprises at least one of a user of the second agent or an organization associated with the user of the second agent.

12. The method of claim 1, wherein the first transaction proof is a cryptographically verifiable payment proof.

13. The method of claim 1, further comprising:
    cryptographically verifying by the first agent the digital signature; and
    receiving by the first agent from the fifth agent the first transaction proof further based on the cryptographically verifying by the first agent the digital signature.

14. The method of claim 1, further comprising:
    deidentifying by the first agent a source of the first transaction proof; and
    transmitting by the first agent the deidentified first transaction proof to the sixth agent.

15. The method of claim 1, wherein the at least one data point comprises a plurality of data points comprising at a least a first data point and at least a second data point, the method further comprising:
    transmitting by the second agent a first credential request to the fourth agent responsive to the request for the at least one data point from the third agent;
    transmitting by the second agent a second credential request to a seventh agent responsive to the request for the at least one data point from the third agent;

receiving by the second agent a first cryptographically verifiable credential from the fourth agent;

receiving by the second agent from the seventh agent a second transaction policy;

receiving by the second agent from the seventh agent a second cryptographically verifiable credential;

transmitting by the second agent to the third agent the second transaction policy;

receiving by the first agent from the second agent the second transaction policy;

transmitting by the second agent to the third agent the first cryptographically verifiable proof comprising the at least the first data point based on the first cryptographically verifiable credential; and transmitting by the second agent to the third agent a second cryptographically verifiable proof comprising the at least the second data point based on the second cryptographically verifiable credential.

16. The method of claim 15, further comprising:

deidentifying by the first agent a source of the first transaction proof;

transmitting by the first agent the deidentified first transaction proof to the sixth agent;

receiving by the first agent a second transaction proof based on the second transaction policy from the fifth agent;

deidentifying by the first agent a source of the second transaction proof; and transmitting by the first agent the deidentified second transaction proof to an eighth agent.

17. The method of claim 15, further comprising:

generating by the second agent a cryptographically verifiable presentation comprising the first cryptographically verifiable proof based on the first cryptographically verifiable credential and the second cryptographically verifiable proof based on the second cryptographically verifiable credential; and transmitting by the second agent to the third agent the cryptographically verifiable presentation comprising the first cryptographically verifiable proof and the second cryptographically verifiable proof.

18. The method of claim 15, further comprising:

receiving by the second agent from the fourth agent a request for first entity-identifying information;

receiving by the second agent from the seventh agent a request for second entity-identifying information;

acquiring by the second agent from a user the first entity-identifying information and the second entity-identifying information;

transmitting by the second agent to the fourth agent the first entity-identifying information to transact for the first cryptographically verifiable credential; and transmitting by the second agent to the seventh agent the second entity-identifying information to transact for the second cryptographically verifiable credential.

19. The method of claim 15, wherein the first unlock signature is for the first cryptographically verifiable credential, the method further comprising:

receiving by the first agent from an eighth agent a second unlock signature for the second cryptographically verifiable credential; and transmitting by the first agent the second unlock signature for the second cryptographically verifiable credential to the fifth agent.

\* \* \* \* \*